(12) United States Patent
Aoki et al.

(10) Patent No.: US 7,481,583 B2
(45) Date of Patent: Jan. 27, 2009

(54) ROLLING BEARING WITH SENSOR AND ROTARY STATE DETECTING DEVICE

(75) Inventors: Mamoru Aoki, Fujisawa (JP); Hiroaki Ishikawa, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 11/854,674

(22) Filed: Sep. 13, 2007

(65) Prior Publication Data
US 2008/0044119 A1 Feb. 21, 2008

Related U.S. Application Data

(62) Division of application No. 10/496,586, filed as application No. PCT/JP02/12007 on Nov. 18, 2002, now Pat. No. 7,290,938.

(30) Foreign Application Priority Data

| Nov. 22, 2001 | (JP) | ............................. 2001-357696 |
| Dec. 27, 2001 | (JP) | ............................. 2001-396916 |
| Jan. 30, 2002 | (JP) | ............................. 2002-022105 |
| May 29, 2002 | (JP) | ............................. 2002-156097 |
| May 29, 2002 | (JP) | ............................. 2002-156098 |

(51) Int. Cl.
*F16C 32/00* (2006.01)

(52) U.S. Cl. .................................................. 384/448

(58) Field of Classification Search ................. 384/448; 324/173, 174, 207.25
See application file for complete search history.

(56) References Cited

U.S. PATENT DOCUMENTS

| 4,987,415 | A |   | 1/1991 | Santos |
| 4,989,574 | A | * | 2/1991 | Abe ..................... 324/207.25 |
| 5,026,178 | A |   | 6/1991 | Ballhaus |
| 5,221,146 | A |   | 6/1993 | Maruyama |
| 5,229,715 | A |   | 7/1993 | Niino et al. |
| 5,372,435 | A |   | 12/1994 | Genero et al. |
| 5,583,431 | A |   | 12/1996 | Ouchi et al. |
| 5,614,822 | A |   | 3/1997 | Sakamoto et al. |
| 5,677,624 | A |   | 10/1997 | Miyazaki et al. |
| 6,043,643 | A |   | 3/2000 | Message et al. |
| 6,209,389 | B1 |  | 4/2001 | Sakamoto et al. |

(Continued)

FOREIGN PATENT DOCUMENTS

DE 4037104 A1 6/1991

(Continued)

*Primary Examiner*—Thomas R Hannon
(74) *Attorney, Agent, or Firm*—Sughrue Mion, PLLC

(57) ABSTRACT

A rolling bearing with sensor has an inner ring, an outer ring, rolling elements rollably disposed between the inner ring and the outer ring, a sensor provided on one of the inner ring and the outer ring and a detection member provided on the other of the inner ring and the outer ring radially opposed to the sensor which is adapted to be sensed by the sensor. A first retaining member is fixed to the outer ring end surface of the outer ring and retains one of the sensor and the detection member. A second retaining member is fixed to the inner ring end surface of the inner ring and retains the other of the sensor and the detection member. At least one of the inner end surface and the outer end surface is arranged so as to be pressed axially without the sensor or the detection member.

5 Claims, 27 Drawing Sheets

U.S. PATENT DOCUMENTS

| | | |
|---|---|---|
| 6,541,958 B2 | 4/2003 | Harada |
| 6,559,633 B1 * | 5/2003 | Nachtigal et al. ........... 324/174 |
| 6,595,692 B2 | 7/2003 | Itou |
| 6,605,938 B1 | 8/2003 | Sentoku et al. |
| 6,655,844 B1 | 12/2003 | Message et al. |
| 6,741,073 B2 | 5/2004 | Iwamoto et al. |
| 6,796,713 B2 | 9/2004 | Landrieve |
| 2001/0030533 A1 | 10/2001 | Iwamoto et al. |

FOREIGN PATENT DOCUMENTS

| | | |
|---|---|---|
| DE | 19546512 A1 | 6/1997 |
| DE | 19632345 A1 | 2/1998 |
| EP | 0511106 A1 | 10/1992 |
| EP | 1130362 A2 | 9/2001 |
| JP | 63-111416 A | 5/1988 |
| JP | 7-218239 A | 8/1995 |
| JP | 7-218248 A | 8/1995 |
| JP | 7-311212 A | 11/1995 |
| JP | 7-325098 A | 12/1995 |
| JP | 8-86796 A | 4/1996 |
| JP | 9-42994 A | 2/1997 |
| JP | 09-049853 A | 2/1997 |
| JP | 09-288117 A | 11/1997 |
| JP | 10-274546 A | 10/1998 |
| JP | 10-311740 A | 11/1998 |
| JP | 11-194009 A | 7/1999 |
| JP | 2000-291650 A | 10/2000 |
| JP | 2000-346673 A | 12/2000 |
| JP | 2001-500597 A | 1/2001 |
| JP | 2001-249141 A | 9/2001 |
| JP | 2001-255335 A | 9/2001 |
| JP | 2001-353508 A | 12/2001 |
| JP | 2002-174258 A | 6/2002 |
| JP | 5-69421 A | 9/2007 |
| WO | 98/11356 | 3/1998 |
| WO | 99/24837 A1 | 5/1999 |

* cited by examiner

ROLLING BEARING WITH SENSOR AND ROTARY STATE DETECTING DEVICE

This is a divisional of application Ser. No. 10/496,586 filed May 24, 2004 now U.S. Pat. No. 7,290,938, which is a National Stage entry of PCT/JP02/12007 filed on Nov. 18, 2002, which claims priority from JP 2001-357696 filed on Nov. 22, 2001; JP2001-396916 filed Dec. 27, 2001; JP2002-022105 filed on Jan. 30, 2002; JP2002-156097 filed on May 29, 2002; and JP2002-156098 filed on May 29, 2002. The entire disclosure of the prior application Ser. No. 10/496,586 is hereby incorporated by reference.

TECHNICAL FIELD

The present invention relates to a rolling bearing with sensor comprising a sensor of detecting the number of revolutions, etc. and a rotary state detecting device.

BACKGROUND ART

Heretofore, as rolling bearings with sensor there have been those disclosed in JP-A-63-111416, JP-A-7-325098, JP-A-7-311212, JP-A-10-311740, etc.

The rolling bearing with sensor disclosed in JP-A-63-111416 comprises a magnetic material layer having a predetermined patterned magnetization provided on either one of the opposing surface of the inner ring and the outer ring and a magnetism sensor mounted on the other. The magnetic material layer has a plurality of patterned magnetized portions provided circumferentially.

The rolling bearing with sensor disclosed in JP-A-7-325098 comprises a magnetized portion provided on the rotary ring and a magnetism sensor proved on the stationary ring as in the aforementioned publication and has an increased clearance between the inner ring and the outer ring to provide an increased space in which the magnetized portion and sensor are received.

All these structures comprise a sensor mounted on the outer ring which is a stationary ring with a retaining member and a detection member such as multipolar magnet mounted on the inner ring which is a rotary ring.

Further, FIG. 45 illustrates a rolling bearing 1090 with sensor disclosed in JP-A-7-311212. The rolling bearing 1090 comprises balls 1093 rollably retained between an outer ring 1091 and an inner ring 1092. On one axial side is provided a seal member 1094. On the end surface opposite the seal member 1094, a sensor 1096 is provided on the outer ring 1091 with a retaining member 1095 and a detection member 1099 is provided on the inner ring 1092 with a retaining member 1098.

The retaining member 1095 mounted on the outer ring 1091 has a mounting portion 1095a fitted on the inner surface of the outer ring 1091, a flange portion 1095b connected to the mounting portion 1095a extending outward radially and a sensor retaining portion 1095c connected to the flange portion 1095 extending axially. The flange portion 1095b covers the entire area of the end surface of the outer ring 1091. On the inner surface of the sensor retaining portion 1095c is retained the sensor 1096.

The retaining member 1098 mounted on the inner ring 1092 is formed having an L-shaped section comprising a cylindrical portion fitted on the outer surface of the inner ring 1092 and a detection member retaining portion extending outward radially from the cylindrical portion and retains the detection member 1099 in such an arrangement that the detection member 1099 is axially opposed to the sensor 1096 with a slight clearance therebetween.

In general, a bearing with sensor is used as a rotary state detecting device of detecting the speed, direction or angle of rotation of a rotary body such as bearing. A rotary state detecting device comprises a rotation sensor provided outside the rotary body and detection members disposed periodically on the surface of the rotary body. The rotation sensor calculates the speed, direction or angle of rotation of the rotary body on the basis of the period of detection of the detection material and the period of disposition of the detection material.

JP-A-9-42994 discloses a slewing bearing comprising a slewing angle detector. This slewing angle detector comprises a scale and a sensor each mounted on the inner ring and the outer ring which are bearing rings. The scale has N poles and S poles alternately arranged along the circumference of the shaft. The sensor senses the magnetic force of N poles and S poles to detect pulse signals and counts the number of pulse signals. The signal converting unit converts pulse signal to angle data according to the number of pulse signals and displays the angle data.

JP-A-7-218239 discloses a bearing with rotary angle detector comprising a lattice pattern provided on the rotary ring of the bearing, a plurality of LED's provided opposed to the lattice pattern and a plurality of PD's of detecting light which has been emitted by a light source and modified by the aforementioned pattern. The light emitted by the plurality of LED's each form a beam spot on the lattice pattern. The beam spot shows a periodical change of intensity of reflected light due to the dark and bright portions of the lattice pattern. The plurality of PD's each observe the change of intensity of reflected light and calculates the rotary angle of the shaft according to the results of observation.

JP-A-7-218248 discloses a contact type rotary angle detecting device. This rotary angle detecting device comprises an insulating material layer provided on the end surface of an outer ring, a conductor pattern provided on the insulating material layer and a contactor provided on an inner ring opposed to the conductor pattern. The contactor comes in contact alternately with the conductor pattern and the insulating material with the rotation of a rotary body. The conductor pattern is short-circuited and conducted when brought into contact with the contactor. The rotary angle detecting device detects the rotary angle of the rotary body by the presence/absence of conduction of the conductor pattern to the contactor.

Further, JP-A-2000-346673 discloses a rotary speed detecting device comprising magnets disposed on the circumference of a rotary body and a single magnetism sensor disposed in the vicinity of the rotary body which detects the magnetic flux formed by the magnets. The rotary body has a plurality of N poles, S poles and nonpolar sets provided therein in sequence and the magnetism sensor detects the magnetic force of the N poles, S poles and nonpolar sets to detect the rotary speed of the rotary body. In addition, the magnetism sensor measures the direction of rotation of the rotary body on the basis of the order of detection of magnetic poles ("N pole-S pole-nonpolar set" or "nonpolar set-S pole-N pole") This rotary speed detecting device can measure the speed and direction of rotation of the rotary body using a single magnetism sensor and thus doesn't need to provide another sensor therein and is advantageous in the reduction of the size of bearing.

However, when the outer ring 1091 of a rolling bearing 1090 with sensor as shown in FIG. 45 is axially pressed with a sensor 1096 interposed therebetween so that a load is applied thereto as shown by the arrow P to press it into a housing, the clearance between the sensor 1096 and a detection member 1099 can be deviated, making it impossible to accurately detect the number of revolutions or the like. Further, a load P can be applied to set a pilot pressure for the rolling bearing 1090, occasionally causing the deviation of the clearance of the sensor 1096 and the detection member 1099. The clearance between a retaining member 1095 and the sensor 1096 is normally molded by a resin to fix the sensor 1096 and thus can be easily damaged or deformed by a load P.

Moreover, since the clearance between the inner ring and the outer ring of a bearing is normally small, it is necessary that the sensor or the opposing detection member be formed thin. However, since the sensor is provided integrally with a board for mounting the sensor, it is difficult to reduce the thickness of the sensor to a predetermined limit or less. The above cited JP-A-63-111416 proposes that a magnetic material layer integrated to an inner ring or outer ring be provided to reduce the thickness of the detection member, but the formation of such a layer requires a special technique that causes the increase of the production cost.

The above cited JP-A-7-325098 proposes that the clearance between the inner and outer rings be raised to simplify the configuration of the magnetism sensor or detection member, but a plurality of sensors must be axially arranged in parallel, increasing the width of the entire bearing.

Further, when a rolling bearing with sensor is disposed in the vicinity of an apparatus which generates magnetic flux such as electric motor and high frequency power supply, magnetic flux leaked from such an apparatus affects the circuit constituting the sensor, occasionally causing erroneous operation of the sensor. Moreover, in the case where an apparatus having its alternating power supply grounded via the housing thereof is used with the aforementioned rolling bearing with sensor attached thereto, if the housing is insufficiently grounded, the voltage of the alternating power supply is applied also to the sensor. This is accompanied by the flow of weak current through the sensor, occasionally causing the mixing of the output signal of the sensor with noise attributed to the frequency of the power supply, etc.

Further, in the case of JP-A-2000-346673, for the reason of failure or replacement of memory storing the angle before the starting of rotation, the angle data during the starting of rotation can be lost. In this case, it is disadvantageous in that relative reference position is lost, making it impossible to calculate absolute angle unless reference angle is reset.

DISCLOSURE OF THE INVENTION

An object of the present invention is to provide a rolling bearing with sensor which can maintain its high precision in detection even if a load is acted thereon so as to press against the end surface of the bearing ring.

Another object of the present invention is to provide a rolling bearing with sensor which has a plurality of sensors incorporated therein and can be provided with a reduced width.

A further object of the present invention is to provide a rolling bearing with sensor which can block external disturbance such as leakage of magnetic flux to maintain a high precision in detection.

A further object of the present invention is to provide a bearing with sensor as a rotary state detecting device having a simple structure capable of detecting the rotary speed, rotation direction and absolute angle of a rotary body at the same time using a single sensor.

In order to accomplish the aforesaid objects, the rolling bearing with sensor of the present invention comprises an inner ring, an outer ring, rolling elements rollably disposed between the aforesaid inner ring and the aforesaid outer ring, a sensor provided on one of the aforesaid inner ring and the aforesaid outer ring, a detection member provided on the other of the aforesaid inner ring and the aforesaid outer ring radially opposed to the aforesaid sensor which is adapted to be sensed by the aforesaid sensor, a first retaining member fixed to the outer ring end surface of the aforesaid outer ring which retains one of the aforesaid sensor and the aforesaid detection member and a second retaining member fixed to the inner ring end surface of the aforesaid inner ring which retains the other of the aforesaid sensor and the aforesaid detection member, wherein at least one of the aforesaid inner end surface and the aforesaid outer end surface is arranged so as to be pressed axially without the aforesaid sensor or the aforesaid detection member.

Further, the rolling bearing with sensor of the present invention comprises an inner ring, an outer ring, rolling elements rollably disposed between the aforesaid inner ring and the aforesaid outer ring and a plurality of sensors provided on the aforesaid inner ring and outer ring, wherein the aforesaid plurality of sensors are disposed at the same position along the axial direction.

Moreover, the rolling bearing with sensor of the present invention comprises an inner ring, an outer ring, rolling elements rollably disposed between the aforesaid inner ring and the aforesaid outer ring, a sensor provided on one of the aforesaid inner ring and outer ring, a detection member provided on the other of the aforesaid inner ring and outer ring radially opposed to the aforesaid sensor which is adapted to be sensed by the aforesaid sensor and a noise shield disposed in the vicinity of the aforesaid sensor and the aforesaid detection member.

Further, the rotary state detecting device of the present invention comprises an encoder mounted on a rotary member which rotates relative to a stationary member and formed by a plurality of magnetized regions arranged in a line and a sensor mounted on the aforesaid stationary member opposed to the aforesaid encoder which is adapted to detect the magnetic force of the aforesaid plurality of magnetized regions on the aforesaid encoder, wherein the aforesaid plurality of magnetized regions have different magnetic flux densities.

Moreover, the rolling bearing with sensor of the present invention comprises an inner ring, an outer ring, rolling elements rollably disposed between the aforesaid outer ring and the aforesaid inner ring, an encoder mounted on one of the aforesaid outer ring and the aforesaid inner ring and formed by a plurality of magnetized regions arranged in a line and a sensor mounted on the other of the aforesaid outer ring and the aforesaid inner ring opposed to the aforesaid encoder which is adapted to detect the magnetic force of the aforesaid plurality of magnetized regions on the aforesaid encoder, wherein the aforesaid plurality of magnetized regions have different magnetic flux densities.

Further, the rotary state detecting device of the present invention comprises a sensor mounted on a stationary member and an encoder mounted on a rotary member which rotates relative to the stationary member and comprising a sensor opposing surface opposing the sensor, wherein the distance between the aforesaid sensor opposing surface of the aforesaid encoder and the aforesaid sensor changes with position and the aforesaid sensor is adapted to measure the rotary state of the rotary member by measuring the change of the aforesaid distance.

Moreover, the rolling bearing with sensor of the present invention comprises an inner ring, an outer ring, rolling elements rollably disposed between the aforesaid outer ring and the aforesaid inner ring, a sensor mounted on one of the aforesaid outer ring and inner ring and an encoder mounted on the other of the aforesaid outer ring and inner ring comprising a sensor opposing surface opposed to the aforesaid sensor, wherein the distance between the aforesaid sensor opposing surface of the aforesaid encoder and the aforesaid sensor changes with position and the aforesaid sensor is adapted to measure the rotary state of the rotary member by measuring the change of the distance.

BEST MODE FOR CARRYING OUT THE INVENTION

Embodiments of implementation of the present invention will be described in detail hereinafter in connection with the drawings.

First Embodiment

Figure 1:
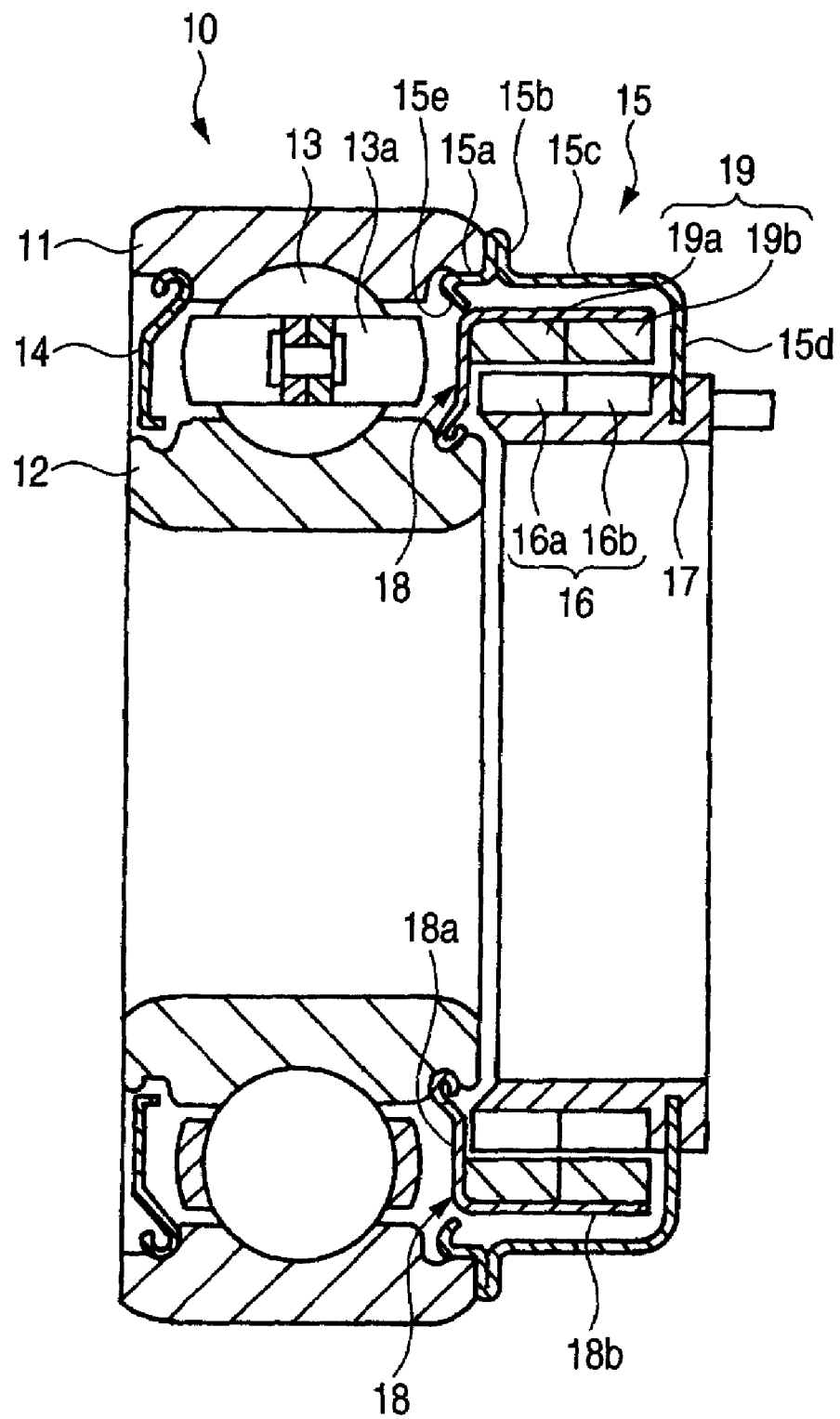
FIG. 1 is a general schematic diagram of a first embodiment.

FIG. 1 illustrates a rolling bearing 10 with sensor of a first embodiment of implementation of the present invention. The rolling bearing 10 with sensor comprises a plurality of balls (rolling elements) 13 provided interposed between an outer ring 11 and an inner ring 12. The plurality of balls 13 are rollably retained circumferentially apart from each other by a retainer 13a.

Herein, the outer ring 11 is a stationary ring and the inner ring 12 is a rotary ring.

On one axial side (left side as viewed on the drawing) of the rolling bearing 10 is provided a shield 14 as a seal member. The shield 14 is fixed to the outer ring 11 at the base end (outer periphery) thereof. The forward end (inner periphery) of the shield 14 doesn't come in contact with the inner ring 12 and is a noncontact seal member.

Figure 45:
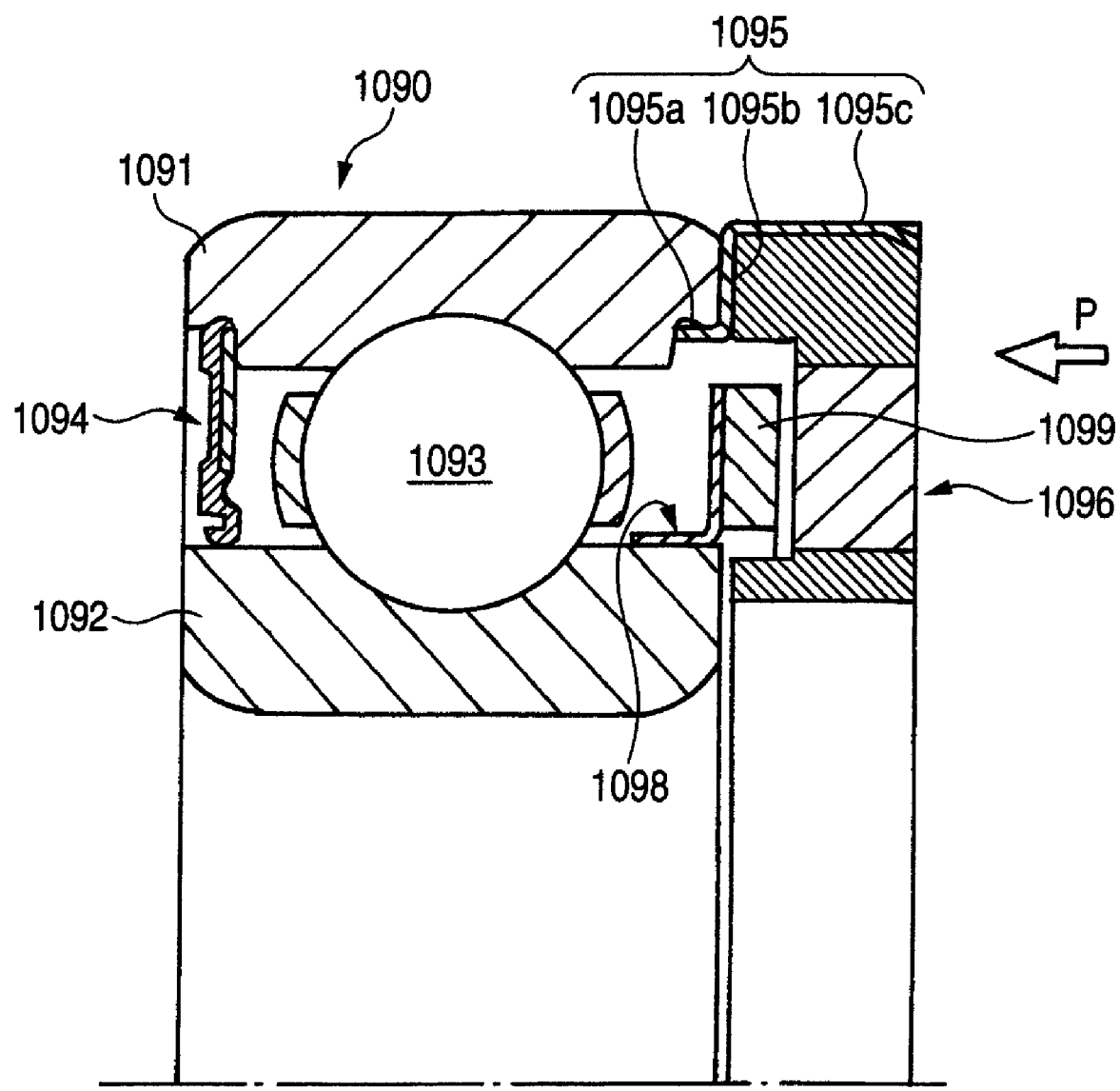
FIG. 45 is a schematic diagram illustrating a related art rolling bearing with sensor.

A contact seal member as shown in FIG. 45 can be used.

On the other axial side of the rolling bearing 10 (right side as viewed on the drawing), a first retaining member 15 is fixed to the outer ring 11 and a second retaining member 18 is fixed to the inner ring 12. The first retaining member 15 and second retaining member 18 may be made of a metal and may be formed by sheet metal processing or the like.

The first retaining member 15 has a cylindrical mounting portion 15a fitted on the inner surface of the outer ring 11, a flange portion 15b connected to the mounting portion 15a extending outward radially, an extension portion 15c connected to the flange portion 15b at the same radial position as the mounting portion 15a extending axially and a sensor retaining portion 15d connected to the axial end of the extension portion 15c extending inward radially. Further, on the side of the mounting portion 15a opposite the flange portion 15b (left side as viewed on the drawing) is provided a bent portion 15e rising inward radially.

The second retaining member 18 has a connection portion 18a extending radially and caulked to a groove formed on the outer surface of the inner ring 12 at the base end thereof (inner periphery) and a detection member retaining portion 18b connected to the forward end (outer periphery) of the connection portion 18a extending axially.

On the inner periphery of the detection member retaining portion 18b of the second retaining member 18 is retained an annular multipolar magnet 19 as a detection member.

The forward end of the sensor retaining portion 15d of the first retaining member 15 protrudes inward from the multipolar magnet 19 and a sensor retaining ring 17 which is a separate body is mounted thereon. On the outer periphery of the sensor retaining ring 17 are retained magnetism sensors 16 as sensor. The magnetism sensors 16 are disposed slightly apart from each other on the inner periphery of the multipolar magnet 19 and both the magnetism sensors are radially opposed to each other. The first retaining member 15 doesn't come in contact with the second retaining member 18 and the multipolar magnet 19 and the second retaining member 18 doesn't come in contact with the first retaining member 15 and the magnetism sensors 16.

As the multipolar magnet 19 there is used one having a first portion 19a and a second portion 19b having different magnetized patterns, the second portion 19b being axially adjacent to the first portion 19a. The first portion 19a has a plurality (e.g., total of 64) of S and N poles alternately arranged circumferentially. The second portion 19b has S and N poles arranged circumferentially only at one position.

The magnetism sensor 16, too, has a first portion 16a and a second portion 16b which are disposed radially opposed to the first portion 19a and the second portion 19b of the multipolar magnet 19, respectively. The rotary speed of the inner ring 12 can be observed at the first portion 16a of the magnetism sensor 16 and the rotary phase of the inner ring 12 can be observed at the second portion 16b.

Figure 2:
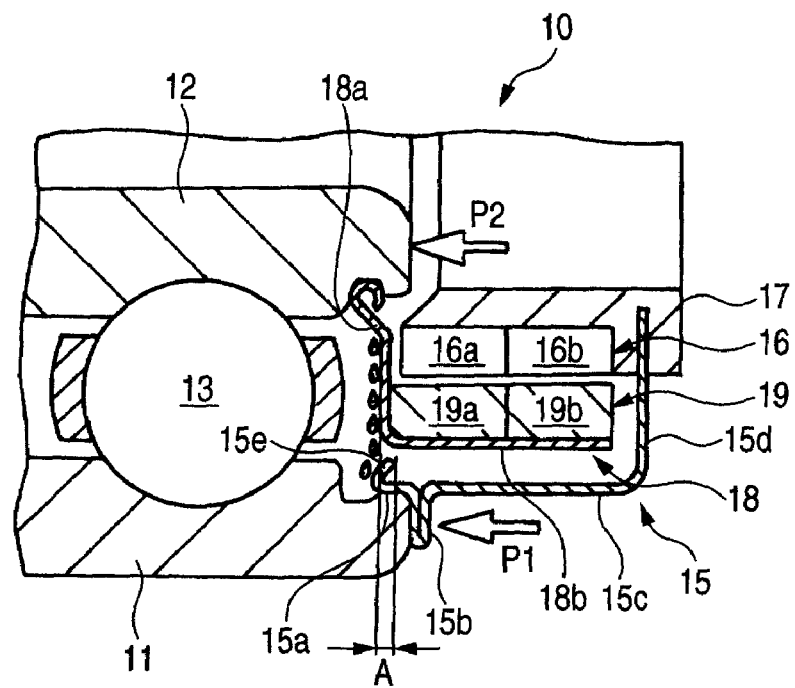
FIG. 2 is an enlarged view of an essential part of the first embodiment.

FIG. 2 is an enlarged view of an essential part of FIG. 1. As shown in FIG. 2, the flange portion 15b of the first retaining member 15 is bent in the form of U having no clearance and extends radially and one of the side surfaces thereof comes in contact with the outer ring 11. Even when any pressure load is applied to the other side surface of the flange portion 15b as shown by the arrow P1 in the drawing, the flange portion 15b undergoes no deformation and the pressure load P1 is transferred to the outer ring 11 as it is because the flange portion 15b is supported on the end surface of the outer ring. Since the extension portion 15c of the first retaining member 15 extends axially at the same radial position as the mounting portion 15a as previously mentioned, the application of pressure load P1 to the end surface of the outer ring via the flange portion 15b cannot be hindered by the extension portion 15c.

Further, in the present embodiment, substantially general area of the end surface of the inner ring 12 is positioned more inside than the magnetism sensors 16 and the sensor retaining ring 17. In other words, substantially general area of the end surface of the inner ring 12 is exposed and the applicant of pressure load can be hindered by neither the magnetism sensors 16 nor the sensor retaining ring 17 as shown by the arrow P2 in the drawing.

Moreover, as shown in FIG. 2, the forward end of the bent portion 15e provided on the mounting portion 15a of the first retaining member 15 protrudes toward the side of the connection portion 18a, which is a radially extending wall of the second retaining member 18, opposite the ball (amount A of protrusion). Due to centrifugal force developed with the rotation of the inner ring 12 and the second retaining member 18, a lubricant such as grease present on the inner ring 12 side flows toward the outer ring 11 along the side of the connection portion 18a closer to the ball 13. The lubricant hits the bent portion 15e by which it is then guided toward the ball 13. In other words, the lubricant is checked by the bent portion 15e and thus doesn't leak out of the bearing space.

In accordance with the rolling bearing 10 with sensor having the aforementioned arrangement, the end surface of the inner ring can be directly pressed axially and the end surface of the outer ring can be axially pressed only via the flange portion 15b of the first retaining member 15. Further, the multipolar magnet 19 and the magnetism sensor 16 are retained radially opposed to each other. Accordingly, the position of the multipolar magnet 19 and the magnetism sensor 16 cannot be axially deviated during assembly, setting of pilot pressure or other occasions, preventing the deterioration of accuracy of detection. Since a ball bearing has an axial clearance which is greater than radial clearance, the positional deviation of the sensor from the detection member can be easily raised in the related art arrangement as shown in FIG. 45, but the present embodiment has no such apprehension.

Further, in accordance with the present embodiment, the axial positioning of the first retaining member 15 can be made by the flange portion 15b, making it possible to mount the first retaining member 15 on the bearing accurately and easily. Moreover, since the first retaining member 15 having the flange portion 15b provided thereon is mounted on the outer ring 11, which is a stationary ring, with the flange portion 15b in contact with the end surface of the outer ring 11 and the magnetism sensor 16 is retained on the first retaining member 15, the magnetism sensor 16 can be operated extremely accurately.

Further, the leakage of lubricant can be remarkably prevented by the bent portion 15e provided on the first retaining member 15. Moreover, the first retaining member 15, the magnetism sensor 16 and sensor retaining ring 17, and the second retaining member 18 and multipolar magnet 19 form a labyrinth portion by which the entrance of foreign matters such as dust into the bearing space can be remarkably prevented.

As a sensor there may be used, e.g., temperature sensor or vibration sensor.

Second Embodiment

Figure 3:
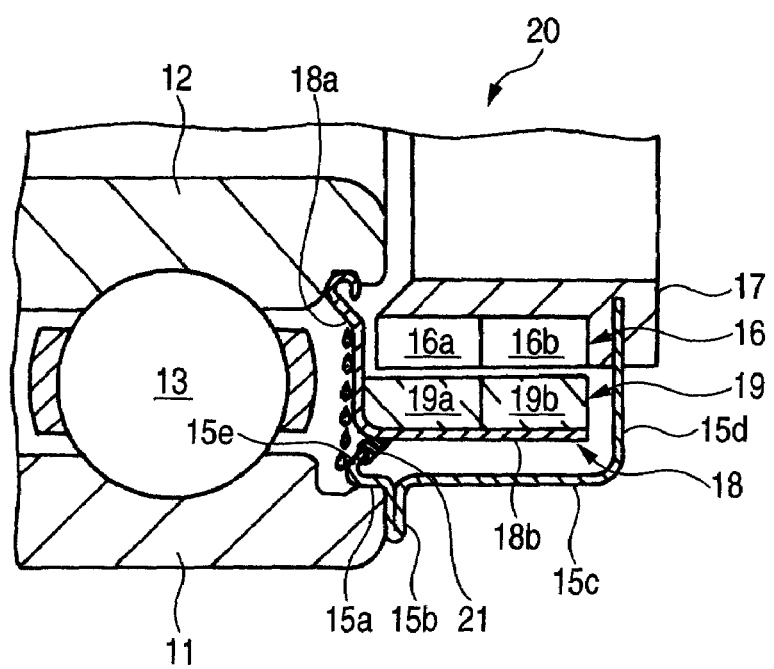
FIG. 3 is an enlarged view of an essential part of a second embodiment.

FIG. 3 illustrates an enlarged view of an essential part of a rolling bearing 20 with sensor according to a second embodiment of implementation of the present invention. In the embodiments described below, the description of members having the same configuration and action as that of the members already described will be simplified or omitted by providing them with the same or similar reference numerals or signs in the drawings.

In the second embodiment shown in FIG. 3, the forward end of the bent portion 15e of the first retaining member 15 in the first embodiment is further provided with a seal lip 21. As shown in FIG. 3, the seal lip 21 made of an elastic member such as rubber provided on the forward end of the bent portion 15e comes in contact with the second retaining member 18. The seal lip 21 seals the clearance between the first retaining member 15 and the second retaining member 18.

As a sensor there may be used, e.g., temperature sensor or vibration sensor.

Third Embodiment

Figure 4:
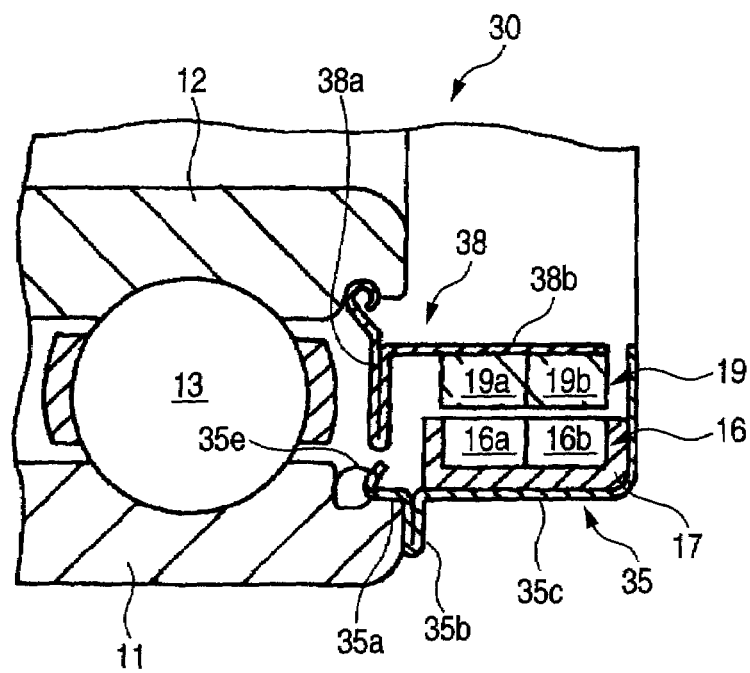
FIG. 4 is an enlarged view of an essential part of a third embodiment.

FIG. 4 illustrates an enlarged view of an essential part of a rolling bearing 30 with sensor according to a third embodiment of implementation of the present invention. In the present embodiment, too, the outer ring 11 is a stationary ring and the inner ring 12 is a rotary ring.

In the third embodiment shown in FIG. 4, on the first retaining member 35 fixed to the outer ring 11 is retained a magnetism sensor 16 as a sensor and on the second retaining member 38 fixed to the inner ring 12 is retained a multipolar magnet 19 as a detection member.

The first retaining member 35 has a mounting portion 35a fitted on the inner surface of the outer ring 11, a flange portion 35b connected to the mounting portion 35a extending radially in contact with the end surface of the outer ring, a sensor retaining portion 35c connected to the flange portion 35b extending axially at the same radial position as the mounting portion 35a and a bent portion 35e provided on the side of the mounting portion 35a opposite the flange portion 35b. A sensor retaining ring 17 is mounted on the inner periphery of the sensor retaining portion 35c. A magnetism sensor 16 is retained on the inner periphery of the sensor retaining ring 17.

The second retaining member 38 has a connection portion 38a extending radially and caulked to a groove formed on the outer surface of the inner ring 12 at the base end thereof (inner periphery) and a detection member retaining portion 38b extending axially at a radial position more inside than the forward end (outer periphery) of the connection portion 38a. The connection portion 38a is bent in the form of U having no clearance and extends radially and acts also as a seal member. On the outer periphery of the detection member retaining portion 38b is retained a multipolar magnet 19.

As a sensor there may be used, e.g., temperature sensor or vibration sensor.

Fourth Embodiment

Figure 5:
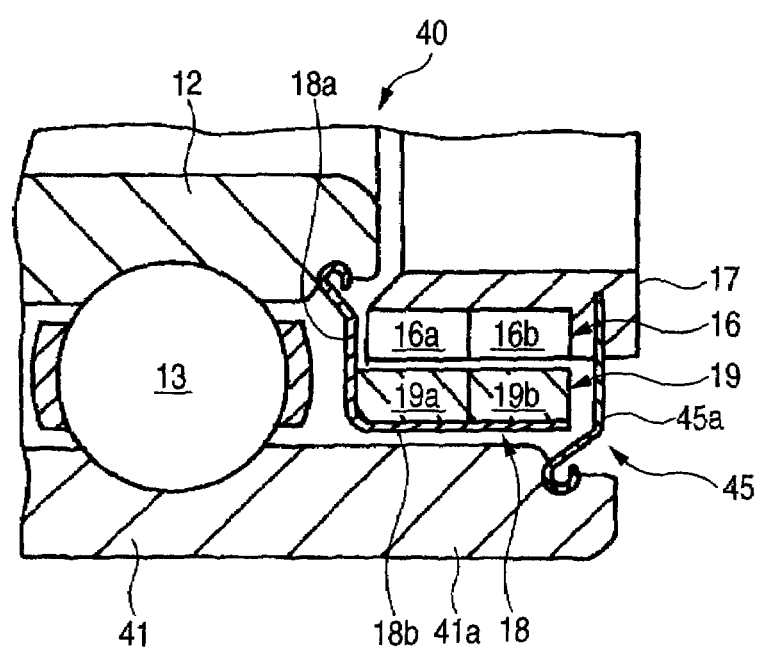
FIG. 5 is an enlarged view of an essential part of a fourth embodiment.

FIG. 5 illustrates an enlarged view of an essential part of a rolling bearing 40 with sensor according to a fourth embodiment of implementation of the present invention. In the present embodiment, too, the outer ring 41 is a stationary ring and the inner ring 12 is a rotary ring.

In the fourth embodiment shown in FIG. 5, the outer ring 41 has an outer ring extension portion 41a extending axially. The end surface of the outer ring extension portion 41a is positioned farther from the ball than the end surface of the multipolar magnet 19 retained by the second retaining member 18 (right side as viewed on the drawing). The first retaining member 45 extends radially and is caulked to a groove formed on the inner surface of the outer ring extension portion 41 at the base end thereof (outer periphery). A sensor retaining ring 17 is mounted on the forward end of the first retaining member 45 (inner periphery). A magnetism sensor 16 is retained on the outer periphery of the sensor retaining ring 17.

In the present embodiment, since the outer ring 41 has the outer ring extension portion 41a, the end surface of the extension portion 41a can be directly pressed during mounting on a housing or other occasions.

As a sensor there may be used, e.g., temperature sensor or vibration sensor.

Fifth Embodiment

Figure 6:
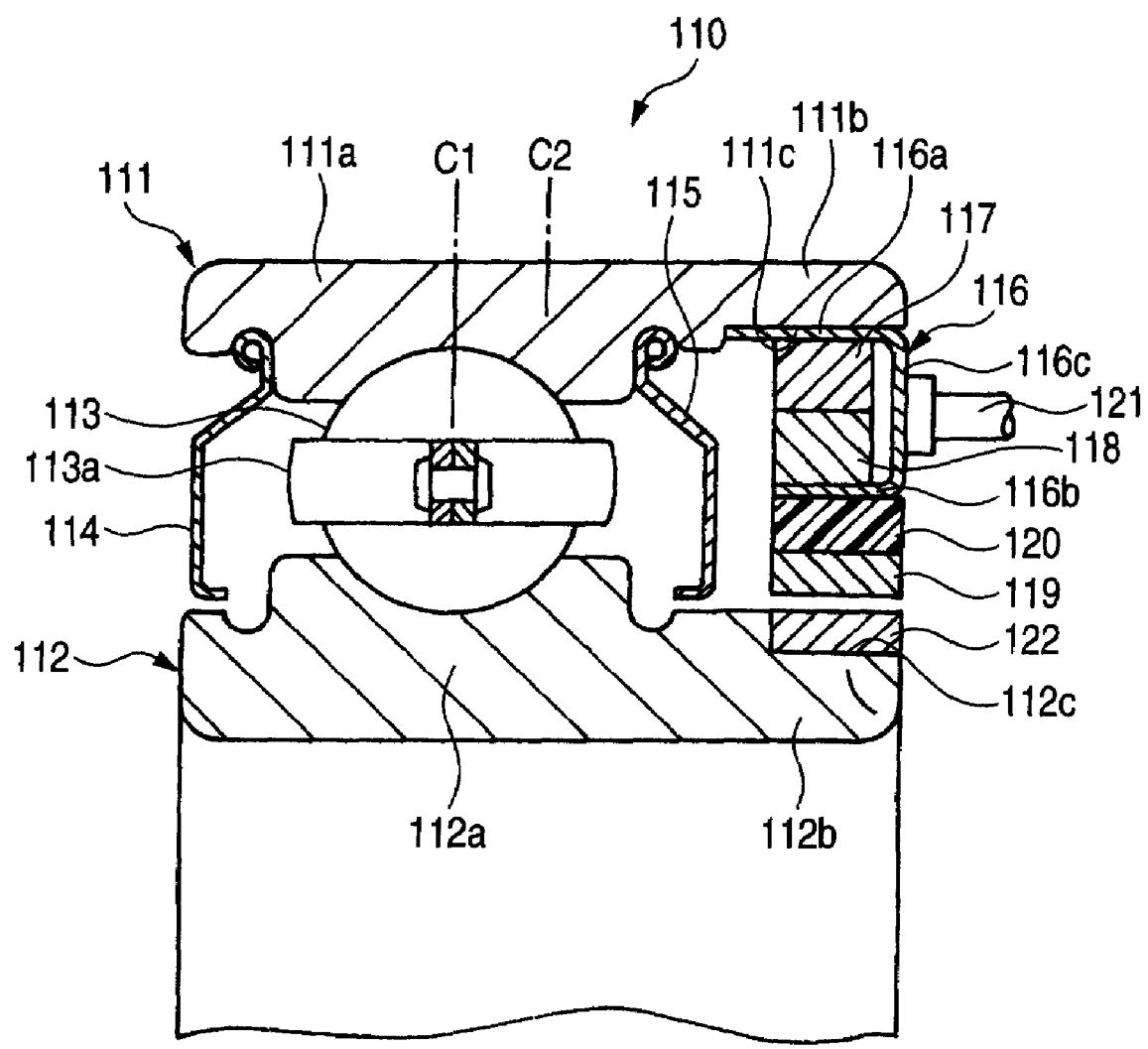
FIG. 6 is an enlarged view of an essential part of a fifth embodiment.

FIG. 6 illustrates a rolling bearing 110 with sensor of a fifth embodiment of implementation of the present invention. The rolling bearing 110 with sensor has a plurality of balls (rolling element) 113 provided interposed between an outer ring 111 and an inner ring 112. The plurality of balls 113 are rollably retained circumferentially apart from each other by a retainer 113a.

Herein, the outer ring 111 is a stationary ring and the inner ring 112 is a rotary ring.

A pair of shields 114, 115 are provided on one axial side thereof (left side as viewed on the drawing) and on the other (right side as viewed on the drawing) of the ball 113, respectively, as a seal structure. The shields 114, 115 each are fixed to the outer ring 111 at the base end thereof (outer periphery). The shields 114, 115 do not come in contact with the inner ring 112 at the forward end thereof (inner periphery) and each are a noncontact seal member.

The shields 114, 115 prevent the leakage of lubricant enclosed in the clearance between the ball 113 and the outer ring 111 and inner ring 112. Therefore, it is not necessary that the amount of lubricant to be enclosed be more than required. Further, the shields 114, 115 prevent the entrance of foreign matters such as dust into the interior of the bearing. Moreover, the shield 115 disposed on the right side as viewed on the drawing prevents the leakage of lubricant from the ball 113 side that causes erroneous operation of sensors 117, 118 and 119 described later.

The outer ring 111 has a main body 111a which rotationally supports the ball 113 and has the shields 114, 115 fixed thereto at the base end thereof and an extension portion 111b disposed axially adjacent to the main body 111a. Herein, the outer surface of the extension portion 111b and the outer surface of the main body 111a are flush with each other and the extension portion 111b has a stepped portion 111c formed on the inner surface thereof as a fallen portion.

The center of the rolling element 113 is disposed at the axially central position C1 of the main body 111a and the axially central position C1 of the main body 111a is offset from the axially central position C2 of the entire outer ring 111, including the extension portion 111b.

To the stepped portion 111c of the extension portion 111b is fixed the retaining member 116 at the base end thereof.

The retaining member 116 is made of a thin sheet having a U-shaped section. The retaining member 116 has a first sheet portion 116a fixed to the stepped portion 111c and a second sheet portion 116b disposed radially apart from the first sheet portion 116a which are connected to each other via a connection portion 116c. Between the first and second sheet portions 116a and 116b are fixed a vibration sensor 117 and a temperature sensor 118 which are positioned in this order away from the outer ring 111 (upward as viewed on the drawing). Further, a magnetism sensor 119 is fixed to the second sheet portion 116b on the inner ring 112 side thereof with a mold resin portion 120 interposed therebetween.

The vibration sensor 117, the temperature sensor 118 and the magnetism sensor 119 are each independently electrically connected to external control circuits via an external wiring 121 disposed in the connection portion 116c.

The vibration sensor 117 is disposed at a position close to the outer ring 111. The vibration sensor 117 is used to detect abnormal vibration or the like of the bearing and its incidental devices by converting vibration component given to the outer ring 111 to electrical signal and then transferring it to the control circuit.

The temperature sensor 118 is used to prevent seizing due to lack of lubricant or the like by always detecting ambient temperature data in the vicinity of the ball 113, the outer ring 111 and the inner ring 112 and then giving it to the control circuit.

The magnetism sensor 119 is disposed opposed to and out of contact with a multipolar magnet 122 described later and is used to detect the rotary speed, direction of rotation and rotary phase of the inner ring 112 by generating a pulsed electrical signal from magnetic force generated by the multipolar magnet 122 and then transferring it to the control circuit.

The vibration sensor 117, the temperature sensor 118 and the magnetism sensor 119 are disposed radially at the same position along the axial direction of the outer ring 111 and the inner ring 112.

The inner ring 112 has a main body 112a which rollably supports the ball 113 and an extension portion 112b disposed axially adjacent to the main body 112a. On the outer surface of the extension portion 112b is formed a stepped portion 112c at the same axial position as the vibration sensor 117, the temperature sensor 118 and the magnetism sensor 119 and to the stepped portion 112c is fixed a multipolar magnet 122 which is a detection member.

The multipolar magnet 122 is formed annularly. The multipolar magnet 122 has a plurality of magnetized S and N poles alternately circumferentially arranged on the outer surface thereof. The multipolar magnet 122 always generates magnetic force externally, and when it is rotated with the inner ring 112, magnetic force generated by the multipolar magnet 122 is given to the magnetism sensor 119 according to the rotary speed of the inner ring 112 so that the rotary speed of the inner ring 112 is detected.

The multipolar magnet 122, too, is disposed at the same axial position as the vibration sensor 117, the temperature sensor 118 and the magnetism sensor 119.

In the present embodiment, since the vibration sensor 117, the temperature sensor 118 and the magnetism sensor 119 fixed to the outer ring 111 and the multipolar magnet 122 fixed to the inner ring 112 are disposed at the same axial position in the space between the outer ring 111 and the inner ring 112, the detection of resonance, etc., the detection of ambient temperature data and the detection of the rotary speed of the inner ring 112 can be made without raising the width of the bearing 110.

Further, as a seal structure there may be used a contact seal member, labyrinth seal or the like. Moreover, as a rolling element there may be used a roller or tapered roller. Further, a plurality of sensors may be mounted on the inner ring or outer ring with a retaining member in such an arrangement that it protrudes from the space between the inner ring and the outer ring.

Sixth Embodiment

Figure 7:
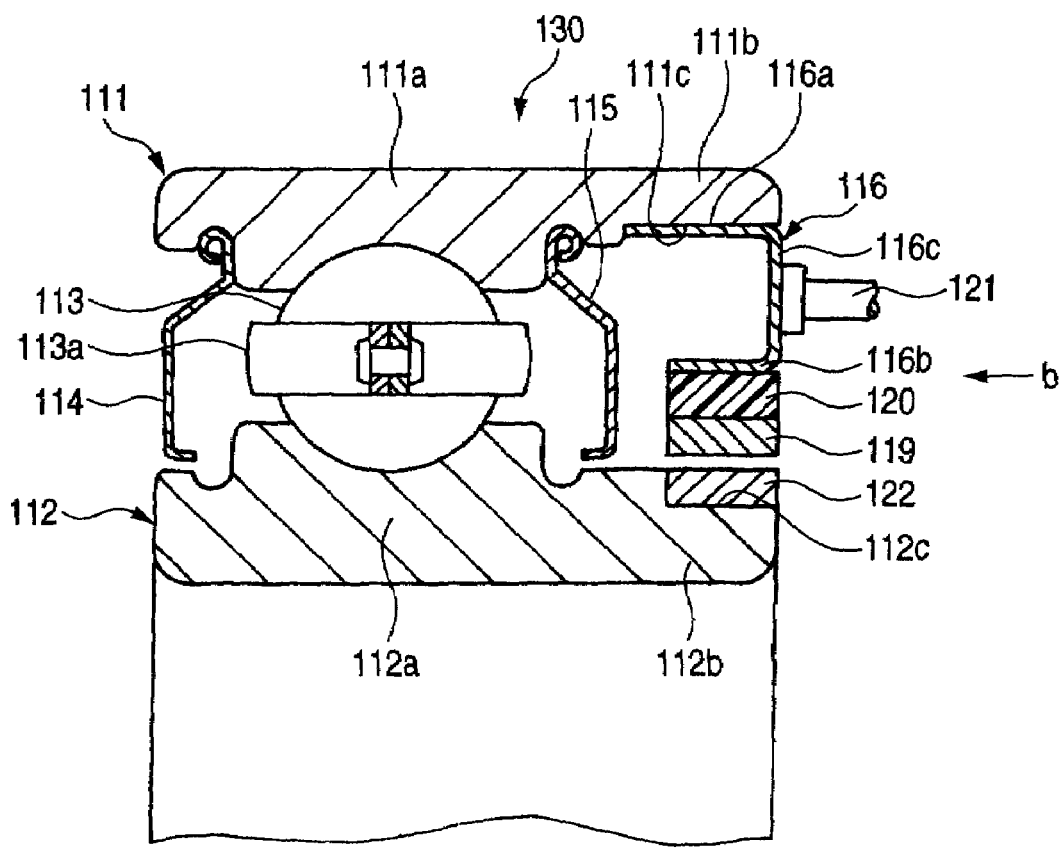
FIG. 7(a) is an enlarged view of an essential part of a sixth embodiment and FIG. 7(b) is a diagram as viewed in the direction indicated by the arrow b in FIG. 7(a).
Figure 7:
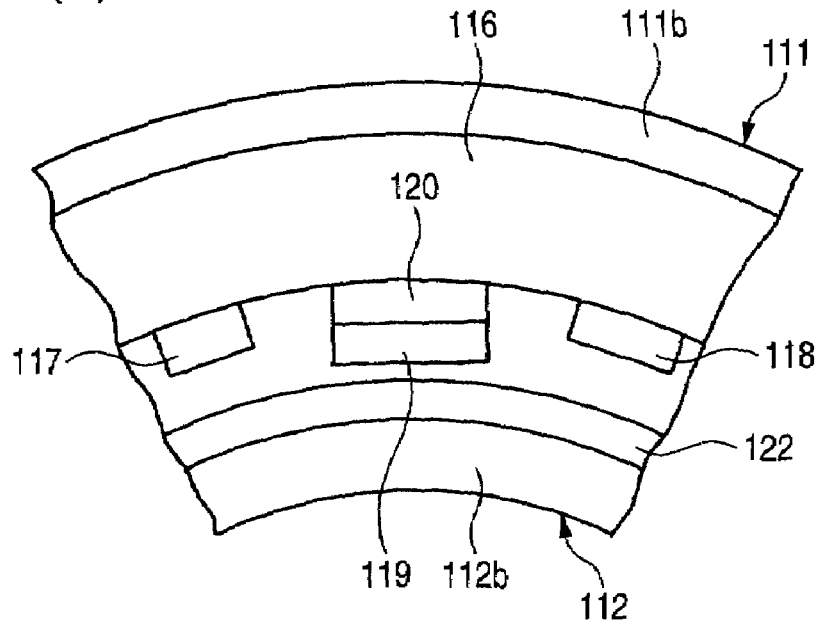

FIGS. 7(a) and 7(b) each illustrate a rolling bearing 130 with sensor of a sixth embodiment of implementation of the present invention. In the embodiments described below, the description of members having the same configuration and action as that of the members already described will be simplified or omitted by providing them with the same or similar reference numerals or signs in the drawings.

FIG. 7(b) is a diagram as viewed in the direction indicated by the arrow b in FIG. 7(a). In the present embodiment, the vibration sensor 117, the temperature sensor 118 and the magnetism sensor 119 are disposed at a position which is the same along the axis of the outer ring 111 but deviated from each other along the circumference of the outer ring 111.

The present embodiment is effective even when the space between the inner ring and the outer ring is small, and the diameter of the bearing can be reduced.

As the retaining member 116 there may be used one having a section which is not U-shaped or one having a U-shaped section the clearance between the first sheet portion 116a and the second sheet portion 116b of which is so small that no sensors can be disposed.

Further, as a seal structure there may be used a contact seal member, labyrinth seal or the like. Moreover, as a rolling element there may be used a roller or tapered roller. Further, a plurality of sensors may be mounted on the inner ring or outer ring with a retaining member in such an arrangement that it protrudes from the space between the inner ring and the outer ring.

Seventh Embodiment

Figure 8:
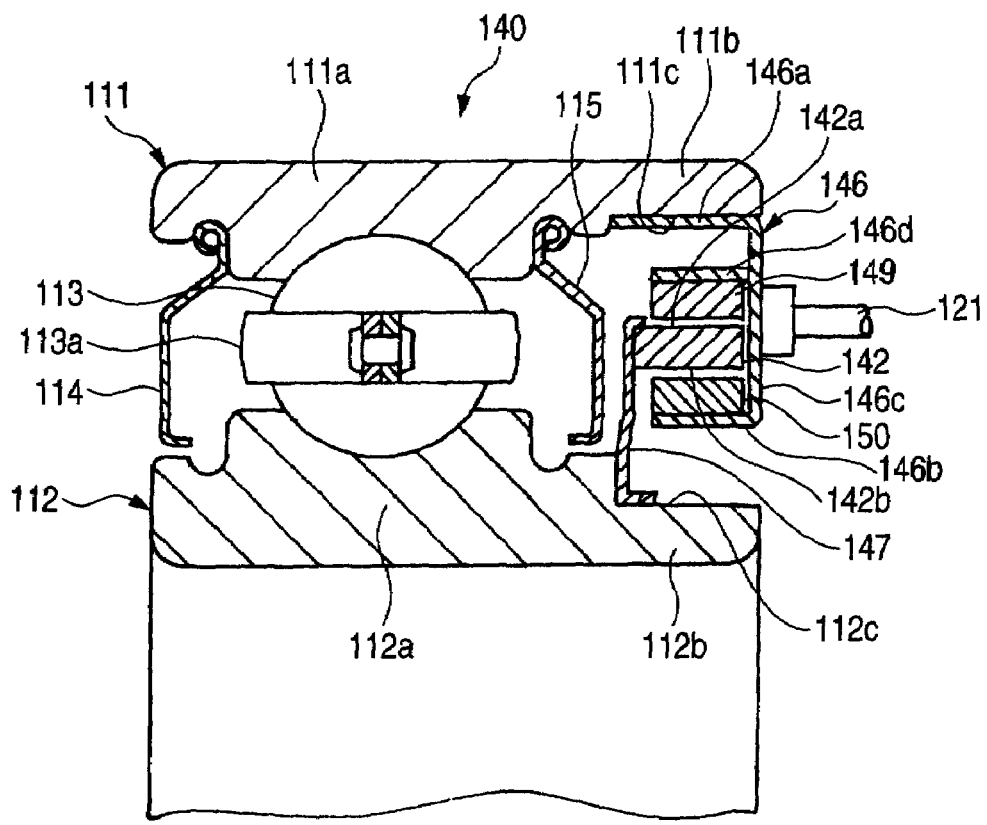
FIG. 8 is an enlarged view of an essential part of a seventh embodiment.

FIG. 8 illustrates a rolling bearing 140 with sensor of a seventh embodiment of implementation of the present invention. In the present embodiment, too, the outer ring 111 is a stationary ring and the inner ring 112 is a rotary ring.

In the present embodiment, a retaining member 146 is fixed to a stepped portion 111c in the extension portion 111b of the outer ring 111. The retaining member 146 has a first sheet portion 146a fixed to the stepped portion 111c, a second sheet portion 146b disposed radially apart from the first sheet portion 146a and a third sheet portion 146d disposed between the first sheet portion 146a and the second sheet portion 146b which are connected to each other via a connection portion 146c.

To the third sheet portion 146d on the second sheet portion 146b side thereof is fixed a first magnetism sensor 149. Further, to the second sheet portion 146b on the third sheet portion 146d side thereof is fixed a second magnetism sensor 150.

The first magnetism sensor 149 and the second magnetism sensor 150 are disposed radially apart from each other. Between the first magnetism sensor 149 and the second magnetism sensor 150 is disposed as a detection member a multipolar magnet 142 radially opposed to and out of contact with the first magnetism sensor 149 and the second magnetism sensor 150. The multipolar magnet 142 is fixed to the inner ring 112 by the magnet retaining member 147. The magnetic retaining member 147 is fixed to a stepped portion 112c in the extension portion 112b of the inner ring 112 at the base end thereof. The forward end of the magnet retaining member 147 engages with the outer surface of the multipolar magnet 142.

Figure 9:
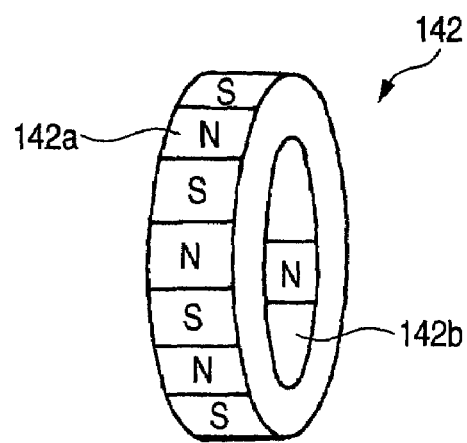
FIG. 9 is an external perspective view of a multipolar magnet used in the seventh embodiment.

As shown in FIG. 9, the multipolar magnet 142 is formed annularly. On the outer surface of the multipolar magnet 142 is formed a first magnetized portion 142a having a plurality of S and N poles alternately arranged circumferentially. On the inner surface of the multipolar magnet 142 is formed a second magnetized portion 142b having a single N pole disposed at a predetermined position.

The magnetic force which the first magnetized portion 142a of the multipolar magnet 142 generates externally is given to the first magnetism sensor 149 and the magnetic force which the second magnetized portion 142b of the multipolar magnet 142 generates externally is given to the second magnetism sensor 150. The first magnetism sensor 149 is used to detect the rotary speed of the inner ring 112 and the second magnetism sensor 150 is used to detect the phase of the inner ring 112. As the first and second magnetism sensors 149 and 150 there may be used a hall element or the like.

In the present embodiment, too, since the first magnetism sensor 149 and the second magnetism sensor 150 fixed to the out ring 111 and the multipolar magnet 142 fixed to the inner ring 112 are disposed at the same axial position, the detection of the rotary speed and phase of the inner ring 112 can be made without raising the width of the bearing.

Further, as a seal structure there may be used a contact seal member, labyrinth seal or the like. Moreover, as a rolling element there may be used a roller or tapered roller. Further, a plurality of sensors may be mounted on the inner ring or outer ring with a retaining member in such an arrangement that it protrudes from the space between the inner ring and the outer ring.

Eighth Embodiment

Figure 10:
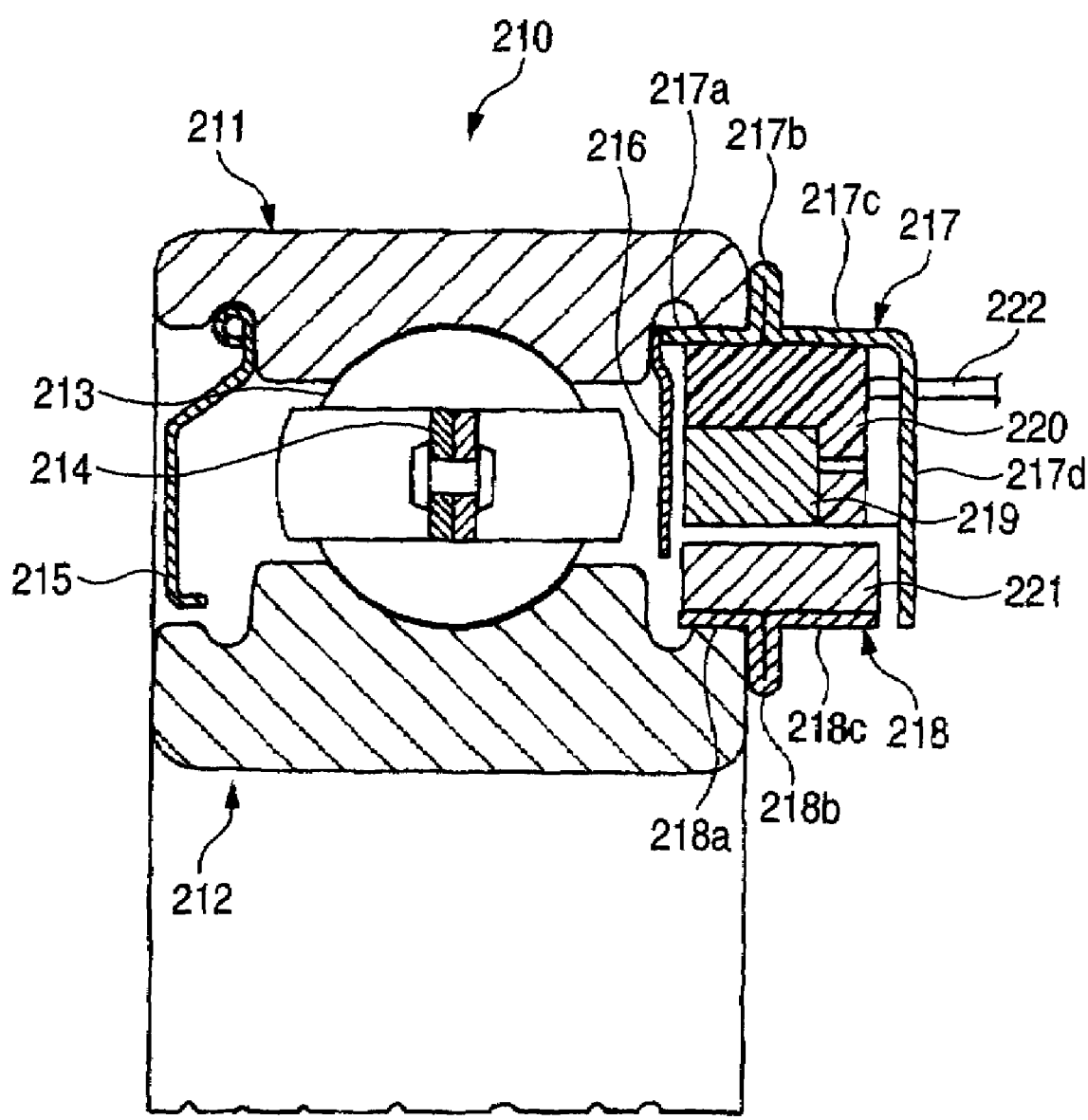
FIG. 10 is an enlarged view of an essential part of an eighth embodiment.

FIG. 10 illustrates a rolling bearing 210 with sensor of an eighth embodiment of implementation of the present invention. The rolling bearing 210 with sensor comprises a plurality of balls (rolling elements) 213 provided interposed between an outer ring 211 and an inner ring 212. The plurality of balls 213 are rollably retained circumferentially apart from each other by a retainer 214. Herein, the outer ring 211 is a stationary ring and the inner ring 212 is a rotary ring.

On one axial side of the rolling bearing 210 (left side as viewed on the drawing) is provided a seal member 215. The seal member 215 is fixed to the outer ring 211 at the base end thereof (outer periphery). The forward end (inner periphery) of the seal member 215 doesn't come in contact with the inner ring 212 and the seal member 215 is a noncontact seal member. Though not shown, a contact seal member may be used.

On the other axial side of the rolling bearing 210 (right side as viewed on the drawing) is provided an interposing side wall 216 extending radially from the inner surface of the outer ring 211 toward the inner ring 212. The interposing side wall 216 is formed annularly and is fitted in a seal groove on the outer ring 211 at the outer periphery thereof. Further, to the outer ring 211 is fixed a first retaining member 217 and to the inner ring 212 is fixed a second retaining member 218.

The interposing side wall 216, the first retaining member 217 and the second retaining member 218 are each made of a material capable of blocking magnetic flux such as magnetic material. As such a magnetic material there may be used SPCC material or a martensite or ferrite stainless steel material.

The first retaining member 217 has a cylindrical mounting portion 217a fitted on the inner surface of the outer ring 211, a flange portion 217b connected to the mounting portion 217a extending outward radially along the end surface of the outer ring 211, an extension portion 217c connected to the flange portion 217b extending axially at the same radial position as the mounting portion 217a and a side wall 217d connected to the axial end of the extension portion 217c extending inward radially. The mounting portion 217a comes in contact with the side of the interposing side wall 216 at the forward end thereof opposite the flange portion 217b (left side as viewed on the drawing). The interposing side wall 216 is clamped between the forward end of the mounting portion 217a and the shoulder of the seal groove on the outer ring 211.

On the inner surface of the mounting portion 217a and the extension portion 217c of the first retaining member 217 is retained a magnetism sensor 219 as a sensor. The magnetism sensor 219 is fixed to the first retaining member 217 with a resin block 220 interposed therebetween. The magnetism sensor 219 is surrounded on three sides, excluding radially inner side thereof, that is, on the axial side thereof closer to the ball 213 by the interposing side wall 216, on the radially outer side thereof by the mounting portion 217a and the extension portion 217c and on the axial side thereof opposite the ball 213 by the side wall 217d. The magnetism sensor 219 generates an electrical signal based on magnetic flux generated by a multipolar magnet 221 described later. The electrical signal is transferred to a control circuit which is not shown via an external wiring 222. The control circuit is used to amplify and regulate the waveform of the electrical signal so that it is converted to a pulsed rotary signal by which the rotary speed of the inner ring 212 is detected.

The second retaining member 218 has a cylindrical mounting portion 218a fitted on the outer surface of the inner ring 212, a flange portion 218b connected to the mounting portion 218a extending inward radially along the end surface of the inner ring 212 and an extension portion 218c connected to the flange portion 218b extending axially at the same radial position as the mounting portion 218a.

On the outer surface of the mounting portion 218a and the extension portion 218c of the second retaining member 218 is retained an annular multipolar magnet 221 as a detection member.

The multipolar magnet 221 has a plurality of magnetized S and N poles alternately circumferentially arranged on the outer surface thereof. The multipolar magnet 221 is disposed opposed to and out of contact with the radially inner side of the magnetism sensor 219 with a predetermined clearance interposed therebetween. The multipolar magnet 221 is surrounded on two sides thereof, excluding the radially outer side thereof and the axial side thereof closer to the ball 213, that is, on the axial side thereof opposite the ball 213 by the side wall 217d of the first retaining member 217 and on the radially inner side thereof by the mounting portion 218a and the extension portion 218c. The inner diameter of the interposing side wall 216 may be reduced (the interposing side wall 216 may be extended toward the inner ring 212) to block the axial side of the multipolar magnet 221 closer to the ball 213 by the interposing side wall 216. The multipolar magnet 221 always generates magnetic flux externally. The forward end of the side wall 217d of the first retaining member 217 is disposed close to but doesn't come in contact with the multipolar magnet 221 and the second retaining member 218.

In this arrangement, the interposing side wall 216, the first retaining member 217 and the second retaining member 218 form a rectangle as viewed in section and cover the magnetism sensor 219 and the multipolar magnet 221.

The flange portion 217b of the first retaining member 217 is bent in the form of U having no clearance and extends radially and one of the sides thereof comes in contact with the end surface of the outer ring 211. Even when a pressure load is applied to the flange portion 217b on the other side thereof to press the rolling bearing 210 with sensor into a housing which is not shown, the flange portion 217b undergoes no deformation because it is supported by the end surface of the outer ring and the pressure load is transferred to the outer ring 211 as it is. The flange portion 218 b of the second retaining member 218, too, has the same action.

In accordance with the rolling bearing 210 with sensor having the aforementioned arrangement, the magnetism sensor 219 and the multipolar magnet 221 are surrounded by the interposing side wall 216, the first retaining member 217 and the second retaining member 218, which act as noise shield, making it possible to block magnetic flux leaked from devices such as electric motor and high frequency power supply. Accordingly, the resistance to leaked magnetic flux can be enhanced to obtain a high precision in detection by the magnetism sensor 219. Further, magnetism generated by the multipolar magnet 221 can be surely caught by the magnetism sensor 219 to obtain a high precision in detection by the magnetism sensor 219.

Further, since the interposing side wall 216 is provided on the side of the magnetism sensor 219 and the multipolar magnet 221 closer to the ball 213, leaked magnetic flux which acts in the direction from the ball 213 toward the magnetism sensor 219 and the multipolar magnet 221, too, can be blocked and the effect of the lubricant in the bearing space on the magnetism sensor 219 can be prevented.

Moreover, by retaining the magnetism sensor 219 and the multipolar magnet 221 by the first retaining member 217 and the second retaining member 218 such that the magnetism sensor 219 and the multipolar magnet 221 are disposed radially opposed to each other, the axial width of the entire rolling bearing 210 with sensor is reduced.

In the present embodiment, as a sensor there may be used a temperature sensor or vibration sensor. Further, as a multipolar magnet there may be used one having a first portion and a second portion having different magnetization patterns, the second portion being axially adjacent to the first portion. The first portion may have a plurality of S and N poles alternately arranged circumferentially and the second portion may have S and N poles arranged circumferentially only at one position. In this case, the magnetism sensor, too, may be arranged to have a first portion and a second portion.

Further, the magnetism sensor 219 may be provided with a transmitter and the control circuit may be provided with a receiver so that wireless communication can be made possible to omit the external wiring 222 for signal transmission.

Ninth Embodiment

Figure 11:
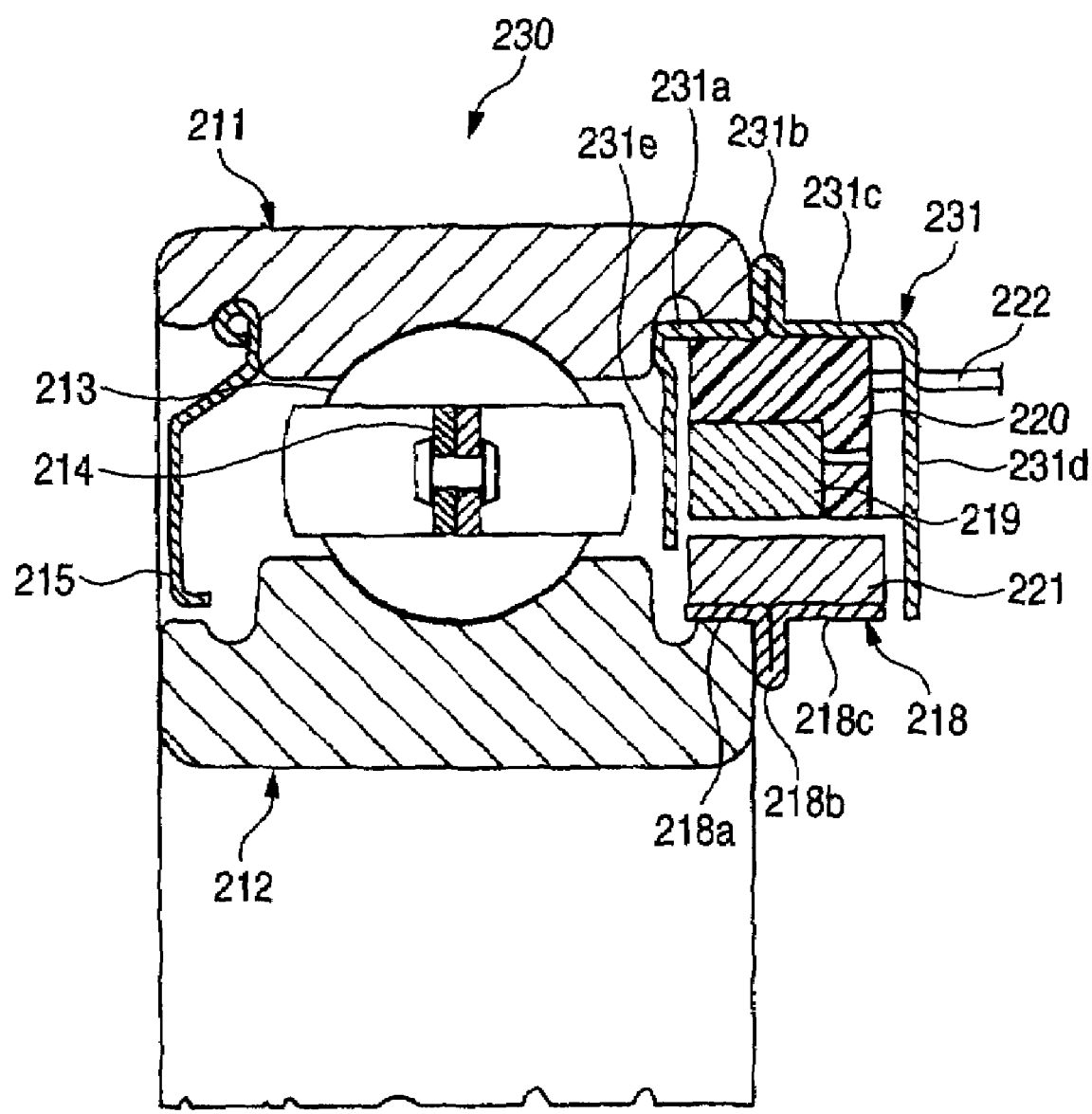
FIG. 11 is an enlarged view of an essential part of a ninth embodiment.

FIG. 11 is a diagram illustrating a rolling bearing 230 with sensor according to a ninth embodiment of implementation of the present invention. In the rolling bearing 230 with sensor of the present embodiment, an interposing side wall 231e is formed integrally with a first retaining member 231. Other configurations are similar to that of the rolling bearing with sensor of the eighth embodiment. Even the configuration of the present embodiment can exert the same effect as the eighth embodiment.

Tenth Embodiment

Figure 12:
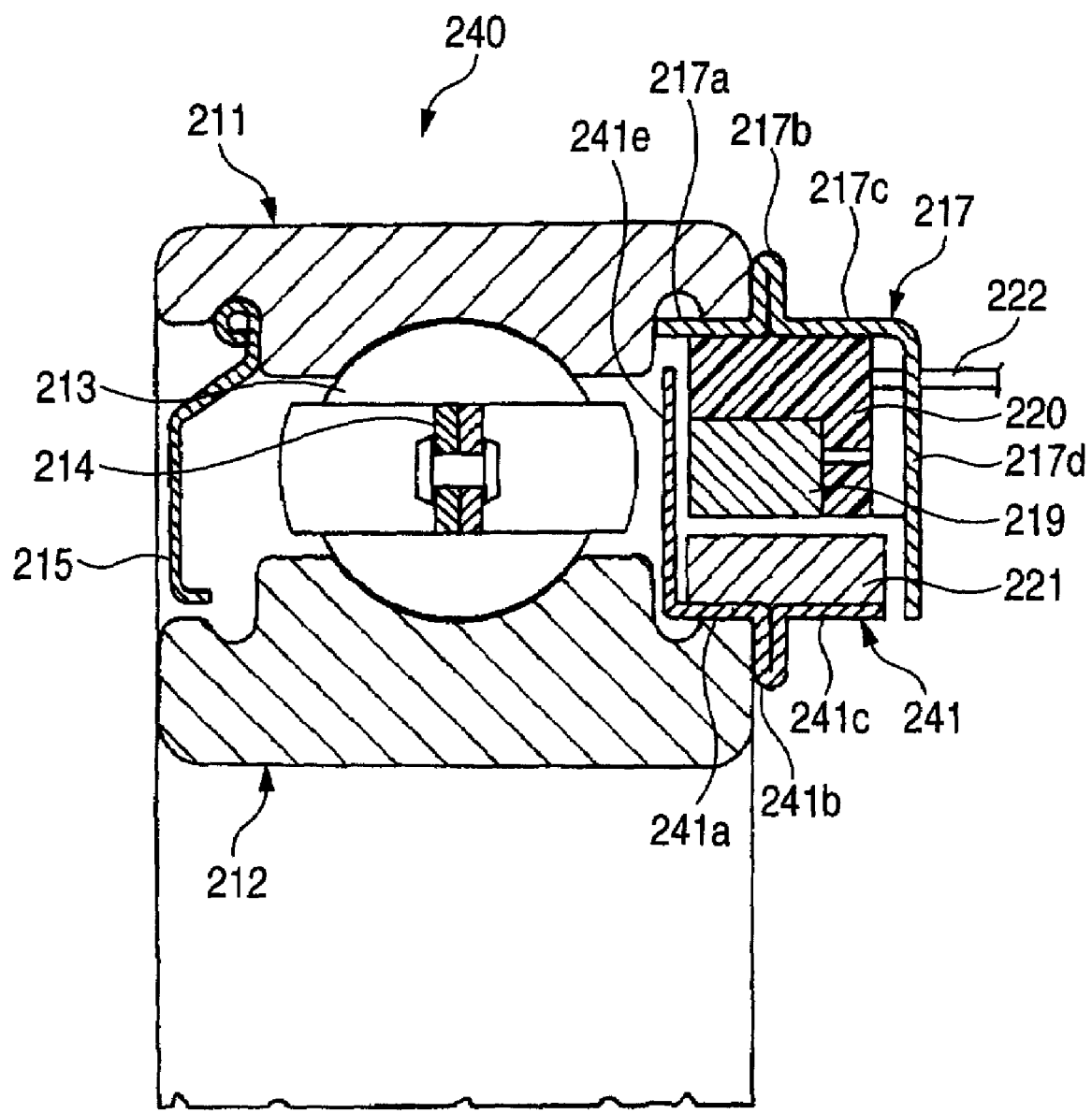
FIG. 12 is an enlarged view of an essential part of a tenth embodiment.

FIG. 12 is a diagram illustrating a rolling bearing 240 with sensor according to a tenth embodiment of implementation of the present invention. In the rolling bearing 240 with sensor of the present embodiment, an interposing side wall 241e is formed integrally with a first retaining member 241. Other configurations are similar to that of the rolling bearing with sensor of the eighth embodiment. Even the configuration of the present embodiment can exert the same effect as the eighth embodiment.

Eleventh Embodiment

Figure 13:
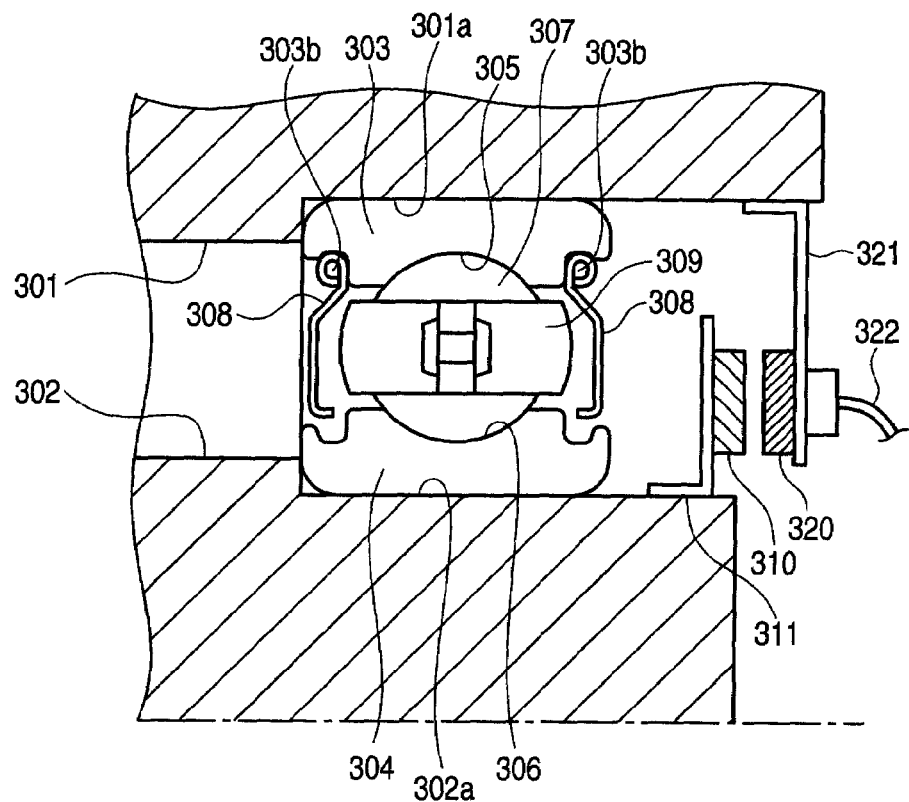
FIG. 13 illustrates a deep groove ball bearing as a rolling device comprising a rotary state detecting device according to an eleventh embodiment of implementation of the present invention incorporated therein.

An eleventh embodiment of implementation of the present invention will be described hereinafter in detail in connection with FIGS. 13 to 16. FIG. 13 illustrates a deep groove ball bearing as a rolling device having a rotation detecting device according to the eleventh embodiment of implementation of the present invention incorporated therein. The deep groove ball bearing has an outer ring 303, an inner ring 304, a plurality of balls 307 as rolling element, a seal ring 308 and a retainer 309.

The outer ring 303 is fixed to the inner surface 301a of a housing 301 as a stationary member. The outer ring 303 is produced by subjecting a metallic material such as carbon steel to forging or the like. The outer ring 303 has an outer ring race 305 provided on the inner surface thereof for guiding the ball 307.

The inner ring 304 is produced by subjecting a metallic material such as carbon steel to forging or the like similarly to the outer ring 303. The inner ring 304 is fitted on the outer surface 302a of a shaft 302 which is a rotary member. The inner ring 304 has an inner ring race 306 provided on the outer surface thereof corresponding to the outer ring race 305 of the outer ring 303 for guiding the ball 307. The inner ring 304 rotates integrally with the shaft 302 with the rotation of the shaft 302.

The balls 307 are arranged in a line between the outer ring race 305 of the outer ring 303 and the inner ring race 306 of the inner ring 304. The balls 307 roll over the outer ring 305 and the inner ring 306 with the rotation of the inner ring 304 accompanying the rotation of the shaft 302.

The seal ring 308 blocks and seals both the two openings of the space receiving the balls 307 between the outer ring 303 and the inner ring 304. The seal ring 308 prevents the entrance of dust, water content, foreign matters, etc. into the space receiving the balls and the leakage of lubricant from the space receiving the balls. The seal ring 308 is fixed at a fixing portion 303b formed on the inner surface of the outer ring 303.

The retainer 309 retains the balls 307 rollably between the outer ring race 305 and the inner ring race 306. As the retainer 309 there may be used a pressed cage, a machined cage, or the like.

On the outer surface 302a of the shaft 302 is provided standing an annular encoder retaining member 311. The encoder retaining member 311 extends from the outer surface 302a of the shaft 302 toward the housing 301, i.e., outward radially from the shaft 302. On the axial side of the encoder retaining member 311 is provided an encoder 310 facing axially.

On the other hand, on the inner surface 301a of the housing 301 is provided standing a sensor retaining member 321. The sensor retaining member 321 extends from the inner surface 301a of the housing 301 toward the shaft 302, i.e., inward radially from the housing 301. On the axial side of the sensor retaining member 321 is provided a single sensor 320. The sensor 320 is disposed axially opposed to the encoder 310.

Figure 14:
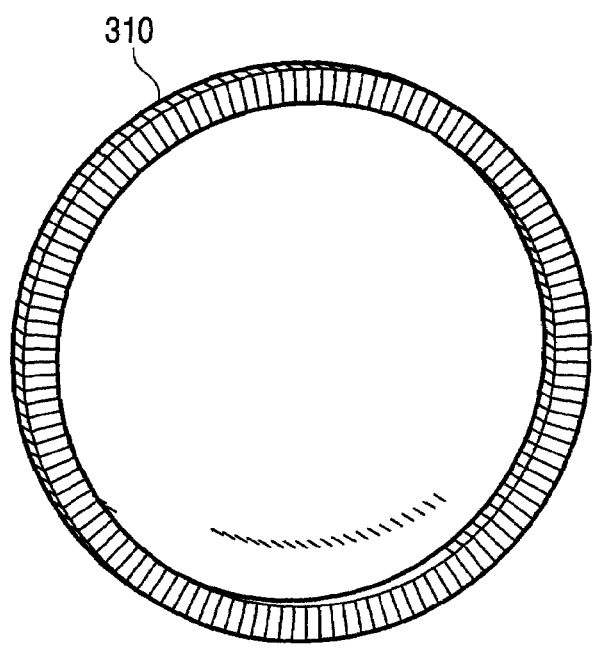
FIG. 14 is a perspective view illustrating an encoder 310.
Figure 15:
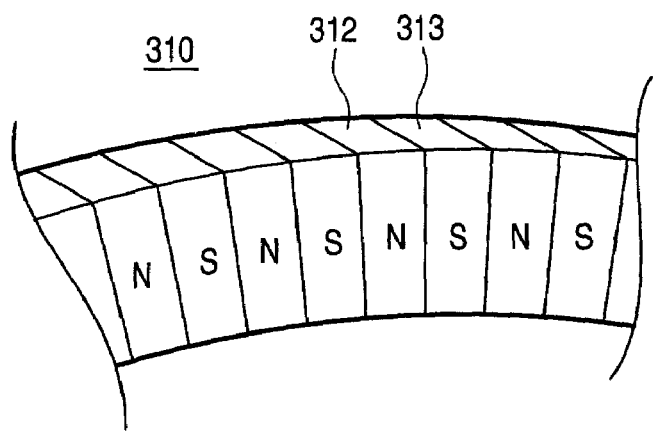
FIG. 15 is a partly enlarged view of the encoder 310.

FIG. 14 is a perspective view illustrating the encoder 310 and FIG. 15 is a partly enlarged view of FIG. 14. The encoder 310 has an annular shape having a greater width in the radial direction than in the axial direction. The encoder 310 is formed having a plurality of N poles 312 and S poles 313 alternately arranged annularly at an equal interval. The plurality of N poles 312 and S poles 313 are magnetized regions having different magnetic flux densities.

The magnetized regions constituting the encoder 310 each have a reference magnetized region having a certain minimum magnetic flux density. Further, the various magnetized regions each are given magnetic flux densities which increase from magnetized region to next magnetized region clockwise as viewed from the sensor 320 with the reference magnetized region as reference. In some detail, in the present embodiment, the various magnetized regions each are given magnetic flux densities.

$$A(k)=k \cdot Aref \quad \text{(Equation 1)}$$

A(k): Magnetic flux density of magnetized region k-th next clockwise to the reference magnetized region Aref: Magnetic flux density of the reference magnetized region In other words, the magnetic flux density of the magnetized region k-th next to the reference magnetized region is k times that of the reference magnetized region. Next to the magnetized region having a maximum magnetic flux region is disposed the reference magnetized region having a minimum magnetic flux density.

As the material of the encoder there may be used an alnico magnet, ferrite magnet, samarium-cobalt magnet, neodymium-iron-boron magnet or bonded magnet obtained by mixing various magnet powders with a plastic or the like, molding the mixture and solidifying the molded material. Since the magnetic flux density of the various magnetized regions need to be different, the bonded magnet, which can easily be designed to have any magnetic flux density, is preferably used. Herein, a bonded magnet made of a ferrite powder-containing plastic is used. The magnetic force of a magnet changes with temperature. Therefore, it is necessary that the magnetization intensity be determined such that the peak of a magnetized region is not the same as that of another under the working temperature conditions.

The N pole 312 and S pole 313 thus arranged each form therearound a magnetic field having an intensity corresponding to the polarity and magnetic flux density thereof. Accordingly, a magnetic field corresponding to the intensity of magnetic flux density of N pole 312 and S pole 313 is formed around the encoder 310. The position (disposition angle) of the reference magnetized region of the encoder 310 is stored as a reference of the absolute angle of the shaft in a control circuit which is not shown.

The sensor 320 is a magnetism sensor which detects the magnetic field formed by the encoder 310. The sensor 320 is disposed close to the surface of the encoder 310 and is capable of sensing the magnetic field formed by the various magnetized regions. As the sensor 320 there may be used one capable of detecting magnetic field such a shall element and coil. Herein, description will made with reference to the case where a hall element is used by way of example. A hall element is an element which generates electric current according to the intensity and direction of magnetic flux crossing the hall element.

The encoder 310 rotates with the rotation of the shaft 302. The sensor 320 outputs electric current value according to the intensity and direction of magnetic flux formed by N pole 312 and S pole 313 positioned opposed to the sensor 320 to a control circuit which is not shown via a cable 322.

Figure 16:
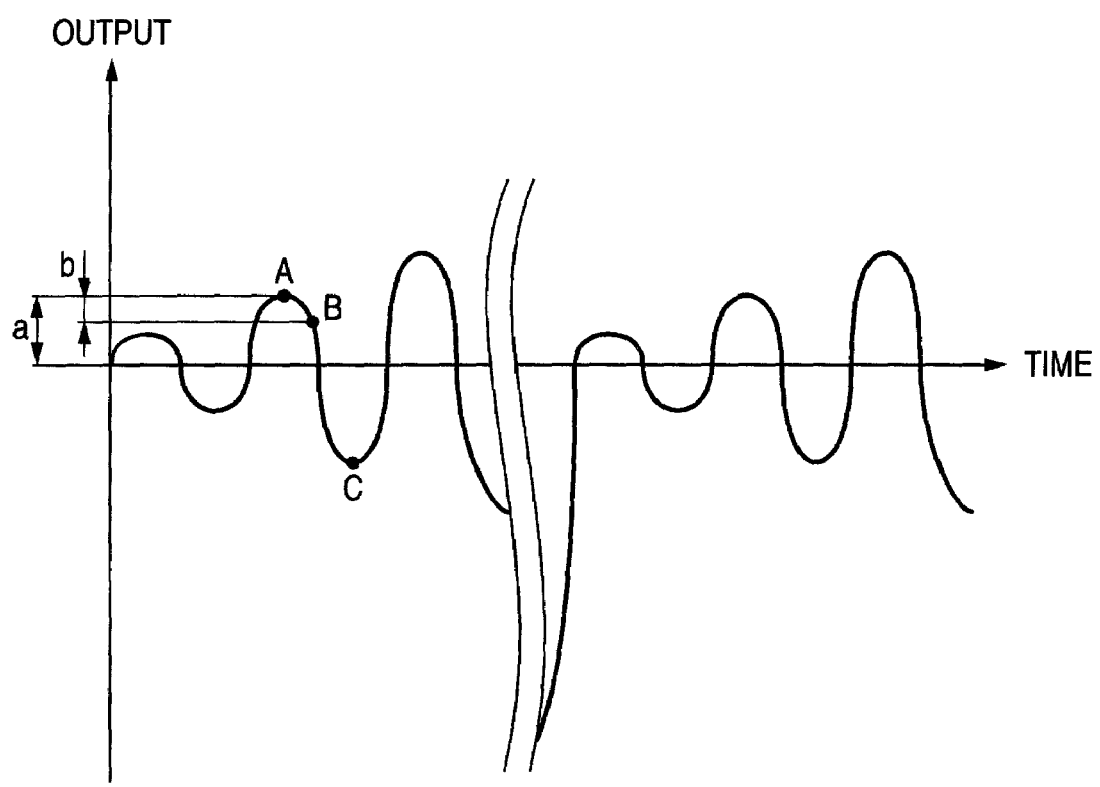
FIG. 16 is a graph illustrating an output signal detected by a sensor 320.

FIG. 16 is a graph illustrating the output signal detected by the sensor 320. In FIG. 16, the ordinate indicates the intensity of output signal and the abscissa indicates time. The magnitude of the output signal is proportional to the intensity of magnetic flux and the sign of output signal is determined by the direction of magnetic flux. Herein, the pulse which appears on the leftmost in FIG. 16 is a pulse generated by the magnetic flux formed by the reference magnetized region. FIG. 16 shows that the absolute value of the intensity of pulse peak increases with time. Accordingly, in the case of FIG. 16, the control circuit judges that the shaft 302 rotates in the direction of increase of the intensity of N pole 312 or S pole 313, i.e., counterclockwise as viewed from the sensor 320. Then, the control circuit counts the number of peaks detected per unit time and calculates the rotary speed on the basis of the counted number of peaks and the interval at which the magnetized regions are disposed.

Further, the control circuit determines the absolute angle of the shaft on the basis of the peak intensity. In the case where the peak (point A or C in FIG. 16) of the sensor is detected, the control circuit judges that the magnetized region corresponding to the output thus detected is disposed opposed to the sensor 320. Then, the control circuit judges that the shaft is positioned at the absolute angle corresponding to the magnetized region thus detected. Alternatively, in the case where the output of the sensor is the value at point B in between the peaks, the absolute angle of point B is calculated from the ratio of intensity at point A, which is the immediately previous peak, to the difference between the intensity at point A and at point B. In some detail, the angle at point B is calculated by the following equation.

$$\theta(B)=\theta(A)+180 b/a \cdot n \quad \text{(Equation 2)}$$

θ(A): Absolute angle at point A

θ(B): Absolute angle at point B a: Output intensity at point A b: Difference between output intensity at point A and at point B n: Total number of magnetized regions disposed on encoder As mentioned above, in accordance with the present embodiment, the encoder 310 and the sensor 320 are disposed axially opposed to each other. Further, the encoder 310 is formed by a plurality of N poles 312 and S poles 313 arranged such that the magnetic flux density gradually increases. Accordingly, the single sensor 320 can be used to detect the speed, direction and angle of rotation of the shaft 302 at the same time.

Accordingly, the speed, direction and angle of rotation of the shaft can be detected by a simple structure, making it possible to reduce the number of parts and hence the part cost. Further, the reduction of the number of parts improves assemblability, making it possible to reduce the assembly cost as well.

Further, since only one sensor is required, the space in the bearing can be saved, making more compact design possible as a whole. Moreover, the reduction of the number of sensors leads to the reduction of the weight of the bearing as well, contributing to the reduction of fuel consumption if the bearing is used for automobile or the like.

While the present embodiment has been described with reference to the case where the magnetic flux density of the magnetized regions gradually increases, a plurality of magnetized region groups the magnetic flux density of which gradually increases may be prepared and arranged in a line. In this case, by counting the number of times by which the magnetic flux of the reference magnetized region contained in the respective magnetized region group is detected, the absolute angle of magnetic flux can be unequivocally determined.

Further, the plurality of magnetized region groups may be arranged such that only the intensity of the reference magnetized regions are made different. In this case, the absolute angle can be determined with the intensity of the reference magnetized region which has just been detected as reference.

Even when the magnetized regions are arranged such that the magnetic flux density gradually decreases, the same effect can be exerted.

Twelfth Embodiment

A twelfth embodiment of implementation of the present invention will be described hereinafter in connection with FIGS. 17 and 18. Herein, the same members as mentioned in the eleventh embodiment will be given the same reference numerals and signs and their description will be omitted.

Figure 17:
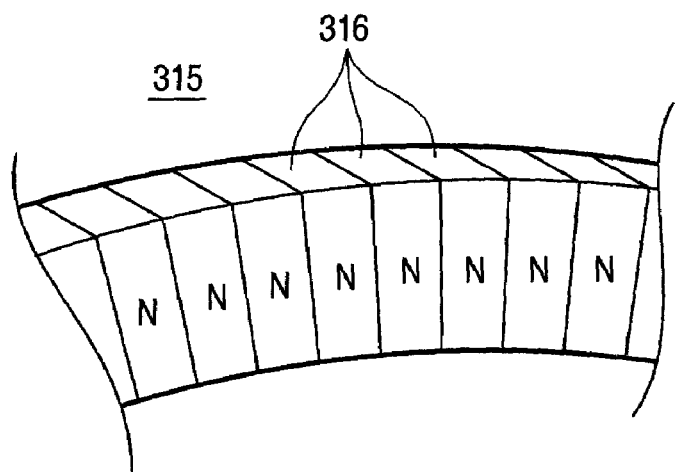
FIG. 17 is a partly enlarged view of an encoder 315 used in a rotary state detecting device according to a twelfth embodiment of implementation of the present invention.

FIG. 17 is a partly enlarged view of an encoder 315 used in a rotation detection device according to the twelfth embodiment of implementation of the present invention. In the present embodiment, the encoder 315 is disposed opposed to a sensor 320 similar to the encoder 310.

The encoder 315 has an annular shape having a predetermined axial width. The sensor-opposing surface of the encoder 315 is formed by arranging a plurality of N poles 316 annularly at an equal interval. The plurality of N poles 316 are magnetized regions having different magnetic flux densities. A back side of the sensor-opposing surface is magnetized by S pole.

The magnetized regions constituting the encoder 315 have a reference magnetized region having a minimum magnetic flux density. The various magnetized regions each are given magnetic flux densities which increase from magnetized region to next magnetized region clockwise as viewed from the sensor 320 with the reference magnetized region as reference. In some detail, in the present embodiment, the various magnetized regions each are given magnetic flux densities according to Equation 1 as in the eleventh embodiment.

Thus, N poles 316 thus arranged form therearound a magnetic field having an intensity corresponding to the respective polarity and magnetic flux density. Accordingly, a magnetic field corresponding to the intensity of magnetic flux density of N pole is formed around the encoder 315. The position (disposition angle) of the reference magnetized region of the encoder 315 is stored in a control circuit which is not shown as a reference of the absolute angle of the shaft.

The encoder 315 rotates with the rotation of the shaft 302. The sensor 320 outputs electric current value according to the intensity and direction of magnetic flux formed by N pole 316 positioned opposed to the sensor 320 to a control circuit which is not shown via a cable 322.

Figure 18:
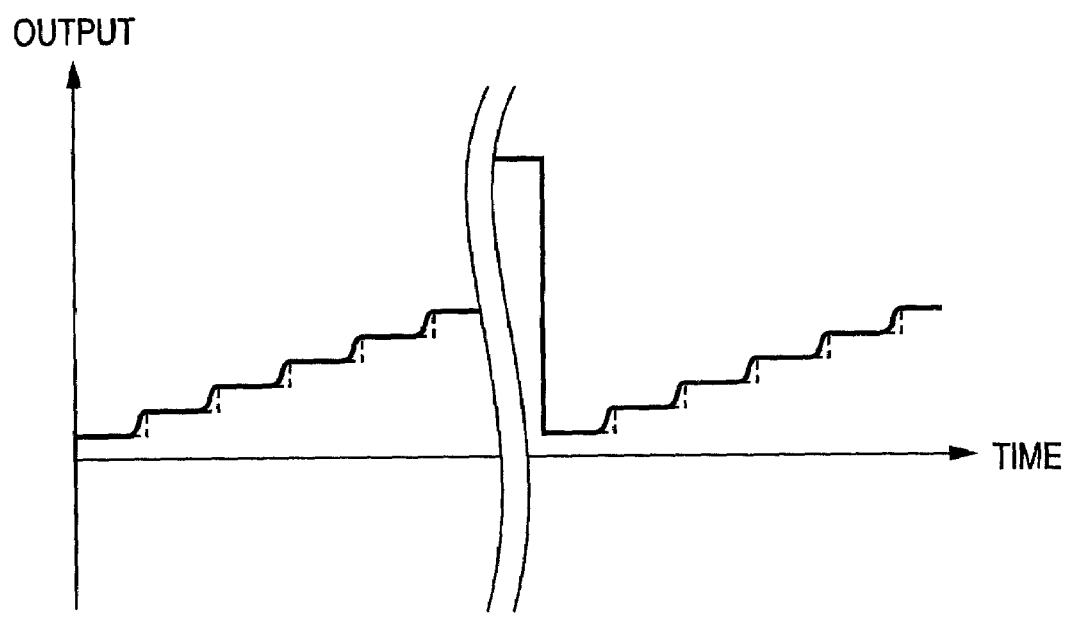
FIG. 18 is a graph illustrating an output signal detected by the sensor 320.

FIG. 18 is a graph illustrating the output signal detected by the sensor 320. In FIG. 18, the ordinate indicates the intensity of output signal and the abscissa indicates time. The magnitude of the output signal is proportional to the intensity of magnetic flux and the sign of output signal is determined by the direction of magnetic flux. Herein, the pulse which appears on the leftmost in FIG. 18 is a pulse generated by the magnetic flux formed by the reference magnetized region. FIG. 18 shows that the intensity of pulse peak increases stepwise with time. Accordingly, in the case of FIG. 18, the control circuit judges that the shaft 302 rotates in the direction of increase of the intensity of N pole 316, i.e., counterclockwise as viewed from the sensor 320. Then, the control circuit counts the number of peaks detected per unit time and calculates the rotary speed on the basis of the counted number of peaks and the interval at which the magnetized regions are disposed.

Further, the control circuit determines the absolute angle of the shaft on the basis of the intensity of pulse peak. In the present embodiment, the output pulse of the sensor 320 has a flat gentle peak. Accordingly, the angle resolution is deteriorated as compared with the eleventh embodiment. The control circuit has a threshold value corresponding to the disposition angle of the various magnetized regions. Further, when the control circuit detects that the value detected exceeds the threshold value, it is judged that the encoder passes by the corresponding angle.

As mentioned above, in accordance with the present embodiment, the encoder 315 and the sensor 320 are disposed axially opposed to each other. Further, the sensor-opposing surface of the encoder 315 is formed by a plurality of N poles arranged such that the magnetic flux density gradually increases. Accordingly, the single sensor 320 can be used to detect the speed, direction and angle of rotation of the shaft 302 at the same time, making it possible to exert the same effect as in the eleventh embodiment.

In the present embodiment, since the sensor-opposing surface of the encoder is formed by only N poles the magnetic flux density of which gradually increase, the peak value thus detected is flat. Accordingly, as compared with the case where there is only one peak value, the percent occurrence of peak detection error is reduced, making it possible to detect peak with a higher reliability.

While the present embodiment has been described with reference to the case where the sensor-opposing surface of the encoder is formed by N poles, the sensor-opposing surface of the encoder may be formed by S poles. In this case, the detection of rotary speed, direction of rotation and absolute angle is made in the same manner as in the present embodiment except that the sign of output signal is inverted.

Thirteenth Embodiment

A thirteenth embodiment of implementation of the present invention will be described in detail in connection with FIGS. 19 and 20. Herein, the same members as mentioned in the eleventh or twelfth embodiment will be given the same reference numerals and signs and their description will be omitted.

Figure 19:
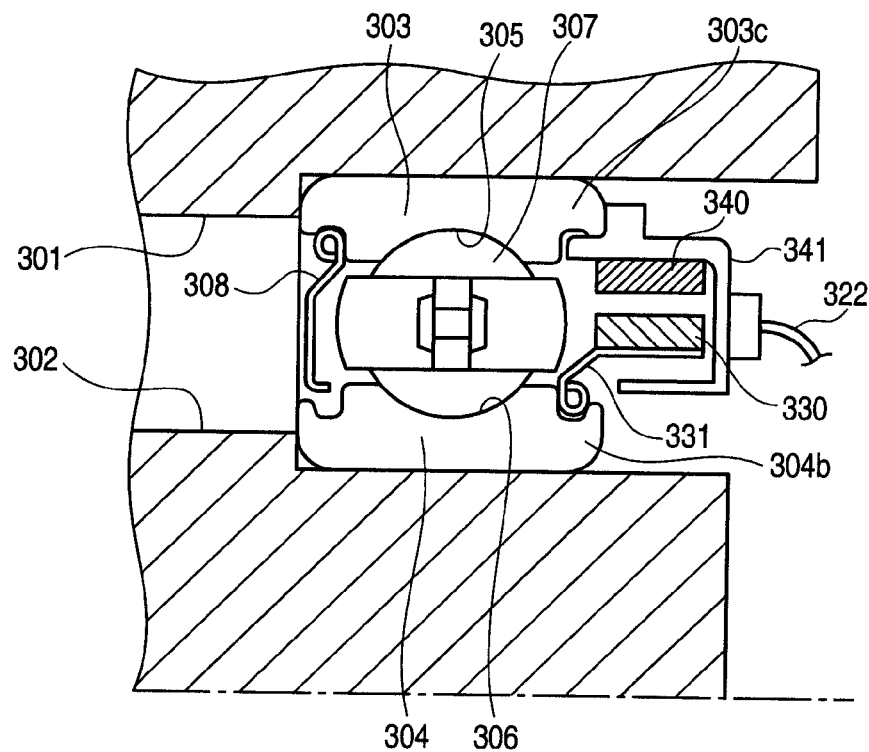
FIG. 19 illustrates a deep groove ball bearing as a rolling device comprising a rotary state detecting device according to a thirteenth embodiment of implementation of the present invention incorporated therein.

FIG. 19 illustrates a deep groove ball bearing as a bearing with sensor having a rotation detecting device according to the thirteenth embodiment of implementation of the present invention incorporated therein. The deep groove ball bearing has an outer ring 303, an inner ring 304, a plurality of balls 307 as rolling element, a seal ring 308 and a retainer 309.

In the present embodiment, the seal ring 308 blocks and seals one of both-end openings of the space receiving the balls 307 between the outer ring 303 and the inner ring 304. The other of both-end openings of the space receiving the balls 307 is blocked and sealed by an encoder retaining member 331 and a sensor retaining member 341.

The sensor retaining member 341 is an annular member having a C-shaped section with two parallel ends. The sensor retaining member 341 is fixed to the axial end 303c of the outer ring 303 and protrudes axially from the outer ring 303. On the radially inner side of the sensor retaining member 341 is disposed a sensor 340 facing radially.

The encoder retaining member 331 is an annular member having a L-shaped section. The encoder retaining member 331 is fixed to the axial end 304b of the inner ring 304 and protrudes axially from the inner ring 304. The forward end of the sensor retaining member 341 is disposed between both the two ends of the sensor retaining member 341. The encoder retaining member 331 and the sensor retaining member 341 play the same role as the seal ring 308 in cooperation with each other. On the radial side of the encoder retaining member 331 is disposed an encoder 330. The encoder 330 is disposed radially opposed to the sensor 340.

Figure 20:
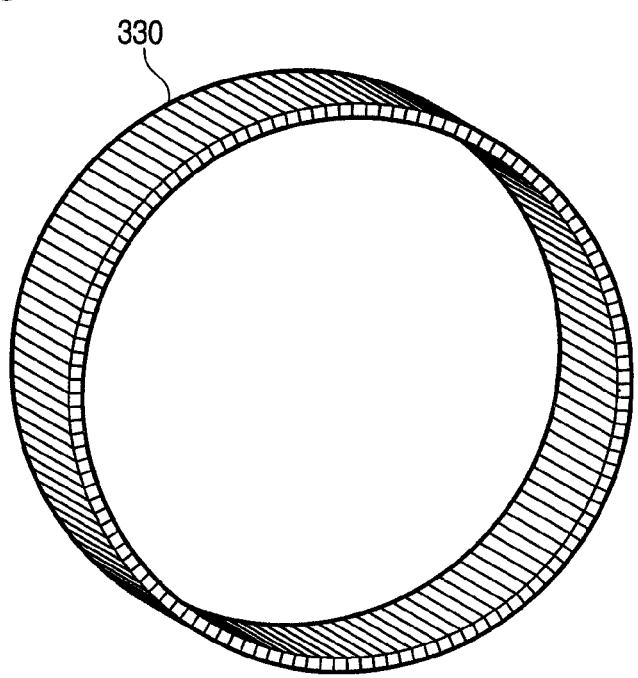
FIG. 20 is a perspective view illustrating an encoder 330.
Figure 21:
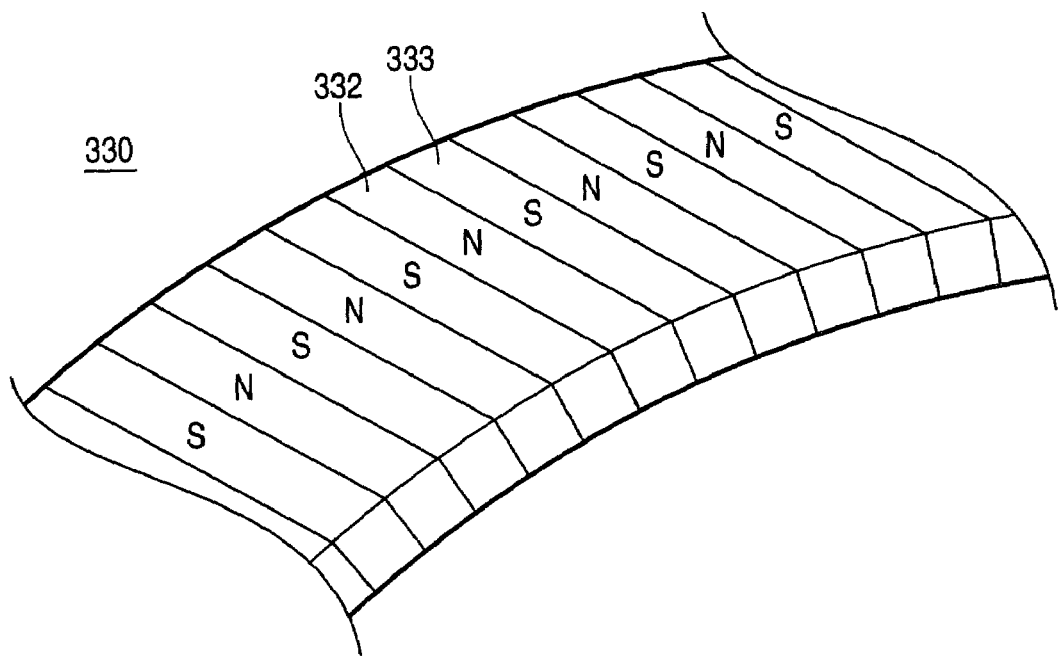
FIG. 21 is a partly enlarged view of the encoder 330.

FIG. 20 is a perspective view illustrating the encoder 330 and FIG. 21 is a partly enlarged view of FIG. 20. The encoder 330 has an annular shape having a greater width in the axial direction than in the radial direction. The encoder 330 is formed having a plurality of N poles 332 and S poles 333 alternately arranged annularly at an equal interval. The plurality of N poles 332 and S poles 333 are magnetized regions having different magnetic flex densities.

The magnetized regions constituting the encoder 330 each have a reference magnetized region having a certain minimum magnetic flux density. Further, the various magnetized regions each are given magnetic flux densities which increase from magnetized region to next magnetized region clockwise as viewed from the ball 307 with the reference magnetized region as reference. The magnetic flux density of the various magnetized regions in the present embodiment is as represented by Equation 1 as mentioned above.

The N pole 332 and S pole 333 thus arranged each form therearound a magnetic field having an intensity corresponding to the polarity and magnetic flux density thereof. Accordingly, a magnetic field corresponding to the intensity of magnetic flux density of N pole 332 and S pole 333 is formed around the encoder 330. The position (disposition angle) of the reference magnetized region of the encoder 330 is stored as a reference of the absolute angle of the shaft in a control circuit which is not shown.

The sensor 340 is a magnetism sensor which detects the magnetic field formed by the encoder 330. The sensor 340 is disposed close to the surface of the encoder 330 and is capable of sensing the magnetic field formed by the various magnetized regions. As the sensor 340 there may be used one similar to the sensor 320 of the eleventh embodiment.

The encoder 330 rotates with the rotation of the shaft 302. The sensor 340 outputs electric current value according to the intensity and direction of magnetic flux formed by N pole 332 and S pole 333 positioned opposed to the sensor 340 to a control circuit which is not shown via a cable 322.

The output signal detected by the sensor 320 is similar to that shown in FIG. 16. As in the eleventh embodiment, the magnitude of the output signal is proportional to the intensity of magnetic flux and the sign of output signal is determined by the direction of magnetic flux.

In this case, the control circuit judges that the shaft 302 rotates in the direction of increase of the intensity of N pole 332 or S pole 333, i.e., counterclockwise as viewed from the ball 307. Then, the control circuit counts the number of peaks detected per unit time and calculates the rotary speed on the basis of the counted number of peaks and the interval at which the magnetized regions are disposed.

Further, the control circuit determines the absolute angle of the shaft on the basis of the peak intensity. In the case where the peak (point A or C in FIG. 16) of the output of the sensor is detected, the control circuit judges that the magnetized region corresponding to the output thus detected is disposed opposed to the sensor 340. Then, the control circuit judges that the shaft is positioned at the absolute angle corresponding to the magnetized region thus detected.

Alternatively, in the case where the output of the sensor is the value at point B in between the peaks, the absolute angle of point B is calculated from the ratio of intensity at point A, which is the immediately previous peak, to the difference between the intensity at point A and at point B. In some detail, the angle at point B is calculated by Equation 2.

As mentioned above, in accordance with the present embodiment, the encoder 330 and the sensor 340 are disposed radially opposed to each other. Further, the encoder 330 is formed by a plurality of N poles 332 and S poles 333 arranged such that the magnetic flux density gradually increases. Accordingly, the single sensor 340 can be used to detect the speed, direction and angle of rotation of the shaft 302 at the same time, making it possible to exert the same effect as in the eleventh embodiment.

Further, in the present embodiment, since the outer ring 303 and inner ring 304 of the bearing, the encoder 330 and the sensor 340 are formed integrally, assembly can be completed merely by disposing the bearing between the shaft and the housing if the encoder and the sensor have been previously mounted on the bearing. Accordingly, the efficiency in assembly can be enhanced, contributing to the reduction of assembly cost.

Moreover, the same rotation detecting device as in the present embodiment can be applied to the bearing with sensor described in any of the first to tenth embodiments.

Fourteenth Embodiment

A twelfth embodiment of implementation of the present invention will be described hereinafter in connection with FIG. 22. Herein, the same members as mentioned in the eleventh to thirteenth embodiments will be given the same reference numerals and signs and their description will be omitted.

Figure 22:
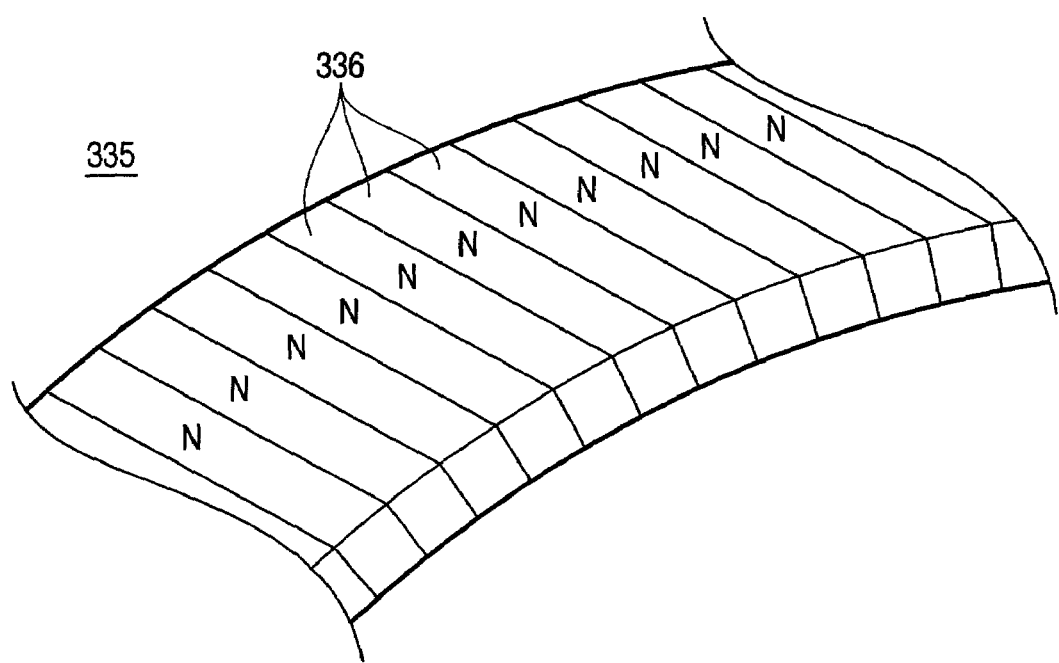
FIG. 22 is a partly enlarged view of an encoder 335 used in a rotary state detecting device according to a fourteenth embodiment of implementation of the present invention.

FIG. 22 is a partly enlarged view of an encoder 335 used in a bearing with sensor having a rotation detecting device according to the fourteenth embodiment of implementation of the present invention incorporated therein. In the present embodiment, the encoder 335 is disposed opposed to a sensor 340 similarly to the encoder 330.

The encoder 335 has an annular shape having a predetermined axial width. The sensor-opposing surface of the encoder 335 is formed by arranging a plurality of N poles 336 annularly at an equal interval. The plurality of N poles 336 are magnetized regions having different magnetic flux densities. The encoder 335 is magnetized by S pole on the side thereof opposite the sensor.

The magnetized regions constituting the encoder 335 have a reference magnetized region having a minimum magnetic flux density. The various magnetized regions each are given magnetic flux densities which increase from magnetized region to next magnetized region clockwise as viewed from the ball 307 with the reference magnetized region as reference. In some detail, in the present embodiment, the various magnetized regions each are given magnetic flux densities according to Equation 1 as in the eleventh to thirteenth embodiments.

Thus, N poles 336 thus arranged form therearound a magnetic field having an intensity corresponding to the respective polarity and magnetic flux density. Accordingly, a magnetic field corresponding to the intensity of magnetic flux density of N pole is formed around the encoder 335. The position (disposition angle) of the reference magnetized region of the encoder 335 is stored in a control circuit which is not shown as a reference of the absolute angle of the shaft.

The encoder 335 rotates with the rotation of the shaft 302. The sensor 340 outputs electric current value according to the intensity and direction of magnetic flux formed by N pole 336 positioned opposed to the sensor 340 to a control circuit which is not shown via a cable 322.

The output signal detected by the sensor 340 is similar to that shown in FIG. 18. In FIG. 18, the ordinate indicates the intensity of output signal and the abscissa indicates time. The magnitude of the output signal is proportional to the intensity of magnetic flux and the sign of output signal is determined by the direction of magnetic flux. Herein, the pulse which appears on the leftmost in FIG. 18 is a pulse generated by the magnetic flux formed by the reference magnetized region. FIG. 18 shows that the intensity of pulse peak increases stepwise with time. Accordingly, in the case of FIG. 18, the control circuit judges that the shaft 302 rotates in the direction of increase of the intensity of N pole 336, i.e., counterclockwise as viewed from the sensor 340. Then, the control circuit counts the number of peaks detected per unit time and calculates the rotary speed on the basis of the counted number of peaks and the interval at which the magnetized regions are disposed.

Further, the control circuit determines the absolute angle of the shaft on the basis of the intensity of pulse peak. In the present embodiment, the output pulse of the sensor 340 has a flat gentle peak. Accordingly, the angle resolution is deteriorated as compared with the eleventh embodiment as in the case of the twelfth embodiment. The control circuit has a threshold value corresponding to the disposition angle of the various magnetized regions. Further, when the control circuit detects that the value detected exceeds the threshold value, it is judged that the encoder passes by the corresponding angle.

As mentioned above, in accordance with the present embodiment, the encoder 335 and the sensor 340 are disposed radially opposed to each other. Further, the sensor-opposing surface of the encoder 335 is formed by a plurality of N poles 336 arranged such that the magnetic flux density gradually increases. Accordingly, the single sensor 340 can be used to detect the speed, direction and angle of rotation of the shaft 302 at the same time, making it possible to exert the same effect as in the eleventh embodiment.

In the present embodiment, since the sensor-opposing surface of the encoder is formed by only N poles the magnetic flux density of which gradually increase, the peak value thus detected is flat. Accordingly, as compared with the case where there is only one peak value, the occurrence percentage of peak detection error is reduced, making it possible to detect peak with a higher reliability.

While the present embodiment has been described with reference to the case where the sensor-opposing surface of the encoder is formed by N poles, the sensor-opposing surface of the encoder may be formed by S poles. In this case, the detection of rotary speed, direction of rotation and absolute angle is made in the same manner as in the present embodiment except that the sign of output signal is inverted.

Further, in the present embodiment, since the outer ring 303 and inner ring 304 as bearing, the encoder 335 and the sensor 340 are formed integrally, assembly can be completed merely by disposing the bearing between the shaft and the housing if the encoder and the sensor have been previously mounted on the bearing. Accordingly, the efficiency in assembly can be enhanced, contributing to the reduction of assembly cost.

Moreover, the same rotation detecting device as in the present embodiment can be applied to the bearing with sensor described in any of the first to tenth embodiments.

Fifteenth Embodiment

A fifteenth embodiment of implementation of the present invention will be described hereinafter in connection with FIG. 23. Herein, the same members as mentioned in the eleventh to fourteenth embodiments will be given the same reference numerals and signs and their description will be omitted.

Figure 23:
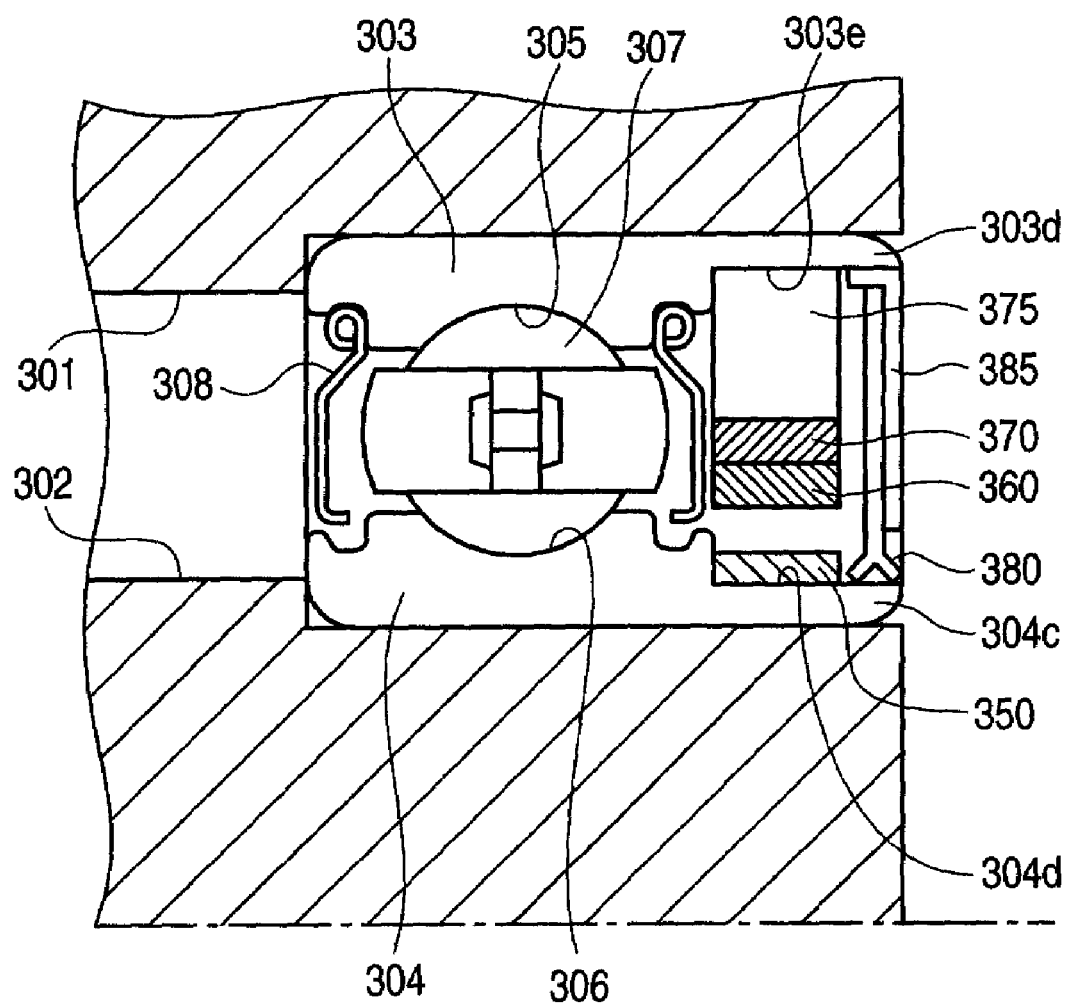
FIG. 23 illustrates a deep groove ball bearing as a rolling bearing with sensor comprising a rotary state detecting device according to a fifteenth embodiment of implementation of the present invention incorporated therein.

FIG. 23 illustrates a deep groove ball bearing as a rolling bearing with sensor having a rotation detecting device according to the thirteenth or fourteenth embodiment of implementation of the present invention incorporated therein. In the present embodiment, the outer ring 303 and the inner ring 304 of the deep groove ball bearing have a sensor mounting portion 303d and an encoder mounting portion 304c which extend axially, respectively.

On the axially outer side 304d of the encoder mounting portion 304c is disposed an encoder 350. As the encoder 350 there may be used the encoder 330 or 335 described in the thirteenth or fourteenth embodiment. The axial side of the encoder 350 is opposed to the sensor mounting portion 303d.

On the other hand, on the axially inner side 303e of the sensor mounting portion 303d is provided standing an annular steel sheet 385. An annular seal 380 is supported by the steel sheet 385 to seal the clearance between the sensor mounting portion 303d and the encoder mounting portion 304c.

Further, on the axially inner side 303e of the sensor mounting member 303d is disposed a sensor mounting portion 375. The sensor mounting member 375 is positioned between the seal ring 308 and the seal 380.

On the sensor mounting member 375 are disposed a temperature measuring device 370 and a sensor 360 formed by a hall element or the like. The sensor 360 is disposed opposed to the encoder 350 and detects the magnetic flux formed by the encoder 350. The sensor 360 detects magnetic flux and hence the rotary speed, rotation direction and absolute angle of rotary body in the same manner as in the thirteenth and fourteenth embodiments.

The temperature measuring device 370 measures the temperature of the sensor and encoder and the peripheral members and outputs the temperature data thus measured to a control circuit which is not shown. The magnetized regions constituting the encoder 350 changes in magnetic flux density with temperature change. The control circuit has a table by which the change of magnetic flux density with temperature change is corrected. Further, the control circuit uses this table to correct the output value thus detected and detect the rotary speed, rotation direction and absolute angle of the shaft. In the case where a noncontact type thermometer such as thermocouple is used, the temperature of a nonrotary member such as sensor is detected, but in the case where a noncontact type thermometer such as infrared radiation thermometer is used, the detection of the temperature of a rotary member such as encoder is made possible.

As mentioned above, in accordance with the present embodiment, output value corrected in the light of temperature change can be used to detect the rotary speed, rotation direction and absolute angle of the shaft. Accordingly, the encoder 350 can be used without taking into account the working temperature conditions of the encoder 350, making it possible to apply the present rotary state detecting device to bearing and rolling device more widely.

The core gap between the encoder and the sensor changes with thermal expansion and shrinkage. This core gap change may be corrected on the basis of signal from the temperature measuring device.

Further, in the present embodiment, the encoder 350 and the sensor 360 are sealed by the seal ring 308 and the seal 380. Therefore, the external effect can be minimized, making measurement possible at a higher accuracy.

Moreover, the encoder 350 and the sensor 320 are disposed radially opposed to each other. Further, the encoder 310 is formed by a plurality of N poles 312 and S poles 313 arranged such that the magnetic flux density gradually increases. Accordingly, the single sensor 320 can be used to detect the speed, direction and angle of rotation of the shaft 302 at the same time, making it possible to exert the same effect as in the eleventh embodiment.

Further, the same rotation detecting device as in the present embodiment can be applied to a bearing with sensor described in any of the first to tenth embodiments.

Sixteenth Embodiment

Figure 24:
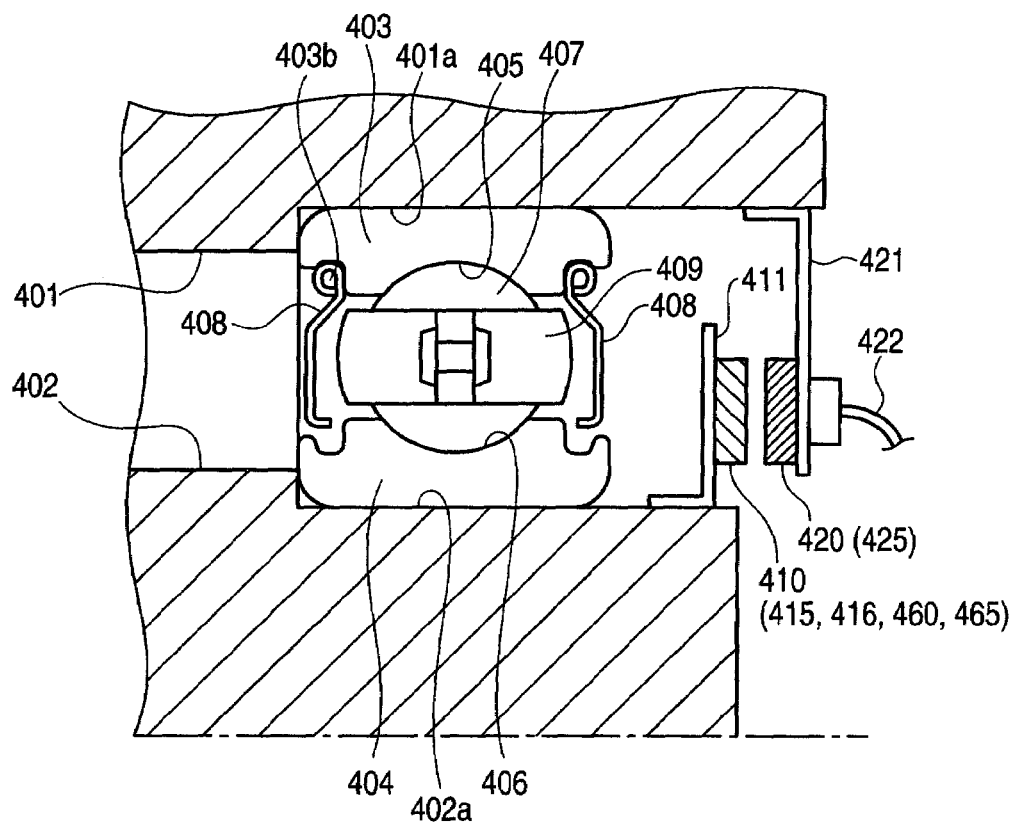
FIG. 24 illustrates a deep groove ball bearing as a rolling device comprising a rotary state detecting device according to a sixteenth embodiment of implementation of the present invention incorporated therein.

A sixteenth embodiment of implementation of the present invention will be described in detail in connection with FIGS. 24 to 28. FIG. 24 illustrates a deep groove ball bearing as a rolling device having a rotation detecting device according to the sixteenth embodiment of implementation of the present invention incorporated therein. The deep groove ball bearing has an outer ring 403, an inner ring 404, a plurality of balls 407 as rolling element, a seal ring 408 and a retainer 409.

The outer ring 403 is fixed to the inner surface 401a of a housing 401 as a stationary member. The outer ring 403 is produced by subjecting a metallic material such as carbon steel to forging or the like. The outer ring 403 has an outer ring race 405 provided on the inner surface thereof for guiding the ball 407.

The inner ring 404 is produced by subjecting a metallic material such as carbon steel to forging or the like similarly to the outer ring 403. The inner ring 404 is fitted on the outer surface 402a of a shaft 402 which is a rotary member. The inner ring 404 has an inner ring race 406 provided on the outer surface thereof corresponding to the outer ring race 405 of the outer ring 403 for guiding the ball 407. The inner ring 404 rotates integrally with the shaft 402 with the rotation of the shaft 402.

The balls 407 are arranged in a line between the outer ring race 405 of the outer ring 403 and the inner ring race 406 of the inner ring 404. The balls 407 roll over the outer ring 405 and the inner ring 406 with the rotation of the inner ring 404 accompanying the rotation of the shaft 402.

The seal ring 408 blocks and seals both the two openings of the space receiving the balls 407 between the outer ring 403 and the inner ring 404. The seal ring 408 prevents the entrance of dust, water content, foreign matters, etc. into the space receiving the balls and the leakage of lubricant from the space receiving the balls. The seal ring 408 is fixed at a fixing portion 403b formed on the inner surface of the outer ring 403.

The retainer 409 retains the balls 407 rollably between the outer ring race 405 and the inner ring race 406. As the retainer 409 there may be used a pressed cage, a machined cage or the like.

On the outer surface 402a of the shaft 402 is provided standing an annular encoder retaining member 411. The encoder retaining member 411 extends from the outer surface 402a of the shaft 402 toward the housing 401, i.e., outward radially from the shaft 402. On the axial side of the encoder retaining member 411 is provided an encoder 410 facing axially.

On the other hand, on the inner surface 401a of the housing 401 is provided standing a sensor retaining member 421. The sensor retaining member 421 extends from the inner surface 401a of the housing 401 toward the shaft 402, i.e., inward radially from the housing 401. On the axial side of the sensor retaining member 421 is provided a single sensor 420. The sensor 420 is disposed axially opposed to the encoder 410.

Figure 25:
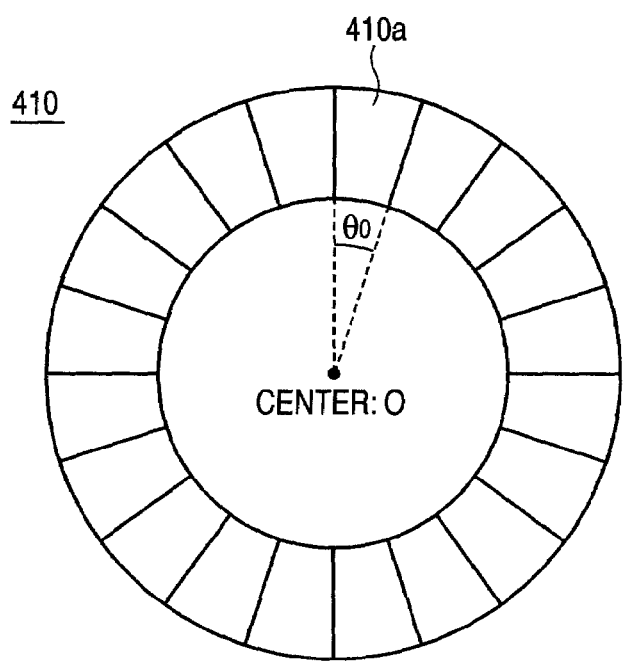
FIG. 25 is a plan view illustrating an encoder 410.
Figure 26:
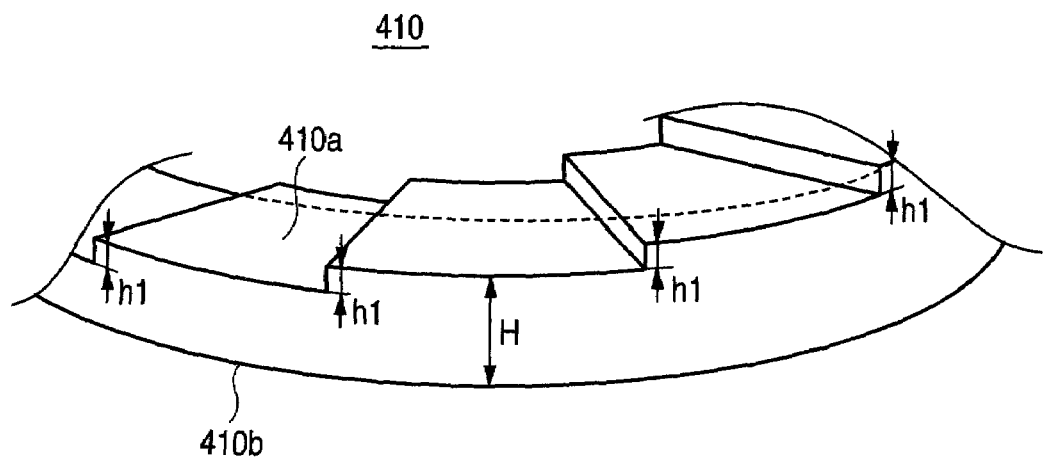
FIG. 26 is a partly enlarged perspective view of the encoder 410.

FIG. 25 is a plan view illustrating the encoder 410 and FIG. 26 is a partly enlarged perspective view of FIG. 25. The encoder 410 has an annular shape having a constant radial width. The encoder 410 has a plurality of stepped sensor-opposing surfaces 410a and a flat encoder mounting member grounding surface 410b. The encoder 410 is fixed to an encoder mounting member 411 at the encoder mounting member grounding surface 410b. The normal direction of the encoder mounting member grounding surface 410b is the same as the axial direction.

As shown in FIG. 26, the plurality of sensor-opposing surfaces 410a are circumferentially separated by a step having an axial height h1. The step is formed every angle θ0 with the center O so that the sensor-opposing surface of the encoder is circumferentially divided every angle θ0. Accordingly, the height H from the encoder mounting member grounding surface 410b to the sensor-opposing surface 410a of the encoder increases by h1 every angle θ0.

Accordingly, the axial height H of the encoder 410 increases monotonously by h1 every angle θ0 starting from the sensor-opposing surface 410a closest to the encoder mounting member grounding surface 410b as reference to the sensor-opposing surface 410a farthest from the encoder mounting member grounding surface 410b. In the present embodiment, next to the sensor-opposing surface 410a closest to the encoder mounting member grounding surface 410b is disposed the sensor-opposing surface 410a farthest from the encoder mounting member grounding surface 410b. Further, in the present embodiment, the encoder 410 is disposed in such arrangement that the height H increases by h1 counterclockwise as viewed from the sensor. Accordingly, the distance between the encoder 410 and the sensor 420 changes according to the shape of the sensor-opposing surface 410a with the rotation of the shaft 402. The distance between the encoder 410 and the sensor 420 is stored in a control circuit which is not shown according to the angle. Moreover, the control circuit stores the position of the various sensor-opposing surfaces 410a and the absolute angle of the shaft 402 in association with each other.

The sensor 420 is disposed axially opposed to the sensor-opposing surface 410a of the encoder 410. The sensor 420 is a displacement sensor which utilizes light or ultrasonic wave to measure the change of the distance between the sensor-opposing surface 410a of the encoder 410 and the sensor 420. The sensor 420 outputs light or ultrasonic wave toward the sensor-opposing surface 410a of the encoder 410. The light or ultrasonic wave thus outputted is then reflected by the sensor-opposing surface 410a. The sensor 420 receives the light or ultrasonic wave thus reflected to measure the displacement of the shape of the sensor-opposing surface. The sensor 420 outputs the distance data thus detected to a control circuit which is not shown via a cable 422.

Figure 27:
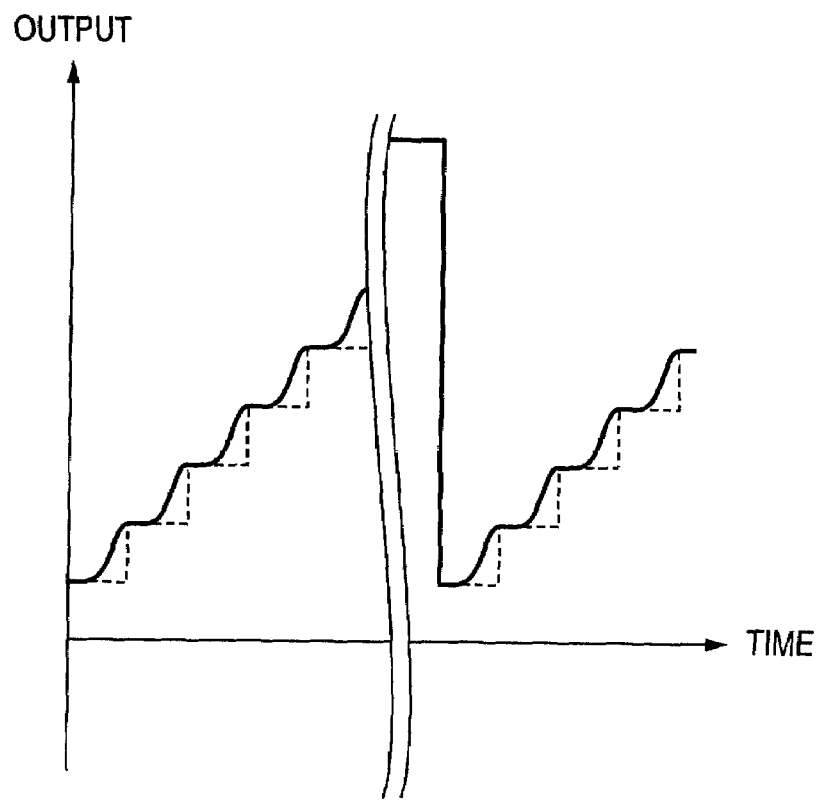
FIG. 27 is a graph illustrating an output signal detected by a sensor 420.

FIG. 27 is a graph illustrating the output signal detected by the sensor 420. In FIG. 27, the ordinate indicates the intensity of output signal and the abscissa indicates time. In FIG. 27, the broken line indicates output signal. The magnitude of the output signal corresponds to the distance from the sensor, and the closer to the sensor is the sensor-opposing surface, the greater is the intensity of output signal. Herein, the pulse appearing on the leftmost end in FIG. 27 indicates the pulse of value detected when the sensor-opposing surface 410a closest to the encoder mounting member grounding surface 410b is disposed opposed to the sensor 420. FIG. 27 shows that the intensity of pulse peak increases stepwise monotonously with time.

As previously mentioned, in the present embodiment, the encoder 410 is provided in such an arrangement that the height H gradually increases by h1 counterclockwise as viewed from the sensor 420. Accordingly, in the case of FIG. 27, the control circuit judges that the encoder 410, i.e., the shaft 402 rotates clockwise as viewed from the sensor.

As shown in FIG. 27, the output of the sensor 420 has a signal reflected by the sensor-opposing surface 410a closest to the sensor 420 as a maximum peak. The control circuit counts this maximum peak and calculates the rotary speed of the shaft 402 on the basis of the number of maximum peaks obtained per unit time.

Further, the control circuit determines the absolute angle of the shaft on the basis of the pulse intensity. In the present embodiment, the output of the sensor 420 is stepwise according to the shape of the encoder 410. The control circuit stores the absolute angle of the various shapes and the detected value in association with each other. Then, the control circuit judges the angle at which the shaft is disposed according to the detected value. In this manner, the detection of the absolute angle of the shaft 402 can be made within the angle resolution range θ0.

As mentioned above, in accordance with the present embodiment, the encoder 410 and the sensor 420 are disposed axially opposed to each other. Further, the encoder 410 has a sensor-opposing surface 410a formed thereon such that the distance from the sensor 420 monotonously increases or decreases. The sensor 420 is made of a displacement sensor utilizing light or ultrasonic wave. The sensor 420 outputs output signal according to the distance from the sensor-opposing surface 410a to the control circuit. The control circuit analyzes this output signal to detect the speed, direction and angle of rotation of the shaft 402. Accordingly, the single sensor 420 can be used to detect the speed, direction and angle of rotation of the shaft 402 at the same time, making it possible to exert the same effect as in the eleventh embodiment.

In the present embodiment, the sensor 420 is a displacement sensor utilizing light or ultrasonic wave. However, the sensor 420 is not specifically limited so far as it is a sensor capable of measuring the change of the distance between the sensor-opposing surface 410a and the sensor 420. As the sensor 420 there may be proposed a magnetism sensor, a sensor utilizing interaction between magnetic field and eddy current or the like by way of example. In the case where a magnetism sensor is used, the encoder is a magnetic material. In the case of a sensor utilizing eddy current, the encoder needs to be a ferromagnetic material such as metallic material.

Seventeenth Embodiment

A seventeenth embodiment of implementation of the present invention will be described hereinafter in connection with FIG. 28. Herein, the same members as mentioned in the sixteenth embodiment will be given the same reference numerals and signs and their description will be omitted.

In the present embodiment, in FIG. 24, on the axial side of an encoder retaining member 411 is disposed an encoder 415. On the other hand, on the axial side of the sensor retaining member 421 is disposed a single sensor 425. The sensor 425 is disposed axially opposed to the encoder 415.

Figure 28:
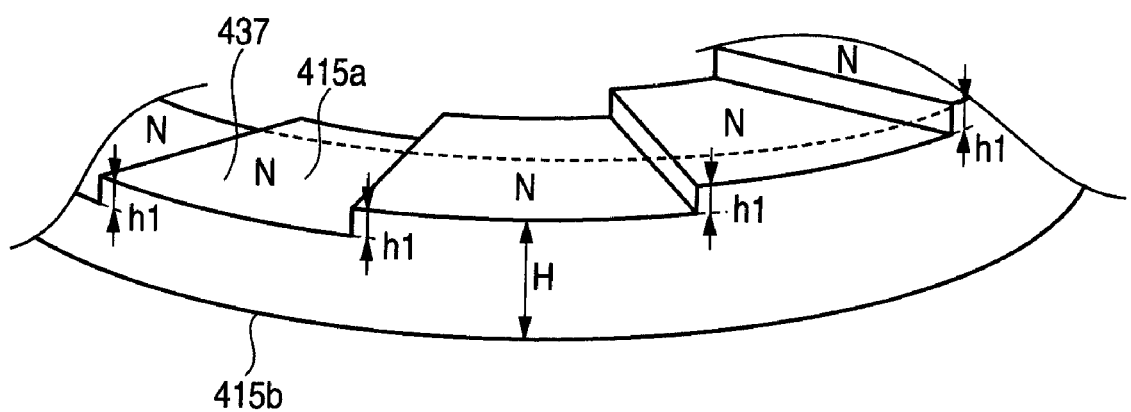
FIG. 28 is a partly enlarged perspective view of an encoder 415 used in a rotary state detecting device according to a seventeenth embodiment of implementation of the present invention.

FIG. 28 is a partly enlarged perspective view of the encoder 415 used in a rotation detecting device according to the seventeenth embodiment of implementation of the present invention. In the present embodiment, the encoder 415 is disposed opposed to the sensor 425 similarly to the encoder 410.

The encoder 415 has an annular shape having a constant radial width. The encoder 415 has a plurality of stepped sensor-opposing surfaces 415a and a flat encoder mounting member grounding surface 415b. The encoder 415 is fixed to an encoder mounting member 411 at the encoder mounting member grounding surface 415b. The normal direction of the encoder mounting member grounding surface 415b is the same as the axial direction.

As shown in FIG. 28, the plurality of sensor-opposing surfaces 415a are circumferentially separated by a step having an axial height h1. The step is formed every angle θ0 with the center O so that the sensor-opposing surface of the encoder is circumferentially divided every angle θ0. Accordingly, the height H from the encoder mounting member grounding surface 415b to the sensor-opposing surface 415a of the encoder increases by h1 every angle θ0.

Accordingly, the axial height H of the encoder 415 increases monotonously by h1 every angle θ0 starting from the sensor-opposing surface 415a closest to the encoder mounting member grounding surface 415b as reference to the sensor-opposing surface 415a farthest from the encoder mounting member grounding surface 415b. In the present embodiment, next to the sensor-opposing surface 415a closest to the encoder mounting member grounding surface 415b is disposed the sensor-opposing surface 415a farthest from the encoder mounting member grounding surface 415b. Further, in the present embodiment, the encoder 415 is disposed in such arrangement that the height H increases by h1 counterclockwise as viewed from the sensor. Accordingly, the distance between the encoder 415 and the sensor 425 changes according to the shape of the sensor-opposing surface 415a with the rotation of the shaft 402. The distance between the encoder 415 and the sensor 425 is stored in a control circuit which is not shown according to the angle. Moreover, the control circuit stores the position of the various sensor-opposing surfaces 415a and the absolute angle of the shaft 402 in association with each other.

The sensor-opposing surfaces 415a of the encoder 415 are each provided with an N pole 437. The magnetized regions constituting the N pole 437 each have a predetermined magnetic flux density. The N pole 437 forms therearound a magnetic field having an intensity corresponding to the polarity and magnetic flux density thereof. Accordingly, a magnetic field corresponding to the magnetic flux density of N pole 437 is formed around the encoder 415.

As the material of the encoder 415 there may be used an alnico magnet, ferrite magnet, samarium-cobalt magnet, neodymium-iron-boron magnet or bonded magnet obtained by mixing various magnet powders with a plastic or the like, molding the mixture and solidifying the molded material. Since the magnetic flux density of the various magnetized regions must be uniform, the bonded magnet, which can easily be designed to have any magnetic flux density, is preferably used. Herein, a bonded magnet made of a ferrite powder-containing plastic or rare earth material is used. The magnetic force of a magnet changes with temperature.

The sensor 425 is disposed axially opposed to the sensor-opposing surface 415a of the encoder 415. The sensor 425 is a magnetism sensor which measures the change of the distance between the sensor-opposing surface 415a of the encoder 415 and the sensor 425. The present embodiment is described with reference to the use of a magnetism sensor capable of detecting magnetic field such as hall element and coil, particularly hall element, by way of example. A hall element is an element which generates electric current as output signal according to the intensity and direction of magnetic flux crossing the hall element.

The sensor 425 senses the magnetic field formed by the various N poles 437 of the encoder 415. The intensity of the magnetic field formed by N pole 437 increases or decreases as the distance between N pole 437 and the sensor-opposing surface 415a of the encoder 415 decreases or increases, respectively. The sensor 425 senses the change of intensity of the magnetic field and outputs the detected value to a control circuit which is not shown via a cable 422.

The output signal detected by the sensor 425 is shown in FIG. 27. In FIG. 27, the solid line indicates output signal. The magnitude of the output signal is proportional to the intensity of magnetic flux detected and the sign of output signal is determined by the direction of magnetic flux. Herein, the pulse appearing on the leftmost end in FIG. 27 indicates the pulse of value detected when the sensor-opposing surface 415a closest to the encoder mounting member grounding surface 415b is disposed opposed to the sensor 425. FIG. 27 shows that the intensity of pulse peak increases substantially stepwise monotonously with time.

As previously mentioned, in the present embodiment, the encoder 415 is provided in such an arrangement that the height H increases by h1 counterclockwise as viewed from the sensor 425. Accordingly, in the case of FIG. 27, the control circuit judges that the encoder 415, i.e., the shaft 402 rotates clockwise as viewed from the sensor.

As shown in FIG. 27, the output of the sensor 425 has a signal reflected by the sensor-opposing surface 415a closest to the sensor 425 as a maximum peak. The control circuit counts this maximum peak and calculates the rotary speed of the shaft 402 on the basis of the number of maximum peaks obtained per unit time.

Further, the control circuit determines the absolute angle of the shaft on the basis of the pulse intensity. In the present embodiment, the output of the sensor 425 is stepwise according to the shape of the encoder 415. The control circuit stores the absolute angle of the various shapes and the detected value in association with each other. Then, the control circuit judges the angle at which the shaft is disposed according to the detected value. In this manner, the detection of the absolute angle of the shaft 402 can be made within the angle resolution range θ0.

As mentioned above, in accordance with the present embodiment, the encoder 415 and the sensor 425 are disposed axially opposed to each other. Further, the encoder 415 has a sensor-opposing surface 415a formed thereon such that the distance from the sensor 425 monotonously increases or decreases. The sensor 425 is formed by a magnetism sensor and the sensor-opposing surface 415a is provided with N pole 437. The sensor 425 outputs output signal according to the distance from the sensor-opposing surface 415a to the control circuit. The control circuit analyzes this output signal to detect the speed, direction and angle of rotation of the shaft 402. Accordingly, the single sensor 425 can be used to detect the speed, direction and angle of rotation of the shaft 402 at the same time, making it possible to exert the same effect as in the eleventh embodiment.

In the present embodiment, since the sensor-opposing surface 415a of the encoder is formed by only N poles, the peak value thus detected is flat. Accordingly, as compared with the case where there is only one peak value, the occurrence percentage of peak detection error is reduced, making it possible to detect peak with a higher reliability.

While the present embodiment has been described with reference to the case where the sensor-opposing surface of the encoder 415 is formed by N poles, the sensor-opposing surface of the encoder 415 may be formed by S poles. In this case, the detection of rotary speed, direction of rotation and absolute angle is made in the same manner as in the present embodiment except that the sign of output signal is inverted.

Eighteenth Embodiment

An eighteenth embodiment of implementation of the present invention will be described hereinafter in connection with FIGS. 29 and 30. Herein, the same members as mentioned in the sixteenth or seventeenth embodiment will be given the same reference numerals and signs and their description will be omitted.

In the present embodiment, in FIG. 24, on the axial side of the encoder retaining member 411 is disposed an encoder 416. On the other hand, on the axial side of the sensor retaining member 421 is disposed a single sensor 425. The sensor 425 is disposed axially opposed to the encoder 416.

Figure 29:
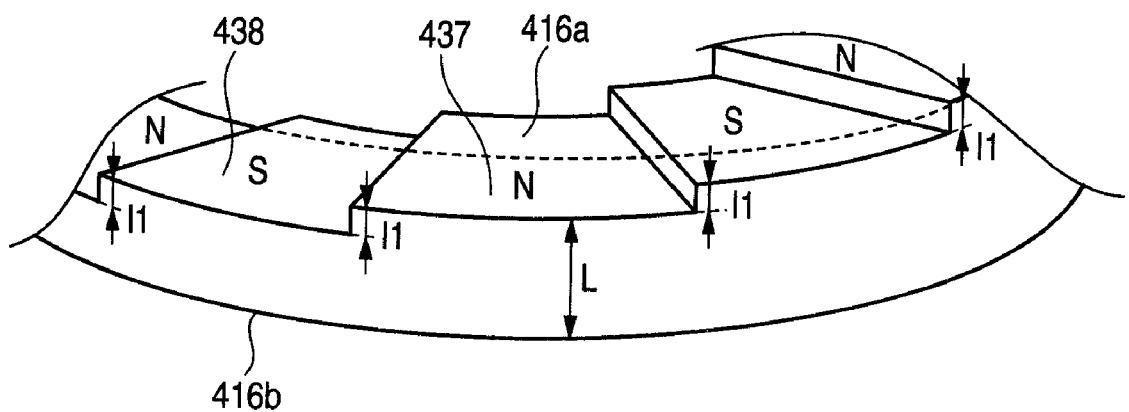
FIG. 29 is a partly enlarged perspective view of an encoder 416 used in a rotary state detecting device according to an eighteenth embodiment of implementation of the present invention.

FIG. 29 is a partly enlarged perspective view of the encoder 416 used in a rotation detecting device according to the eighteenth embodiment of implementation of the present invention. In the present embodiment, the encoder 416 is disposed opposed to the sensor 425 similarly to the encoders 410 and 415.

The encoder 416 has an annular shape having a constant radial width. The encoder 416 has a plurality of stepped sensor-opposing surfaces 416a and a flat encoder mounting member grounding surface 416b. The encoder 416 is fixed to the encoder mounting member 411 at the encoder mounting member grounding surface 416b. The normal direction of the encoder mounting member grounding surface 416b is the same as the axial direction.

As shown in FIG. 29, the plurality of sensor-opposing surfaces 416a are circumferentially separated by a step having an axial height l1. The step is formed every angle θ0 with the center O so that the sensor-opposing surface of the encoder is circumferentially divided every angle θ0. Accordingly, the height L from the encoder mounting member grounding surface 416b to the sensor-opposing surface 416a of the encoder increases by l1 every angle θ0.

Accordingly, the axial height L of the encoder 416 increases monotonously by l1 every angle θ0 starting from the sensor-opposing surface 416a closest to the encoder mounting member grounding surface 416b as reference to the sensor-opposing surface 416a farthest from the encoder mounting member grounding surface 416b. In the present embodiment, next to the sensor-opposing surface 416a closest to the encoder mounting member grounding surface 416b is disposed the sensor-opposing surface 416a farthest from the encoder mounting member grounding surface 416b. Further, in the present embodiment, the encoder 416 is disposed in such arrangement that the height L increases by l1 counterclockwise as viewed from the sensor. Accordingly, the distance between the encoder 416 and the sensor 425 changes according to the shape of the sensor-opposing surface 416a with the rotation of the shaft 402. The distance between the encoder 416 and the sensor 425 is stored in a control circuit which is not shown according to the angle. Moreover, the control circuit stores the position of the various sensor-opposing surfaces 416a and the absolute angle of the shaft 402 in association with each other.

The sensor-opposing surfaces 416a of the encoder 416 are each provided with a plurality of N poles 437 and S poles 438. The magnetized regions constituting the N pole 437 and S pole 438 each have a predetermined magnetic flux density. The N pole 437 and S pole 438 each form therearound a magnetic field having an intensity corresponding to the polarity and magnetic flux density thereof. Accordingly, a magnetic field corresponding to the magnetic flux density of N pole 437 and S pole 438 is formed around the encoder 416.

As the material of the encoder 416 there may be used an alnico magnet, ferrite magnet, samarium-cobalt magnet, neodymium-iron-boron magnet or bonded magnet obtained by mixing various magnet powders with a plastic or the like, molding the mixture and solidifying the molded material. Since the magnetic flux density of the various magnetized regions must be uniform, the bonded magnet, which can easily be designed to have any magnetic flux density, is preferably used. Herein, a bonded magnet made of a ferrite powder-containing plastic or rare earth material is used. The magnetic force of a magnet changes with temperature.

The sensor 425 is a magnetism sensor capable of detecting magnetic field such as hall element and coil as explained in the seventeenth embodiment.

The sensor 425 senses the magnetic field formed by the various N poles 437 and S poles 438 of the encoder 415. The absolute value of the intensity of the magnetic field formed by N pole 437 and S pole 438 increases or decreases as the distance between N pole 437 or S pole 438 and the sensor-opposing surface 416a of the encoder 416 decreases or increases, respectively. The sensor 425 senses the change of intensity of the magnetic field and outputs the detected value to a control circuit which is not shown via a cable 422.

Figure 30:
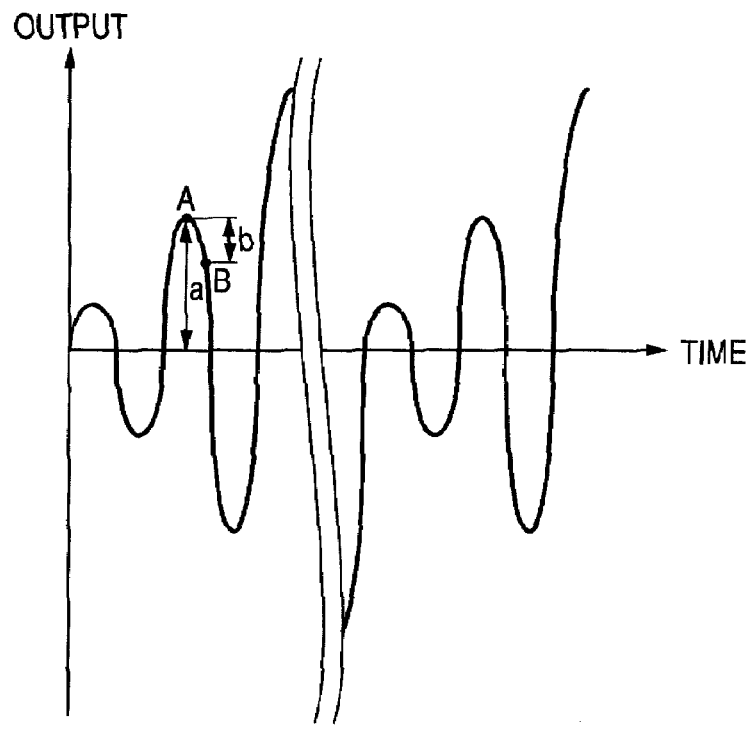
FIG. 30 illustrates an output signal detected by a sensor 425.

FIG. 30 illustrates the output signal detected by the sensor 425. The magnitude of the output signal is proportional to the intensity of magnetic flux detected and the sign of output signal is determined by the direction of magnetic flux. Herein, the pulse appearing on the leftmost end in FIG. 30 indicates the pulse of value detected when the sensor-opposing surface 416a closest to the encoder mounting member grounding surface 416b is disposed opposed to the sensor 425. FIG. 30 shows that the absolute value of the intensity of pulse peak increases substantially stepwise monotonously with time.

As previously mentioned, in the present embodiment, the encoder 416 is provided in such an arrangement that the height L increases by 11 counterclockwise as viewed from the sensor 425. Accordingly, in the case of FIG. 27, the control circuit judges that the encoder 416, i.e., the shaft 402 rotates clockwise as viewed from the sensor.

As shown in FIG. 30, the output of the sensor 425 has a signal reflected by the sensor-opposing surface 416a closest to the sensor 425 as a maximum peak. The control circuit counts this maximum peak and calculates the rotary speed of the shaft 402 on the basis of the number of maximum peaks obtained per unit time.

Further, the control circuit determines the absolute angle of the shaft 402 on the basis of the peak intensity. When the output of the sensor 425 shows the detection of peak (point A in FIG. 30), the control circuit judges that the magnetized region corresponding to the output thus detected is disposed opposed to the sensor 425. Then, the control circuit judges that the shaft 402 is disposed at the absolute angle corresponding to the magnetized region thus detected.

Further, when the output of the sensor 425 is the value at point B in between the peaks, the absolute angle of point B is calculated from the ratio of intensity at point A, which is the immediately previous peak, to the difference between the intensity at point A and at point B. In some detail, the angle at point B is calculated by Equation 2 as described above.

The control circuit stores the position of the various sensor-opposing surfaces 416a and the absolute angle of the shaft 402 in association with each other. Accordingly, the control circuit calculates the absolute angle of the encoder referring to the results of calculation by Equation 2 as described above.

As mentioned above, in accordance with the present embodiment, the encoder 416 and the sensor 425 are disposed axially opposed to each other. Further, the encoder 416 has a sensor-opposing surface 416a formed thereon such that the distance from the sensor 425 monotonously increases or decreases. The sensor 425 is formed by a magnetism sensor and on the sensor-opposing surface 416a are disposed alternately N poles 437 and S poles 438. The sensor 425 outputs output signal according to the distance from the sensor-opposing surface 416a to the control circuit. The control circuit analyzes this output signal to detect the speed, direction and angle of rotation of the shaft 402. Accordingly, the single sensor 425 can be used to detect the speed, direction and angle of rotation of the shaft 402 at the same time, making it possible to exert the same effect as in the eleventh embodiment.

In the present embodiment, an encoder having a sensor-opposing surface formed by N poles and S poles was used. Accordingly, the peak thus detected is sharp, making it possible to detect the absolute angle at a higher angle resolution than in the sixteenth embodiment or seventeenth embodiment.

Nineteenth Embodiment

A nineteenth embodiment of implementation of the present invention will be described in detail hereinafter in connection with FIGS. 31 to 33. Herein, the same members as mentioned in the sixteenth to nineteenth embodiments will be given the same reference numerals and signs and their description will be omitted.

Figure 31:
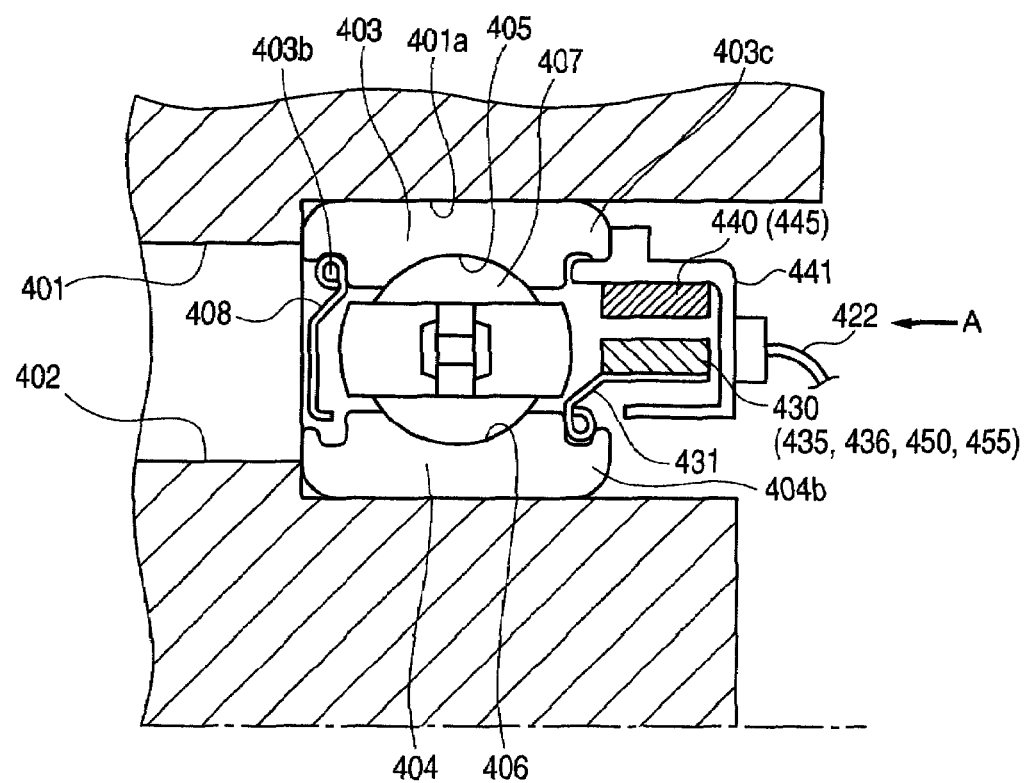
FIG. 31 illustrates a deep groove ball bearing as a rolling device comprising a rotary state detecting device according to a nineteenth embodiment of implementation of the present invention incorporated therein.

FIG. 31 illustrates a deep groove ball bearing as a bearing with sensor having a rotation detecting device according to the nineteenth embodiment of implementation of the present invention incorporated therein. The deep groove ball bearing has an outer ring 403, an inner ring 404, a plurality of balls 407 as rolling element, a seal ring 408 and a retainer 409.

In the present embodiment, the seal ring 408 blocks and seals one of both the two openings of the space receiving the balls 407 between the outer ring 403 and the inner ring 404. The other of both the two openings of the balls 407 is blocked and sealed by an encoder retaining member 431 and a sensor retaining member 441.

The sensor retaining member 441 is an annular member having a C-shaped section with two parallel ends. The sensor retaining member 441 is fixed to the axial end 403c of the outer ring 403 and protrudes axially from the outer ring 403. On the radially inner top side of the sensor retaining member 441 is disposed a sensor 440 facing radially.

The encoder retaining member 431 is an annular member having an L-shaped section. The encoder retaining member 431 is fixed to the axial end 4b of the inner ring 404 and protrudes axially from the inner ring 402. The forward end of the sensor retaining member 441 is disposed between both the two ends of the sensor retaining member 441. The encoder retaining member 431 and the sensor retaining member 441 play the same role as the seal ring 408 in cooperation with each other. On the radial side of the encoder retaining member 431 is disposed an encoder 430. The encoder 430 is disposed radially opposed to the sensor 440.

Figure 32:
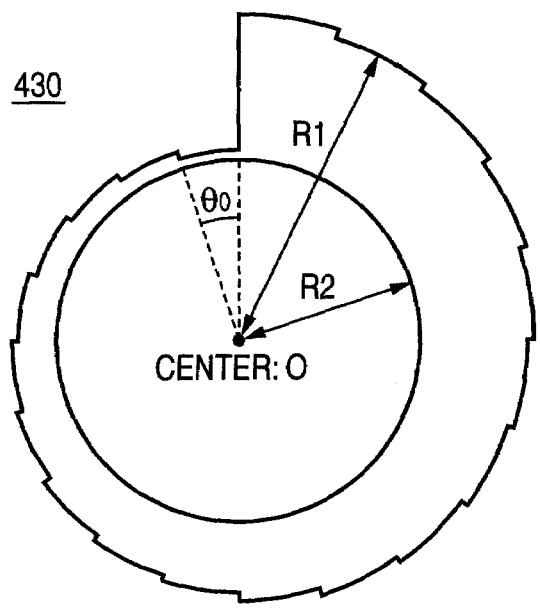
FIG. 32 is a plan view illustrating an encoder 430.
Figure 33:
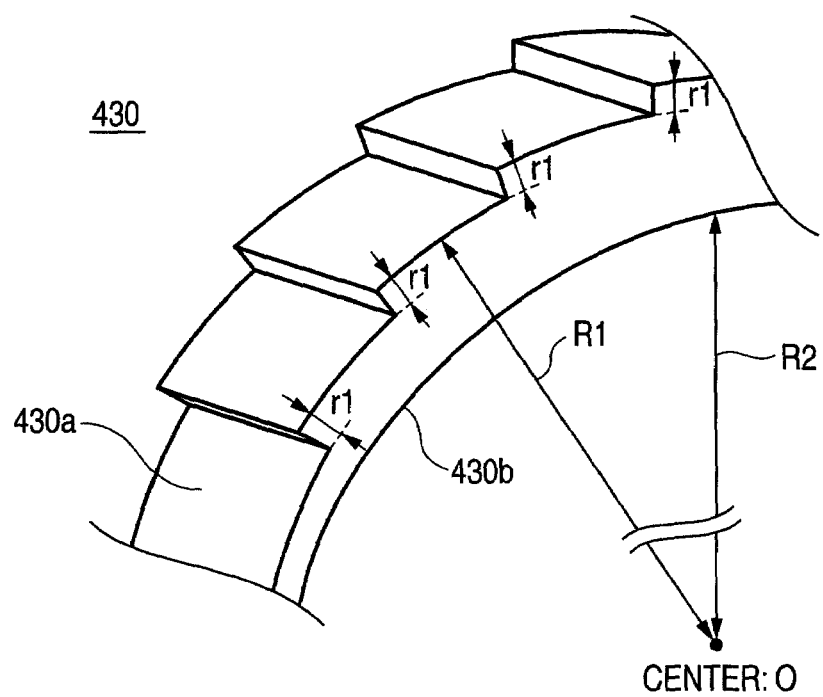
FIG. 33 is a partly enlarged perspective view of the encoder 430.

FIG. 32 is a plan view illustrating the encoder 430 and FIG. 33 is a partly enlarged view of FIG. 32. The encoder 430 is made of a material which can be easily magnetized such as ferromagnetic material. The encoder 430 has an annular shape having a constant axial width. The encoder 430 has an encoder mounting member grounding surface 430b apart from the center of the ring by a radius of R2 and a plurality of sensor-opposing surfaces 430a disposed at positions apart from the center O of the ring by radii R1 which vary every predetermined angle θ0. The encoder 430 is fixed to the encoder mounting member 431 at the encoder mounting member grounding surface 430b. The normal direction of the encoder mounting member grounding surface 430b crosses the axial direction.

As shown in FIG. 33, the plurality of sensor-opposing surfaces 430a are circumferentially separated by a step having a radial height r1. The step is formed every angle θ0 with the center O so that the sensor-opposing surface of the encoder 430 is circumferentially divided every angle θ0. Accordingly, the radius R1 from the center O of the encoder 430 to the sensor-opposing surface 430a of the encoder 430 increases by r1 every angle θ0.

Accordingly, the radius R1 of the encoder 430 gradually increases by r1 every angle θ0 starting from the sensor-opposing surface 430a having the smallest radius R1 as reference to the sensor-opposing surface 430a having the greatest radius R1. In the present embodiment, next to the sensor-opposing surface 430a having the smallest radius R1 is disposed the sensor-opposing surface 430a having the greatest radius R1. Further, in the present embodiment, the encoder 430 is disposed in such arrangement that the radius R1 gradually increases clockwise as viewed axially (arrow A in FIG. 31). Accordingly, the distance between the encoder 430 and the sensor 440 changes according to the shape of the sensor-opposing surface 430a with the rotation of the shaft 402. The distance between the encoder 430 and the sensor 440 is stored in a control circuit which is not shown according to the angle. Moreover, the control circuit stores the position of the various sensor-opposing surfaces 430a and the absolute angle of the shaft 402 in association with each other.

Further, the encoder 430 may be disposed in such an arrangement that the radius R1 gradually increases counterclockwise as viewed axially (arrow A in FIG. 31).

The sensor 440 is disposed radially opposed to the sensor-opposing surface 430a of the encoder 430. The sensor 440 is a displacement sensor which measures the change of the distance between the sensor-opposing surface 430a of the encoder 430 and the sensor 440. The sensor 440 outputs light or ultrasonic wave toward the sensor-opposing surface 430a of the encoder 430 similarly to the sensor 420 of the sixteenth embodiment. The light or ultrasonic wave thus outputted is then reflected by the sensor-opposing surface 430a. The sensor 440 receives the light or ultrasonic wave thus reflected to measure the displacement of the shape of the sensor-opposing surface. The sensor 440 outputs the distance data thus detected to a control circuit which is not shown via a cable 422.

The output signal detected by the sensor 440 is the same as indicated by the broken line in FIG. 27. Herein, the pulse appearing on the leftmost end in FIG. 27 indicates the pulse of value detected when the sensor-opposing surface 430a having the smallest radius R1 is disposed opposed to the sensor 440. FIG. 27 shows that the absolute value of the intensity of pulse peak increases stepwise monotonously with time.

As previously mentioned, in the present embodiment, the encoder 430 is provided in such an arrangement that the radius R1 gradually increases clockwise as viewed axially (arrow A in FIG. 31). Accordingly, in the case of FIG. 27, the control circuit judges that the encoder 430, i.e., the shaft 402 rotates counterclockwise as viewed axially (arrow A in FIG. 31).

Further, the control circuit counts the number of maximum peaks of detected signal and calculates the rotary speed of the shaft 402 on the basis of the number of maximum peaks obtained per unit time as in the sixteenth embodiment.

Further, the control circuit determines the absolute angle of the shaft on the basis of the pulse intensity. In the present embodiment, the output of the sensor 440 is stepwise according to the shape of the encoder 430. The control circuit stores the absolute angle of the various shapes and the detected value in association with each other. Then, the control circuit judges the angle at which the shaft is disposed according to the detected value. In this manner, the detection of the absolute angle of the shaft 402 can be made within the angle resolution range θ0.

As mentioned above, in accordance with the present embodiment, the encoder 430 and the sensor 440 are disposed radially opposed to each other. Further, the encoder 430 has a sensor-opposing surface 430a formed thereon such that the distance from the sensor 440 monotonously increases or decreases. The sensor 440 is made of a displacement sensor utilizing light or ultrasonic wave. The sensor 440 outputs output signal according to the distance from the sensor-opposing surface 430a to the control circuit. The control circuit analyzes this output signal to detect the speed, direction and angle of rotation of the shaft 402. Accordingly, the single sensor 440 can be used to detect the speed, direction and angle of rotation of the shaft 402 at the same time, making it possible to exert the same effect as in the eleventh embodiment.

In the present embodiment, the sensor 440 is a displacement sensor utilizing light or ultrasonic wave. However, the sensor 440 is not specifically limited so far as it is a sensor capable of measuring the change of the distance between the sensor-opposing surface 430a and the sensor 440. As the sensor 440 there may be proposed a magnetism sensor, a sensor utilizing interaction between magnetic field and eddy current or the like by way of example. In the case where a magnetism sensor is used, the encoder is a magnetic material. In the case of a sensor utilizing eddy current, the encoder needs to be a ferromagnetic material such as metallic material.

Further, the rotation detecting device as in the present embodiment can be applied to a bearing with sensor described in any of the first to tenth embodiments.

Twentieth Embodiment

A twentieth embodiment of implementation of the present invention will be described hereinafter in connection with FIG. 34. Herein, the same members as mentioned in the sixteenth to nineteenth embodiments will be given the same reference numerals and signs and their description will be omitted.

In the present embodiment, in FIG. 31, on the radial side of an encoder retaining member 411 is disposed an encoder 435 radially. On the other hand, on the radial side of a sensor retaining member 441 is disposed a single sensor 445. The sensor 445 is disposed radially opposed to the encoder 435.

Figure 34:
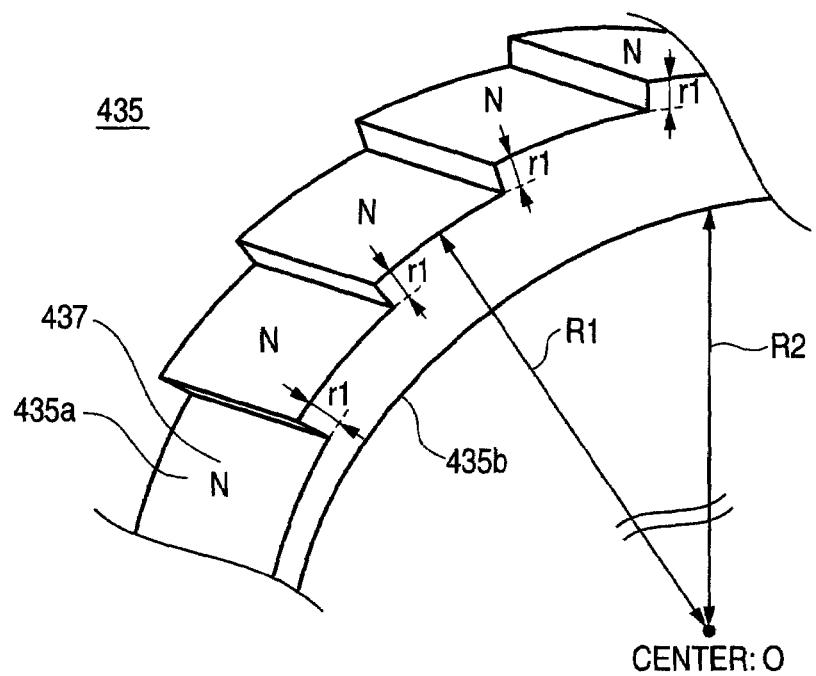
FIG. 34 is a partly enlarged perspective view of an encoder 435 used in a rotary state detecting device according to a twentieth embodiment of implementation of the present invention.

FIG. 34 is a partly enlarged perspective view of the encoder 435 used in a rotation detecting device according to the twentieth embodiment of implementation of the present invention. In the present embodiment, the encoder 435 is disposed opposed to the sensor 445 similarly to the encoder 430.

The encoder 435 has an annular shape having a constant axial width. The encoder 435 has an encoder mounting member grounding surface 435b apart from the center O of the ring by a radius of R2 and a plurality of sensor-opposing surfaces 435a disposed at positions apart from the center O of the ring by radii R1 which vary every predetermined angle θ0. The encoder 435 is fixed to the encoder mounting member 431 at the encoder mounting member grounding surface 435b. The normal direction of the encoder mounting member grounding surface 435b crosses the axial direction.

As shown in FIG. 34, the plurality of sensor-opposing surfaces 435a are circumferentially separated by a step having a radial height r1 of the encoder 435. The step is formed every angle θ0 with the center O so that the sensor-opposing surface of the encoder 435 is circumferentially divided every angle θ0. Accordingly, the radius R1 from the center O of the encoder 435 to the sensor-opposing surface 435a increases by r1 every angle θ0.

Accordingly, the radius R1 of the encoder 435 increases monotonously by r1 every angle θ0 starting from the sensor-opposing surface 435a having the smallest radius R1 as reference to the sensor-opposing surface 435a having the greatest radius R1. In the present embodiment, next to the sensor-opposing surface 435a having the smallest radius R1 is disposed the sensor-opposing surface 435a having the greatest radius R1. Further, in the present embodiment, the encoder 435 is disposed in such arrangement that the radius R1 increases by r1 clockwise as viewed axially (arrow A in FIG. 31). Accordingly, the distance between the encoder 435 and the sensor 445 changes according to the shape of the sensor-opposing surface 435a with the rotation of the shaft 402. The distance between the encoder 435 and the sensor 445 is stored in a control circuit which is not shown according to the angle. Moreover, the control circuit stores the position of the various sensor-opposing surfaces 435a and the absolute angle of the shaft 402 in association with each other.

The sensor-opposing surfaces 435a of the encoder 435 are each provided with an N pole 437. The magnetized regions constituting the N pole 437 each have a predetermined magnetic flux density. The N pole 437 forms therearound a magnetic field having an intensity corresponding to the polarity and magnetic flux density thereof. Accordingly, a magnetic field corresponding to the magnetic flux density of N pole 437 is formed around the encoder 435.

The sensor 445 is disposed radially opposed to the sensor-opposing surface 435a of the encoder 435. The sensor 35 is a displacement sensor which measures the change of the distance between the sensor-opposing surface 435a of the encoder 435 and the sensor 445. The present embodiment is described with reference to the use of a magnetism sensor capable of detecting magnetic field such as hall element and coil, particularly hall element, by way of example. A hall element is an element which generates electric current as output signal according to the intensity and direction of magnetic flux crossing the hall element.

The sensor 445 senses the magnetic field formed by the various N poles 437 of the encoder 435. The intensity of the magnetic field formed by N pole 437 increases or decreases as the distance between N pole 437 and the sensor-opposing surface 435a of the encoder 435 decreases or increases, respectively. The sensor 445 senses the change of intensity of the magnetic field and outputs the detected value to a control circuit which is not shown via a cable 422.

The pattern of value detected is as indicated by the solid line in FIG. 27 as in the seventeenth embodiment. The magnitude of the output signal is proportional to the intensity of magnetic flux and the sign of output signal is determined by the direction of magnetic flux. Herein, the pulse appearing on the leftmost end in FIG. 27 indicates the pulse of value detected when the sensor-opposing surface 435a having the smallest radius R1 is disposed opposed to the sensor 445. FIG. 27 shows that the absolute value of the intensity of pulse peak increases stepwise gradually with time.

As previously mentioned, in the present embodiment, the encoder 435 is provided in such an arrangement that the radius R1 gradually increases clockwise as viewed axially (arrow A in FIG. 31). Accordingly, in the case of FIG. 27, the control circuit judges that the encoder 435, i.e., the shaft 402 rotates counterclockwise as viewed axially (arrow A in FIG. 31).

As shown in FIG. 27, the output of the sensor 445 has a signal reflected by the sensor-opposing surface 435a disposed closest to the sensor 445 as a maximum peak. The control circuit counts this peak and calculates the rotary speed of the shaft 402 on the basis of the number of maximum peaks obtained per unit time.

Further, the control circuit determines the absolute angle of the shaft 402 on the basis of the pulse intensity. In the case of the present embodiment, the output of the pulse of the sensor 445 is substantially stepwise according to the shape of the encoder 435. The control circuit stores the absolute angle of the various shapes and the detected value in association with each other. Then, the control circuit judges the angle at which the shaft is disposed according to the detected value. In this manner, the detection of the absolute angle of the shaft 402 can be made within the angle resolution range θ0.

As mentioned above, in accordance with the present embodiment, the encoder 435 and the sensor 445 are disposed radially opposed to each other. Further, the encoder 435 has a sensor-opposing surface 435a formed thereon such that the distance from the sensor 445 monotonously increases or decreases. The sensor 445 outputs output signal according to the distance from the sensor-opposing surface 435a to the control circuit. The control circuit analyzes this output signal to detect the speed, direction and angle of rotation of the shaft 402. Accordingly, the single sensor 445 can be used to detect the speed, direction and angle of rotation of the shaft 402 at the same time, making it possible to exert the same effect as in the eleventh embodiment.

In the present embodiment, since on the sensor-opposing surface 435a is disposed by only N poles, the peak value thus detected is flat.

In the present embodiment, since the sensor-opposing surface 435a is formed by only N poles, the peak value thus detected is flat. Accordingly, as compared with the case where there is only one peak value, the percent occurrence of peak detection error is reduced, making it possible to detect peak with a higher reliability.

While the present embodiment has been described with reference to the case where the sensor-opposing surface of the encoder 435 is formed by N poles, the sensor-opposing surface of the encoder 435 may be formed by S poles. In this case, the detection of rotary speed, direction of rotation and absolute angle is made in the same manner as in the present embodiment except that the sign of output signal is inverted.

Further, the same rotation detecting device as in the present embodiment can be applied to a bearing with sensor described in any of the first to tenth embodiments.

Twenty First Embodiment

A twenty first embodiment of implementation of the present invention will be described hereinafter in connection with FIG. 35. Herein, the same members as mentioned in the sixteenth to twentieth embodiments will be given the same reference numerals and signs and their description will be omitted.

In the present embodiment, in FIG. 31, on the radial side of the encoder retaining member 431 is disposed an encoder 436. On the other hand, on the axial side of the sensor retaining member 441 is disposed a single sensor 445. The sensor 445 is disposed radially opposed to the encoder 436.

Figure 35:
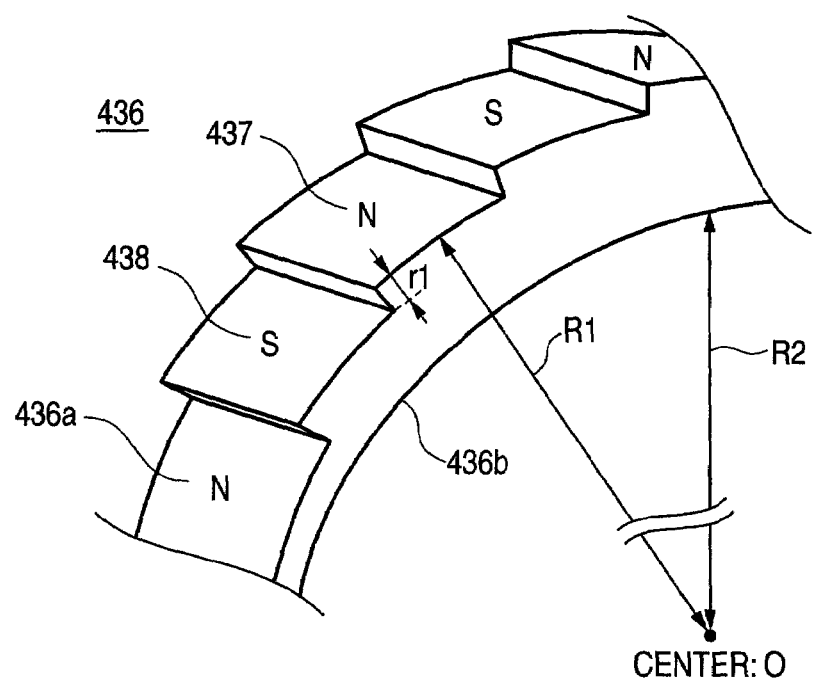
FIG. 35 is a partly enlarged perspective view of an encoder 436 used in a rotary state detecting device according to a twenty first embodiment of implementation of the present invention.

FIG. 35 is a partly enlarged perspective view of the encoder 436 used in a rotation detecting device according to the twenty first embodiment of implementation of the present invention. In the present embodiment, the encoder 436 is disposed opposed to the sensor 445 similarly to the encoder 430 or 435.

The encoder 436 has an annular shape having a constant axial width. The encoder 436 has an encoder mounting member grounding surface 436b apart from the center O of the ring by a radius of R2 and a plurality of sensor-opposing surfaces 436a disposed at positions apart from the center O of the ring by radii R1 which vary every predetermined angle θ0. The encoder 436 is fixed to the encoder mounting member 431 at the encoder mounting member grounding surface 436b. The normal direction of the encoder mounting member grounding surface 436b crosses the axial direction.

As shown in FIG. 35, the plurality of sensor-opposing surfaces 436a are circumferentially separated by a step having an axial height r1. The step is formed every angle θ0 with the center O so that the sensor-opposing surface of the encoder 436 is circumferentially divided every angle θ0. Accordingly, the radius R1 from the center O of the encoder 436 to the sensor-opposing surface 436a of the encoder 436 increases by r1 every angle θ0.

Accordingly, the radius R1 of the encoder 436 gradually increases by r1 every angle θ0 starting from the sensor-opposing surface 436a having the smallest radius R1 as reference to the sensor-opposing surface 436a having the greatest radius R1. In the present embodiment, next to the sensor-opposing surface 436a having the smallest radius R1 is disposed the sensor-opposing surface 436a having the greatest radius R1. Further, in the present embodiment, the encoder 436 is disposed in such arrangement that the radius R1 gradually increases clockwise as viewed axially (arrow A in FIG. 31). Accordingly, the distance between the encoder 436 and the sensor 445 changes according to the shape of the sensor-opposing surface 436a with the rotation of the shaft 402.

The distance between the encoder 436 and the sensor 445 is stored in a control circuit which is not shown according to the angle. Moreover, the control circuit stores the position of the various sensor-opposing surfaces 436a and the absolute angle of the shaft 402 in association with each other.

On the sensor-opposing surface 436a of the encoder 436 are disposed a plurality of N poles 437 and S poles 438 arranged alternately. The magnetized regions constituting the N pole 437 and S pole 438 each have a predetermined magnetic flux density. The N pole 437 and S pole 438 each form therearound a magnetic field having an intensity corresponding to the polarity and magnetic flux density thereof. Accordingly, a magnetic field corresponding to the magnetic flux density of N pole 437 and S pole 438 is formed around the encoder 436.

The sensor 445 is a magnetism sensor capable of detecting magnetic field such as hall element and coil as explained in the twentieth embodiment.

The sensor 445 senses the magnetic field formed by the various N poles 437 and S poles 438 of the encoder 436. The absolute value of the intensity of the magnetic field formed by N pole 437 and S pole 438 increases or decreases as the distance between N pole 437 or S pole 438 and the sensor-opposing surface 436a of the encoder 436 decreases or increases, respectively. The sensor 445 senses the change of intensity of the magnetic field and outputs the detected value to a control circuit which is not shown via a cable 422.

The output signal detected by the sensor 445 is the same as shown in FIG. 30. Herein, the pulse appearing on the leftmost end in FIG. 30 indicates the pulse of value detected when the sensor-opposing surface 436a having the smallest radius R1 is disposed opposed to the sensor 445. FIG. 30 shows that the sign of the pulse peak is inverted depending on the difference of polarity and the absolute value of the intensity of pulse peak increases with time. Accordingly, in the case of FIG. 30, the control circuit judges that the shaft 402 rotates in the direction of increase of the intensity of N pole 437 or S pole 438, i.e., counterclockwise as viewed axially (arrow A in FIG. 31). Then, the control circuit counts the number of peaks detected per unit time and calculates the rotary speed of the shaft 402.

Further, the control circuit determines the absolute angle of the shaft 402 on the basis of the intensity of pulse peak. The control circuit calculates the absolute angle on the basis of Equation 2 described above as in the eighteenth embodiment.

The control circuit stores the position of the various sensor-opposing surfaces 436a and the absolute angle of the shaft 402 in association with each other. Accordingly, the control circuit calculates the absolute angle of the encoder 436 referring to the results of calculation by Equation 2 as described above.

As mentioned above, in accordance with the present embodiment, the encoder 436 and the sensor 445 are disposed radially opposed to each other. Further, the encoder 436 has a sensor-opposing surface 436a formed thereon such that the distance from the sensor 445 monotonously increases or decreases. The sensor 445 outputs output signal according to the distance from the sensor-opposing surface 436a to the control circuit. The control circuit analyzes this output signal to detect the speed, direction and angle of rotation of the shaft 402. Accordingly, the single sensor 445 can be used to detect the speed, direction and angle of rotation of the shaft 402 at the same time, making it possible to exert the same effect as in the eleventh embodiment.

In the present embodiment, the encoder 436 having a sensor-opposing surface formed by N poles and S poles was used. Accordingly, the peak detected is sharp, making it possible to detect absolute angle at a high angle resolution as in the eighteenth embodiment.

Further, the same rotation detecting device as in the present embodiment can be applied to a bearing with sensor described in any of the first to tenth embodiments.

Twenty Second Embodiment

A twenty second embodiment of implementation of the present invention will be described hereinafter in connection with FIGS. 36 to 38. Herein, the same members as mentioned in the sixteenth to twenty first embodiments will be given the same reference numerals and signs and their description will be omitted.

Figure 36:
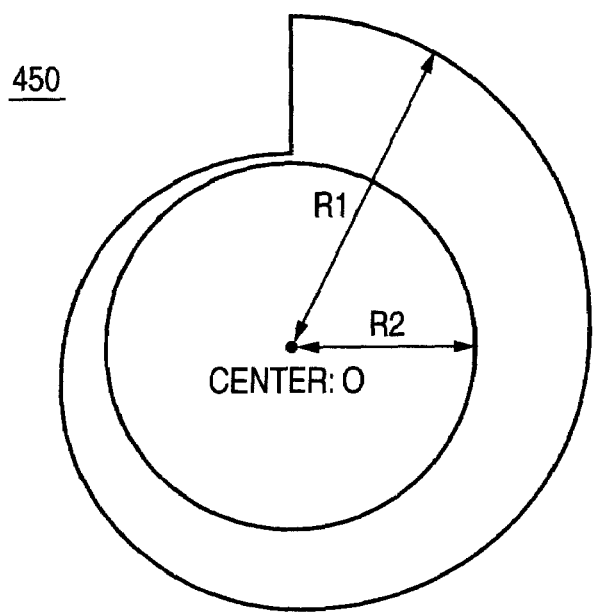
FIG. 36 is a plan view illustrating an encoder 450 in a twenty second embodiment of implementation of the present invention.

FIG. 36 is a plan view illustrating an encoder 450 in the twenty second embodiment of implementation of the present invention. The encoder 450 is used instead of the encoder 430 of FIG. 31. Configurations other than the encoder 450 are as shown in FIG. 31.

Figure 37:
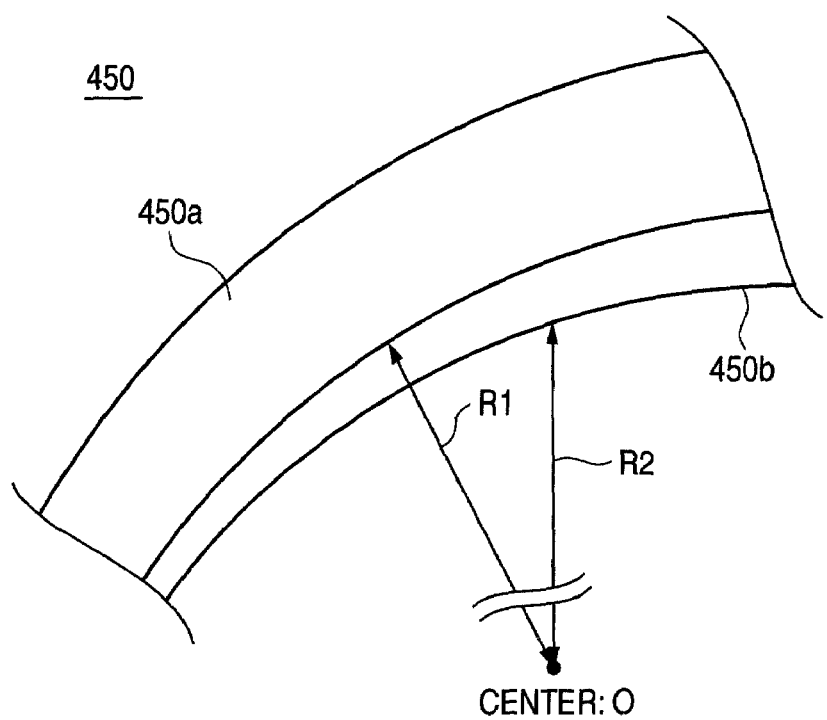
FIG. 37 is a partly enlarged perspective view of the encoder 450.

FIG. 37 is a partly enlarged perspective view of the encoder 450. The encoder 450 has an annular shape having a constant axial width. The encoder 450 has an encoder mounting member grounding surface 450*b* apart from the center O of the ring by a radius of R2 and sensor-opposing surfaces 450*a* disposed at positions apart from the center O of the ring by radii R1 which gradually increase or decrease. The encoder 450 is fixed to the encoder mounting member 431 at the encoder mounting member grounding surface 450*b*. The normal direction of the encoder mounting member grounding surface 450*b* crosses the axial direction. The sensor-opposing surface 450*a* of the encoder 450 is disposed radially opposed to the sensor 440, which is a displacement sensor.

The radius R1 of the encoder 450 increases at a predetermined ratio as the angle increases along the circumferential direction from the reference position. The position at which the radius R1 is at maximum and the position at which the radius R1 is at minimum are separated by a step. In the present embodiment, the encoder is disposed in such arrangement that the radius R1 gradually increases clockwise as viewed axially (arrow A in FIG. 31). Accordingly, the distance between the encoder 450 and the sensor 440 changes according to the shape of the sensor-opposing surface 450*a* with the rotation of the shaft 402. The distance between the encoder 450 and the sensor 440 is stored in a control circuit which is not shown according to the angle. Moreover, the control circuit stores the position of the various sensor-opposing surfaces 450*a* and the absolute angle of the shaft 402 in association with each other.

Figure 38:
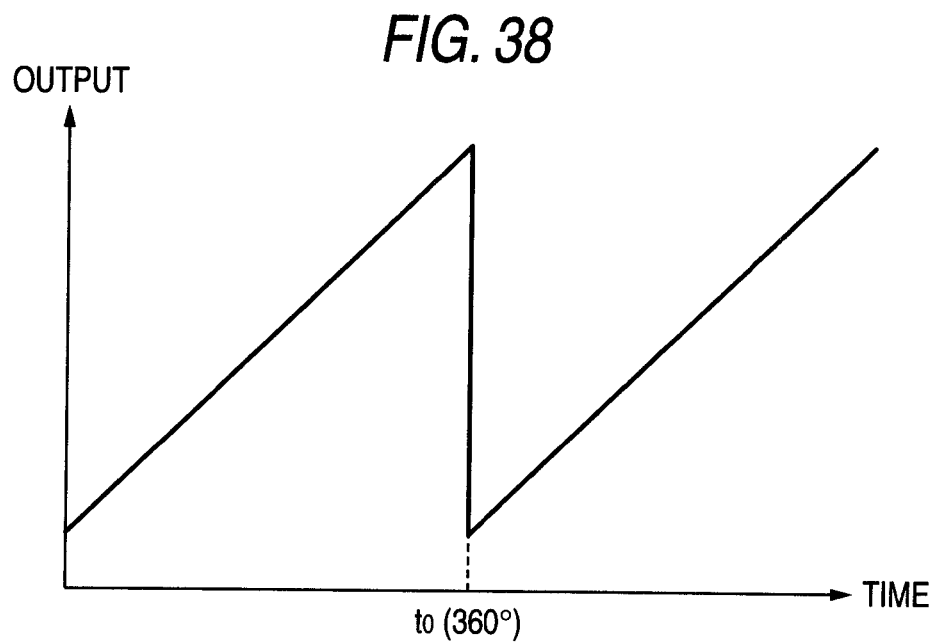
FIG. 38 is a diagram illustrating an output signal detected by a sensor 440.

FIG. 38 is a diagram illustrating the output signal detected by the sensor 440. FIG. 38 shows that the detected signal gradually increases linearly with time.

As previously mentioned, in the present embodiment, the encoder 450 is provided in such an arrangement that the radius R1 gradually increases clockwise as viewed axially (arrow A in FIG. 31). Accordingly, in the case of FIG. 38, the control circuit judges that the encoder 450, i.e., the shaft 402 rotates counterclockwise as viewed axially (arrow A in FIG. 31).

Further, the control circuit samples the time at which the peak reaches maximum and calculates the rotary speed from the time required from a peak to next peak.

Further, the control circuit determines the absolute angle of the shaft on the basis of the peak intensity. In the case of the present embodiment, the control circuit further has a predetermined angle and a table of detected values corresponding to the angle. The control circuit compares this table with the intensity of output value detected to calculate the rotary speed of the shaft 402.

As mentioned above, in accordance with the present embodiment, the encoder 450 and the sensor 440 are disposed radially opposed to each other. Further, the encoder 450 has a sensor-opposing surface 450*a* formed thereon such that the distance from the sensor 440 gradually increases or decreases. The sensor 440 outputs output signal according to the distance from the sensor-opposing surface 450*a* to the control circuit. The control circuit analyzes this output signal to detect the speed, direction and angle of rotation of the shaft 402. Accordingly, the single sensor 440 can be used to detect the speed, direction and angle of rotation of the shaft 402 at the same time, making it possible to exert the same effect as in the eleventh embodiment.

Further, the same rotation detecting device as in the present embodiment can be applied to a bearing with sensor described in any of the first to tenth embodiments.

Twenty Third Embodiment

A twenty third embodiment of implementation of the present invention will be described hereinafter in connection with FIGS. 39 to 40. Herein, the same members as mentioned in the sixteenth to twenty second embodiments will be given the same reference numerals and signs and their description will be omitted.

Figure 39:
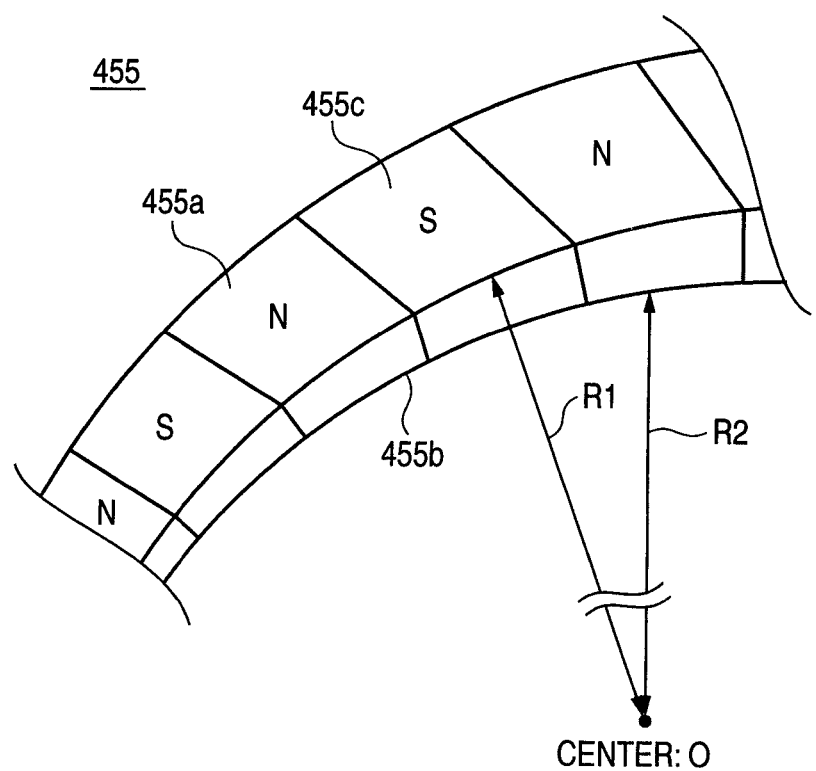
FIG. 39 is a partly enlarged perspective view illustrating an encoder 455 in a twenty third embodiment of implementation of the present invention.

FIG. 39 is a partly enlarged perspective view illustrating the encoder 455 in the twenty third embodiment of implementation of the present invention. The encoder 455 is used instead of the encoder 430 of FIG. 31. Configurations other than the encoder 455 are as shown in FIG. 31.

The encoder 455 has an annular shape having a constant axial width. The encoder 455 has an encoder mounting member grounding surface 455*b* apart from the center O of the ring by a radius of R2 and sensor-opposing surfaces 455*a* disposed at positions apart from the center O of the ring by radii R1 which gradually increase. The encoder 455 is fixed to the encoder mounting member 431 at the encoder mounting member grounding surface 455*b*. The normal direction of the encoder mounting member grounding surface 455*b* crosses the axial direction. The sensor-opposing surface 455*a* of the encoder 455 is disposed radially opposed to the sensor 445, which is a magnetism sensor.

The radius R1 of the encoder 455 increases at a predetermined ratio as the angle increases along the circumferential direction from the reference position. The position at which the radius R1 is at maximum and the position at which the radius R1 is at minimum are separated by a step. In the present embodiment, the encoder is disposed in such arrangement that the radius R1 gradually increases clockwise as viewed axially (arrow A in FIG. 31). Accordingly, the distance between the encoder 455 and the sensor 445 changes according to the shape of the sensor-opposing surface 455*a* with the rotation of the shaft 402. The distance between the encoder 455 and the sensor 445 is stored in a control circuit which is not shown according to the angle. Moreover, the control circuit stores the position of the various sensor-opposing surfaces 455*a* and the absolute angle of the shaft 402 in association with each other.

On the sensor-opposing surface 455*a* of the encoder 455 are disposed a plurality of N poles 437 and S poles 438 arranged alternately at a predetermined interval. The magnetized regions constituting the N pole 437 and S pole 438 each have a predetermined magnetic flux density. The N pole 437 and S pole 438 each form therearound a magnetic field having an intensity corresponding to the polarity and magnetic flux density thereof. Accordingly, a magnetic field corresponding to the magnetic flux density of N pole 437 and S pole 438 is formed around the encoder 455.

Figure 40:
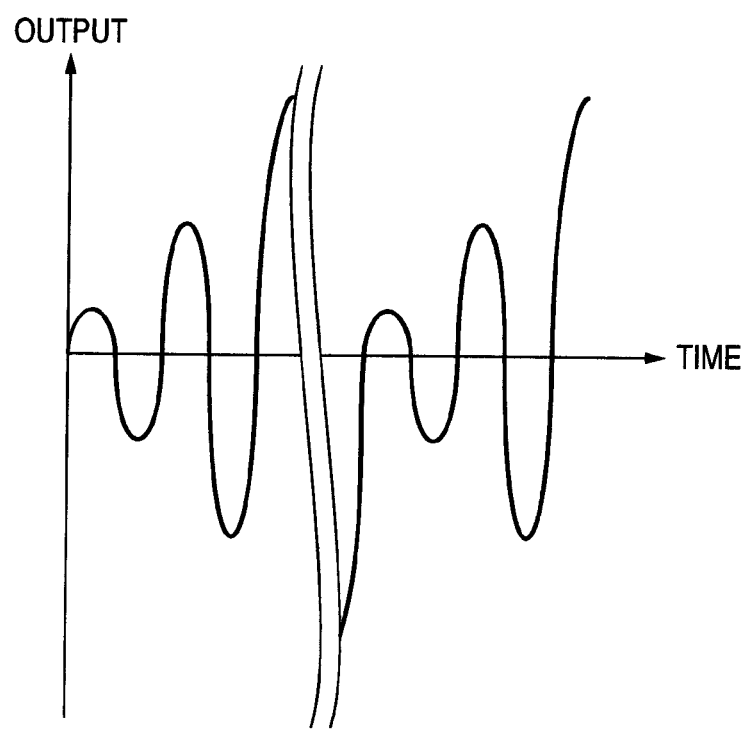
FIG. 40 is a diagram illustrating an output signal detected by a sensor 445.

FIG. 40 is a diagram illustrating the output signal detected by the sensor 445. Herein, FIG. 40 shows that the absolute value of intensity of pulse peak gradually increases with time.

As previously mentioned, in the present embodiment, the encoder 455 is provided in such an arrangement that the radius R1 gradually increases clockwise as viewed axially (arrow A in FIG. 31). Accordingly, in the case of FIG. 40, the control circuit judges that the encoder 455, i.e., the shaft 402 rotates counterclockwise as viewed axially (arrow A in FIG. 31).

Further, the control circuit samples the time at which the peak reaches maximum and calculates the rotary speed from the time required from a peak to next peak.

Further, the control circuit determines the absolute angle of the shaft on the basis of the intensity of detected signal. In the case of the present embodiment, the control circuit further has a predetermined angle and a table of detected values corresponding to the angle. The control circuit compares this table with the intensity of output value detected to calculate the rotary speed of the shaft 402.

As mentioned above, in accordance with the present embodiment, the encoder 455 and the sensor 445 are disposed radially opposed to each other. Further, the encoder 455 has a sensor-opposing surface 455a formed thereon such that the distance from the sensor 445 gradually increases or decreases. The sensor 445 outputs output signal according to the distance from the sensor-opposing surface 455a to the control circuit. The control circuit analyzes this output signal to detect the speed, direction and angle of rotation of the shaft 402. Accordingly, the single sensor 445 can be used to detect the speed, direction and angle of rotation of the shaft 402 at the same time, making it possible to exert the same effect as in the eleventh embodiment.

Further, the same rotation detecting device as in the present embodiment can be applied to a bearing with sensor described in any of the first to tenth embodiments.

Twenty Fourth Embodiment

A twenty fourth embodiment of implementation of the present invention will be described hereinafter in connection with FIGS. 41 and 42. Herein, the same members as mentioned in the sixteenth to twenty third embodiments will be given the same reference numerals and signs and their description will be omitted.

Figure 41:
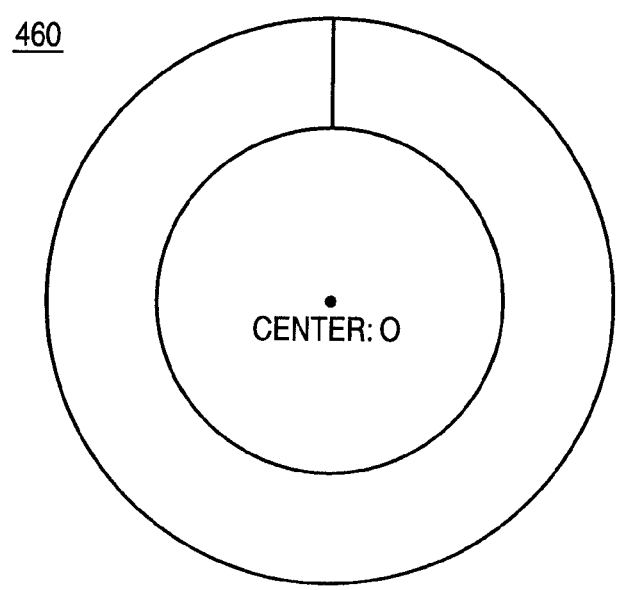
FIG. 41 is a plan view illustrating an encoder 460 in a twenty fourth embodiment of implementation of the present invention.

FIG. 41 is a plan view illustrating an encoder 460 in the twenty fourth embodiment of implementation of the present invention. The encoder 460 is used instead of the encoder 410 of FIG. 24. Configurations other than the encoder 460 are as shown in FIG. 24.

Figure 42:
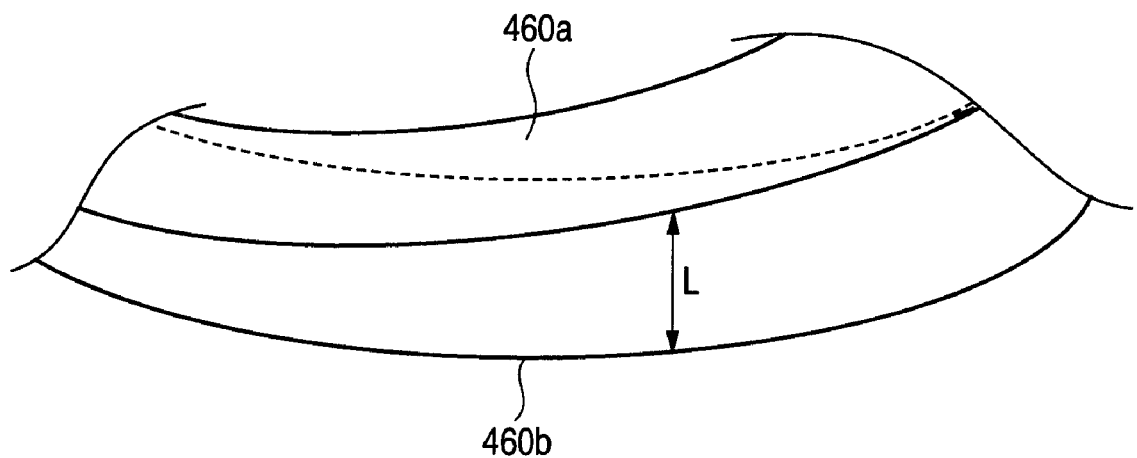
FIG. 42 is a partly enlarged perspective view of the encoder 460.

FIG. 42 is a partly enlarged perspective view of the encoder 460. The encoder 460 has an annular shape having a constant radial width. The encoder 460 has a flat encoder mounting member grounding surface 460b and sensor-opposing surfaces 460a which increase in the thickness L from the encoder mounting member at a predetermined ratio. The encoder 460 is fixed to the encoder mounting member 411 at the encoder mounting member grounding surface 460b. The normal direction of the encoder mounting member grounding surface 460b is parallel to the axial direction. The sensor-opposing surface 460a of the encoder 460 is disposed axially opposed to the sensor 420, which is a displacement sensor.

The thickness L of the encoder 460 increases at a predetermined ratio as the angle increases along the circumferential direction from the reference position. The position at which the thickness L is at maximum and the position at which the thickness L is at minimum are separated by a step. In the present embodiment, the encoder is disposed in such arrangement that the thickness L gradually increases counterclockwise as viewed from the sensor. Accordingly, the distance between the encoder 460 and the sensor 420 changes according to the shape of the sensor-opposing surface 465a with the rotation of the shaft 402. The distance between the encoder 460 and the sensor 420 is stored in a control circuit which is not shown according to the angle. Moreover, the control circuit stores the position of the various sensor-opposing surfaces 460a and the absolute angle of the shaft 402 in association with each other.

The output signal detected by the sensor 420 is as shown in FIG. 38. The method of calculating the rotary speed, direction of rotation and absolute angle is as explained in the twenty second embodiment.

As mentioned above, in accordance with the present embodiment, the encoder 460 and the sensor 420 are disposed axially opposed to each other. Further, the encoder 460 has a sensor-opposing surface 460a formed thereon such that the distance from the sensor 420 gradually increases or decreases. The sensor 420 outputs output signal according to the distance from the sensor-opposing surface 460a to the control circuit. The control circuit analyzes this output signal to detect the speed, direction and angle of rotation of the shaft 402. Accordingly, the single sensor 420 can be used to detect the speed, direction and angle of rotation of the shaft 402 at the same time, making it possible to exert the same effect as in the eleventh embodiment.

Twenty Fifth Embodiment

A twenty fifth embodiment of implementation of the present invention will be described hereinafter in connection with FIG. 43. Herein, the same members as mentioned in the sixteenth to twenty third embodiments will be given the same reference numerals and signs and their description will be omitted.

Figure 43:
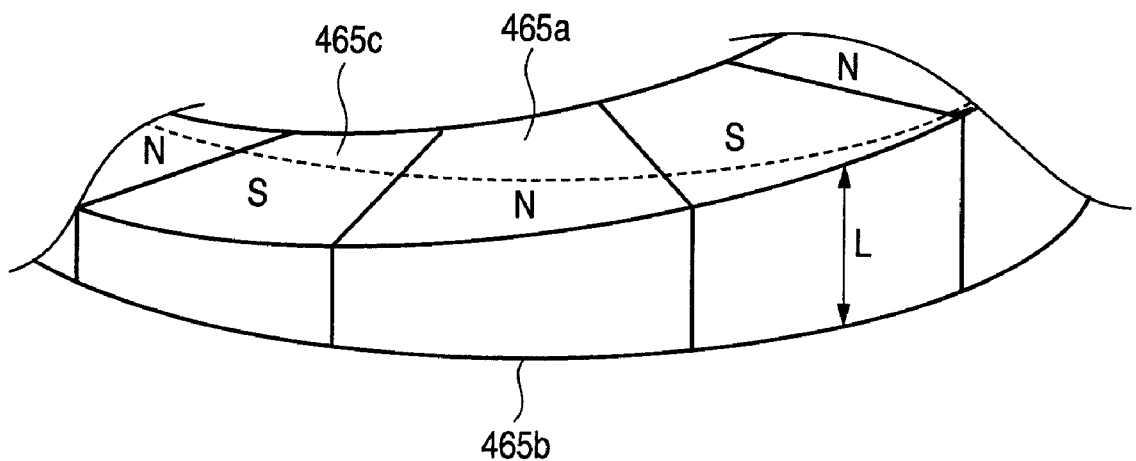
FIG. 43 is a partly enlarged perspective view illustrating an encoder 465 in a twenty fifth embodiment of implementation of the present invention.

FIG. 43 is a partly enlarged perspective view illustrating the encoder 465 in the twenty fifth embodiment of implementation of the present invention. The encoder 465 is used instead of the encoder 410 of FIG. 24. Configurations other than the encoder 465 are as shown in FIG. 24.

The encoder 465 has an annular shape having a constant radial width. The encoder 465 has a flat encoder mounting member grounding surface 465b and sensor-opposing surfaces 465a which increase in the thickness L from the encoder mounting member at a predetermined ratio. The encoder 465 is fixed to the encoder mounting member 411 at the encoder mounting member grounding surface 465b. The normal direction of the encoder mounting member grounding surface 465b is parallel to the axial direction. The sensor-opposing surface 465a of the encoder 465 is disposed axially opposed to the sensor 425, which is a magnetism sensor.

The radius L of the encoder 465 increases at a predetermined ratio as the angle increases along the circumferential direction from the reference position. The position at which the thickness L is at maximum and the position at which the thickness L is at minimum are separated by a step. In the present embodiment, the encoder is disposed in such arrangement that the thickness L gradually increases counterclockwise as viewed from the sensor. Accordingly, the distance between the encoder 465 and the sensor 425 changes according to the shape of the sensor-opposing surface 465a with the rotation of the shaft 402. The distance between the encoder 465 and the sensor 425 is stored in a control circuit which is not shown according to the angle. Moreover, the control circuit stores the position of the various sensor-opposing surfaces 465a and the absolute angle of the shaft 402 in association with each other.

On the sensor-opposing surface 465a of the encoder 465 are disposed a plurality of N poles 437 and S poles 438 arranged alternately at a predetermined interval. The magnetized regions constituting the N pole 437 and S pole 438 each have a predetermined magnetic flux density. The N pole 437 and S pole 438 each form therearound a magnetic field having an intensity corresponding to the polarity and magnetic flux density thereof. Accordingly, a magnetic field corresponding to the magnetic flux density of N pole 437 and S pole 438 is formed around the encoder 465.

The output signal detected by the sensor 425 is as shown in FIG. 40. The method of calculating the rotary speed, direction of rotation and absolute angle is as explained in the twenty third embodiment.

As mentioned above, in accordance with the present embodiment, the encoder 465 and the sensor 425 are disposed axially opposed to each other. Further, the encoder 465 has a sensor-opposing surface 465a formed thereon such that the distance from the sensor 425 gradually increases or decreases. The sensor 445 outputs output signal according to the distance from the sensor-opposing surface 465a to the control circuit. The control circuit analyzes this output signal to detect the speed, direction and angle of rotation of the shaft 402. Accordingly, the single sensor 425 can be used to detect the speed, direction and angle of rotation of the shaft 402 at the same time, making it possible to exert the same effect as in the eleventh embodiment.

Twenty Sixth Embodiment

A twenty sixth embodiment of implementation of the present invention will be described hereinafter in connection with FIG. 44. Herein, the same members as mentioned in the sixteenth to twenty fifth embodiments will be given the same reference numerals and signs and their description will be omitted.

Figure 44:
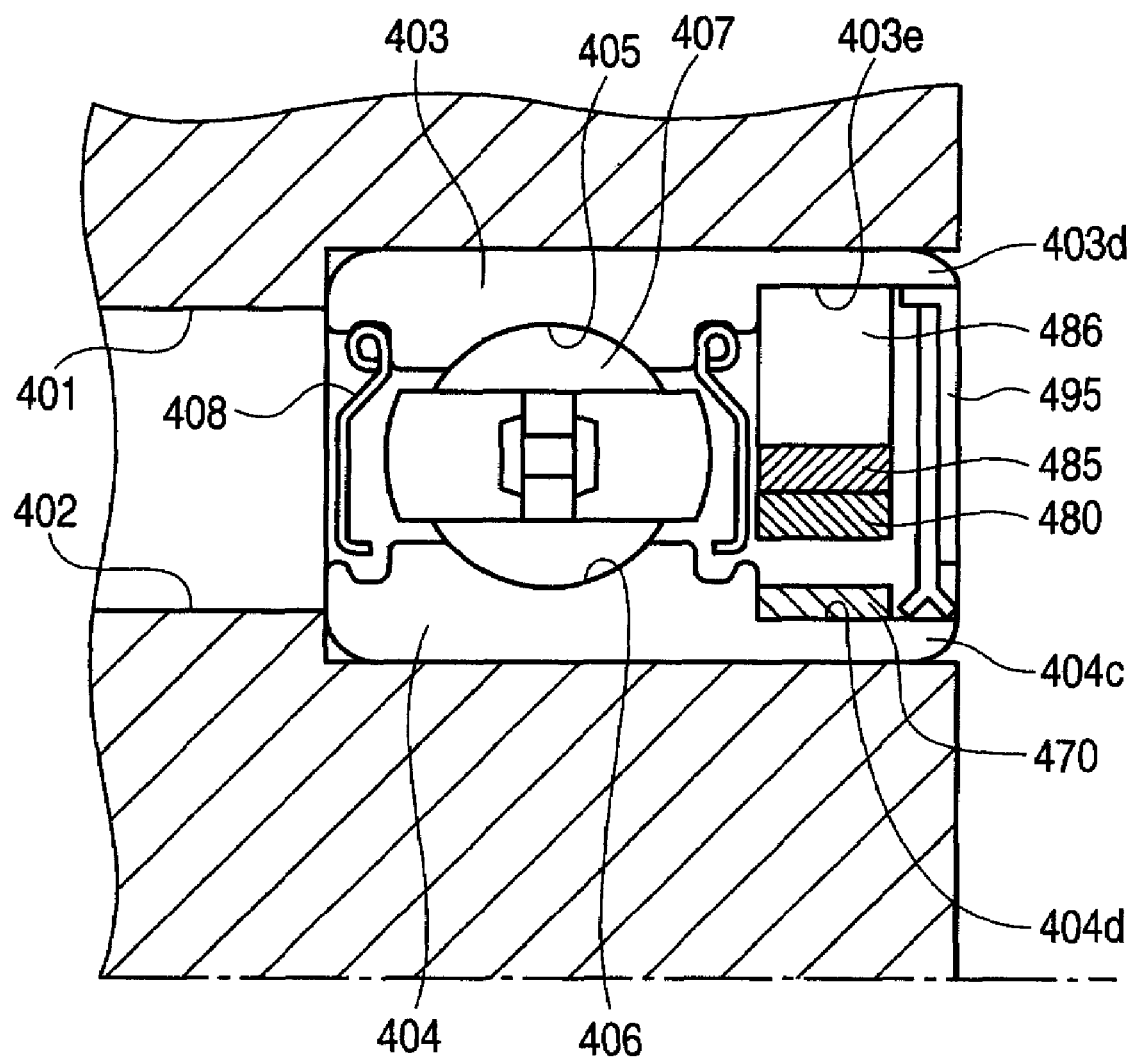
FIG. 44 is a deep groove ball bearing as a rolling device comprising a rotary state detecting device according to a twenty sixth embodiment of implementation of the present invention.

FIG. 44 illustrates a deep groove ball bearing as a rolling device with sensor having a rotation detecting device according to the twenty sixth embodiment of implementation of the present invention incorporated therein. In the present embodiment, the outer ring 403 and the inner ring 404 of the deep groove ball bearing have a sensor mounting portion 403d and an encoder mounting portion 404c which axially extend, respectively.

On the axially outer side 4d of the encoder mounting portion 404c is disposed an encoder 470. The encoder 470 is an encoder having a magnet such as encoders 435, 436 and 455 described in the twentieth, twenty first and twenty third embodiments disposed thereon. The axial side of the encoder 470 is opposed to the sensor mounting portion 403d.

On the other hand, on the end of the axially inner side 403e of the sensor mounting portion 403d is provided standing an annular steel sheet 495. An annular seal 490 is supported by the steel sheet 495 to seal the clearance between the sensor mounting portion 403d and the encoder mounting portion 404c.

Further, on the axially inner side 403e of the sensor mounting portion 403d is disposed a sensor mounting member 486. The sensor mounting member 486 is positioned between the seal ring 408 and the seal 490.

On the sensor mounting member 486 are disposed a temperature measuring device 485 and a sensor 480. The sensor 480 is a magnetism sensor which measures the change of magnetic field formed by the encoder 470 or a displacement sensor which measures the change of distance. The sensor 480 is disposed opposed to the encoder 470 and measures the shape of the encoder 470. The sensor 480 detects the rotary speed, rotation direction and absolute angle of rotary body in the same manner as in the twentieth, twenty first and twenty third embodiments.

The temperature measuring device 485 measures the temperature of the sensor and encoder and the peripheral members and outputs the temperature data thus measured to a control circuit which is not shown. In the case where the encoder 470 is magnetized by N pole or S pole, the magnetized regions constituting the N pole and S pole change in magnetic flux density with temperature change. The control circuit has a table by which the change of magnetic flux density with temperature change is corrected. Further, the control circuit uses this table to correct the output value thus detected and detect the rotary speed, rotation direction and absolute angle of the shaft. In the case where a contact type thermometer such as thermocouple is used, the temperature of a nonrotary member such as sensor is detected, but in the case where a noncontact type thermometer such as infrared radiation thermometer is used, the detection of the temperature of a rotary member such as encoder is made possible.

As mentioned above, in accordance with the present embodiment, output value corrected in the light of temperature change can be used to detect the rotary speed, rotation direction and absolute angle of the shaft. Accordingly, the encoder 470 can be used without taking into account the working temperature conditions of the encoder 470, making it possible to apply the present rotary state detecting device to bearing and rolling device more widely.

The core gap between the encoder and the sensor changes with thermal expansion and shrinkage. This core gap change may be corrected on the basis of signal from the temperature measuring device.

Further, in the present embodiment, the encoder 470 and the sensor 480 are sealed by the seal ring 408 and the seal 490. Therefore, the external effect can be minimized, making measurement possible at a higher accuracy.

Accordingly, the speed, direction and angle of rotation of the shaft can be detected by a simple structure, making it possible to reduce the number of parts and hence the part cost. Further, the reduction of the number of parts improves assemblability, making it possible to reduce the assembly cost as well.

Further, since only one sensor is required, the space in the bearing can be saved, making more compact design possible as a whole. Moreover, the reduction of the number of sensors leads to the reduction of the weight of the bearing as well, contributing to the reduction of fuel consumption if the bearing is used for automobile or the like.

Further, the same rotation detecting device as in the present embodiment can be applied to a bearing with sensor described in any of the first to tenth embodiments.

INDUSTRIAL APPLICABILITY

In accordance with the present invention, a rolling bearing with sensor which can maintain a high precision in detection even if any load pressing the end surface of race is acted thereon can be provided.

Further, in accordance with the present invention, a rolling bearing with sensor which can have a plurality of sensors incorporated therein and can have a reduced width can be provided.

Moreover, in accordance with the present invention, a rolling bearing with sensor which can block external disturbance such as leakage of magnetic flux to maintain a high precision in detection can be provided.

Further, in accordance with the present invention, since the distance between the encoder and the sensor-opposing surface differs with position, a rotary state detecting device and a rolling bearing with sensor can be provided which can judge the rotary speed, rotation direction and absolute angle by a simple configuration by allowing a sensor to measure the distance from the encoder. Moreover, in the case of the present configuration, only one sensor is required, making it possible to simplify the configuration and hence reduce the device cost.

Further, in accordance with the present invention, a rotary state detecting device and a rolling bearing with sensor can be provided which can detect the rotary speed of a rotary member by using a single sensor to detect peak because a plurality of magnetized regions constituting the encoder have different magnetic flux densities. Moreover, by previously grasping the disposition pattern of magnetized regions having different magnetic flux densities, the rotation direction and absolute angle of a rotary member can be detected at the same time using a single sensor. Thus, the reduction of the space on a stationary member can be made by using a simpler structure than in related art. Further, there is no necessity of providing extra sensors, making it possible to detect the rotary member at a reduced cost.

The invention claimed is:

1. A rolling bearing comprising:
an inner ring;
an outer ring;
a rolling element rollably disposed between the inner ring and the outer ring;
a sensor provided on one of the inner ring and the outer ring;
a detection member sensible by the sensor, the detection member provided on the other of the inner ring and the outer ring and opposed radially to the sensor;
a noise shield disposed in the vicinity of the sensor and the detection member;
a first retaining member made of a magnetic material and fixed to the outer ring, the first retaining member retaining one of the sensor and the detection member; and
a second retaining member made of a magnetic material fixed to the inner ring, the second retaining member retaining the other of the sensor and the detection member;
wherein the first retaining member and the second retaining member act as the noise shield.

2. The rolling bearing as claimed in claim 1, wherein the sensor is a magnetism sensor which senses magnetism generated by the detection member.

3. The rolling bearing as claimed in claim 1, wherein at least one of the first retaining member and the second retaining member has a side wall extending radially on a side of the sensor and the detection member opposite to the rolling element; and
the first retaining member and the second retaining member cover the sensor and the detection member while having a U-shaped cross section.

4. The rolling bearing as claimed in claim 1, further comprising an interposing side wall radially extending and being disposed at a side of the sensor and the detection member to face the rolling element;
wherein the interposing side wall acts as a noise shield.

5. The rolling bearing as claimed in claim 1, wherein the first retaining member and the second retaining member retain the sensor and the detection member with the sensor and the detection member opposed radially to each other.

* * * * *